United States Patent
Annamalaisami et al.

(10) Patent No.: US 9,432,269 B2
(45) Date of Patent: Aug. 30, 2016

(54) SYSTEMS AND METHODS FOR EXPORTING APPLICATION DETAILS USING APPFLOW

(71) Applicant: Citrix Systems, Inc., Fort Lauderdale, FL (US)

(72) Inventors: Saravana Annamalaisami, Bangalore (IN); Rajesh Joshi, Bangalore (IN); Sovit Garg, Bangalore (IN); Arvind Neergunda, Bangalore (IN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 476 days.

(21) Appl. No.: 13/858,009

(22) Filed: Apr. 6, 2013

(65) Prior Publication Data
US 2014/0304393 A1    Oct. 9, 2014

(51) Int. Cl.
| | | |
|---|---|---|
| *G06F 15/16* | (2006.01) | |
| *H04L 12/26* | (2006.01) | |
| *G06F 9/44* | (2006.01) | |
| *H04L 29/06* | (2006.01) | |
| *H04L 29/08* | (2006.01) | |
| *G06F 9/455* | (2006.01) | |

(52) U.S. Cl.
CPC ............ *H04L 43/04* (2013.01); *G06F 9/4445* (2013.01); *G06F 9/45533* (2013.01); *H04L 43/026* (2013.01); *H04L 43/028* (2013.01); *H04L 63/102* (2013.01); *H04L 67/146* (2013.01); *H04L 63/168* (2013.01)

(58) Field of Classification Search
USPC ........................................................ 709/217
See application file for complete search history.

(56) References Cited

U.S. PATENT DOCUMENTS

| | | | | |
|---|---|---|---|---|
| 6,751,573 | B1* | 6/2004 | Burch ................. | G06F 11/0709 370/473 |
| 7,095,855 | B1* | 8/2006 | Collins .................... | H04L 63/08 380/241 |
| 7,426,048 | B2* | 9/2008 | Sakai ....................... | H04N 1/00 358/1.14 |
| 7,467,378 | B1* | 12/2008 | Sobel ........................... | 717/168 |
| 8,175,978 | B2* | 5/2012 | Endoh ..................... | G06F 21/10 705/50 |
| 8,724,487 | B1* | 5/2014 | Aitken .................... | H04L 43/04 370/252 |
| 8,799,647 | B2* | 8/2014 | Grab ....................... | G06F 21/10 713/155 |
| 9,210,053 | B2* | 12/2015 | Chen ..................... | H04L 43/022 |
| 2004/0117784 | A1* | 6/2004 | Endoh .......................... | 717/169 |
| 2013/0205001 | A1* | 8/2013 | Reed .................... | G06F 9/44505 709/224 |
| 2013/0325856 | A1* | 12/2013 | Soto Matamala .. | G06F 17/3089 707/724 |
| 2014/0303934 | A1* | 10/2014 | Mylarappa .......... | G06F 11/3006 702/186 |

* cited by examiner

*Primary Examiner* — Alicia Baturay
(74) *Attorney, Agent, or Firm* — Foley & Lardner LLP; Christopher J. McKenna

(57) ABSTRACT

The present disclosure is directed towards systems and methods for lightweight identification of flow information by application. A flow monitor executed by a processor of a device may maintain a counter. The flow monitor may associate an application with the value of the counter and transmit, to a data collector executed by a second device, the counter value and a name of the application. The flow monitor may monitor a data flow associated with the application to generate a data record. The flow monitor may transmit the data record to the data collector, the data record including an identification of the application consisting of the counter value and not including the name of the application. The data collector may then re-associate the data record with the application name based on the previously received counter value.

20 Claims, 43 Drawing Sheets

| Record Header 702 | Set ID = 2 | Set Length = 96 |
|---|---|---|
| | Template ID = 256 | Field Count = 19 |
| Record Payload 704 | Observation point ID (observationPointId, 138) | Unsigned32, 4 |
| | Export process ID (exportingProcessId, 144) | Unsigned32, 4 |
| | Flow ID(flowId, 148) | Unsigned64, 8 |
| | Transaction ID(transactionId, 32897) | Unsigned32, 4 |
| | Enterprise ID | |
| | Connection ID(connectionId, 32901) | Unsigned32, 4 |
| | Enterprise ID | |
| | Ipversion(ipVersion, 60) | Unsigned8, 1 |
| | IP protocol number(protocoldentifier,4) | Unsigned8,1 |
| | Padding(Padding, 210) | Unsigned8,2 |
| | Ipv4 SRC IP(sourceIPv4Address, 8) | Ipv4address, 4 |
| | Ipv4 DST IP(destinationIpv4Addres, 12) | Ipv4address, 4 |
| | SRC Port(tcpSourcePort, 182) | Unsigned16, 2 |
| | DST Port(tcpDestinationPort,183) | Unsigned16,2 |
| | Pkt Count(packetDeltaCount, 2) | Unsigned64, 8 |
| | Byte Count(octetDeltaCount, 1) | Unsigned64, 8 |
| | Flag(TCP Control bits, 6) | Unsigned8, 1 |
| | Flags(flowFlags, 32900) | Unsigned64,8 |
| | Enterprise ID | |
| | Time for first pkt in microseconds(flowStartMicroseconds, 154) | dateTimeMicroseconds, 8 |
| | Time for lastpkt in microseconds(flowEndMicroseconds, 155) | dateTimeMicroseconds, 8 |
| | ingressInterface(ingressInterface, 10) | Unsigned32,4 |
| | egressInterface(egressInterface, 14) | Unsigned32,4 |

IPv4 layer 4 record – ingress 700

FIG. 7

| Record Header 802 | Set ID = 2 | Set Length = 112 |
|---|---|---|
| | Template ID = 257 | Field Count = 21 |
| Record Payload 804 | Observation point ID (observationPointId, 138) | Unsigned32, 4 |
| | Export process ID (exportingProcessId, 144) | Unsigned32, 4 |
| | Flow ID(flowId, 148) | Unsigned64, 8 |
| | Transaction ID(transactionId, 32897) | Unsigned32, 4 |
| | Enterprise ID | |
| | Connection ID(connectionId, 32901) | Unsigned32, 4 |
| | Enterprise ID | |
| | Ipversion(ipVersion, 60) | Unsigned8, 1 |
| | IP protocol number(protocolIdentifier,4) | Unsigned8,1 |
| | Padding(Padding, 210) | Unsigned8,2 |
| | Ipv4 SRC IP(sourceIPv4Address, 8) | Ipv4address, 4 |
| | Ipv4 DST IP(destinationIpv4Addres, 12) | Ipv4address, 4 |
| | SRC Port(tcpSourcePort, 182) | Unsigned16, 2 |
| | DST Port(tcpDestinationPort,183) | Unsigned16,2 |
| | Pkt Count(packetDeltaCount, 2) | Unsigned64, 8 |
| | Byte Count(octetDeltaCount, 1) | Unsigned64, 8 |
| | Flag(TCP Control Bits, 6) | Unsigned8, 1 |
| | Flags(flowFlags, 32900) | Unsigned64,8 |
| | Enterprise ID | |
| | Time for first pkt in microseconds(flowStartMicroseconds, 154) | dateTimeMicroseconds, 8 |
| | Time for last pkt in microseconds(flowEndMicroseconds, 155) | dateTimeMicroseconds, 8 |
| | ingressInterface(ingressInterface, 10) | Unsigned32,4 |
| | egressInterface(egressInterface, 14) | Unsigned32,4 |

IPv4 layer 7 record (continued on next figure) – ingress 800

FIG. 8A

| | |
|---|---|
| HTTP Request URL(httpReqUrl, 32898) | VariableLength,65535 |
| Enterprise ID | |
| HTTP Request Cookie(httpReqCookie, 32899) | VariableLength,65535 |
| Enterprise ID | |
| HTTP Request Referer(httpReqReferer, 32908) | VariableLength, 65535 |
| Enterprise ID | |
| HTTP Request Method(httpReqMethod, 32909) | VariableLength, 65535 |
| Enterprise ID | |
| HTTP Request Host(httpReqHost, 32910) | VariableLength, 65535 |
| Enterprise ID | |
| HTTP Request User-Agent(httpReqUserAgent, 32911) | VariableLength, 65535 |
| Enterprise ID | |

Record Payload 804

IPv4 layer 7 record (continued from previous figure)– ingress 800

FIG. 8B

| Record Header 902 | Set ID = 2 | Set Length = 96 |
|---|---|---|
| | Template ID = 258 | Field Count = 19 |
| Record Payload 904 | Observation point ID (observationPointId, 138) | Unsigned32, 4 |
| | Export process ID (exportingProcessId, 144) | Unsigned32, 4 |
| | Flow ID(flowId, 148) | Unsigned64, 8 |
| | Transaction ID(transactionId, 32897) | Unsigned32, 4 |
| | Enterprise ID | |
| | Connection ID(connectionId, 32901) | Unsigned32, 4 |
| | Enterprise ID | |
| | Ipversion(ipVersion, 60) | Unsigned8, 1 |
| | IP protocol number(protocolIdentifier, 4) | Unsigned8, 1 |
| | Padding(Padding, 210) | Unsigned8, 2 |
| | Ipv6 SRC IP(sourceIPv6Address, 27) | Ipv6address, 16 |
| | Ipv6 DST IP(destinationIPv6Address, 28) | Ipv6address, 16 |
| | SRC Port(tcpSourcePort, 182) | Unsigned16, 2 |
| | DST Port(tcpDestinationPort, 183) | Unsigned16, 2 |
| | Pkt Count(packetDeltaCount, 2) | Unsigned64, 8 |
| | Byte Count(octetDeltaCount, 1) | Unsigned64, 8 |
| | Flag(TCP Control Bits), 6 | Unsigned8, 1 |
| | Flags(flowFlags, 32900) | Unsigned64, 8 |
| | Enterprise ID | |
| | Time for first pkt in microseconds(flowStartMicroseconds, 154) | dateTimeMicroseconds, 8 |
| | Time for last pkt in microseconds(flowEndMicroseconds, 155) | dateTimeMicroseconds, 8 |
| | ingressInterface(ingressInterface, 10) | Unsigned32, 4 |
| | egressInterface(egressInterface, 14) | Unsigned32, 4 |

IPv6 layer 4 record – ingress 900

FIG. 9

| Record Header 1002 | Set ID = 2 | Set Length = 112 |
|---|---|---|
| | Template ID = 259 | Field Count = 21 |
| | Observation point ID (observationPointId, 138) | Unsigned32, 4 |
| | Export process ID (exportingProcessId, 144) | Unsigned32, 4 |
| | Flow ID(flowId, 148) | Unsigned64, 8 |
| | Transaction ID(transactionId, 32897) | Unsigned32, 4 |
| | Enterprise ID | |
| Record Payload 1004 | Connection ID(connectionId, 32901) | Unsigned32, 4 |
| | Enterprise ID | |
| | Ipversion(ipVersion, 60) | Unsigned8, 1 |
| | IP protocol number(protocoldentifier,4) | Unsigned8,1 |
| | Padding(Padding, 210) | Unsigned8,2 |
| | Ipv6 SRC IP(sourceIPv6Address, 27) | Ipv6address, 16 |
| | Ipv6 DST IP(destinationIPv6Address, 28) | Ipv6address, 16 |
| | SRC Port(tcpSourcePort, 182) | Unsigned16, 2 |
| | DST Port(tcpDestinationPort,183) | Unsigned16,2 |
| | Pkt Count(packetDeltaCount, 2) | Unsigned64, 8 |
| | Byte Count(octetDeltaCount, 1) | Unsigned64, 8 |
| | Flag(TCP Control Bits, 6) | Unsigned8, 1 |
| | Flags(flowFlags, 32900) | Unsigned64,8 |
| | Enterprise ID | |
| | Time for first pkt in microseconds(flowStartMicroseconds, 154) | dateTimeMicroseconds, 8 |
| | Time for last pkt in microseconds(flowEndMicroseconds, 155) | dateTimeMicroseconds, 8 |
| | ingressInterface(ingressInterface, 10) | Unsigned32,4 |
| | egressInterface(egressInterface, 14) | Unsigned32,4 |

IPv6 layer 7 record (continued on next figure) – ingress 1000

FIG. 10A

IPv6 layer 7 record (continued from previous figure)-- ingress 1000

| Record Header 1102 | Set ID = 2 | Set Length = 96 |
|---|---|---|
| | Template ID = 260 | Field Count = 19 |
| Record Payload 1104 | Observation point ID (observationPointId, 138) | Unsigned32, 4 |
| | Export process ID (exportingProcessId, 144) | Unsigned32, 4 |
| | Flow ID(flowId, 148) | Unsigned64, 8 |
| | Transaction ID(transactionId, 32897) | Unsigned32, 4 |
| | Enterprise ID | |
| | Connection ID(connectionId, 32901) | Unsigned32, 4 |
| | Enterprise ID | |
| | Ipversion(ipVersion, 60) | Unsigned8, 1 |
| | IP protocol number(protocolIdentifier,4) | Unsigned8,1 |
| | Padding(Padding, 210) | Unsigned8,2 |
| | Ipv4 SRC IP(sourceIPv4Address, 8) | Ipv4address, 4 |
| | Ipv4 DST IP(destinationIpv4Addres, 12) | Ipv4address, 4 |
| | SRC Port(tcpSourcePort, 182) | Unsigned16, 2 |
| | DST Port(tcpDestinationPort,183) | Unsigned16,2 |
| | Pkt Count(packetDeltaCount, 2) | Unsigned64, 8 |
| | Byte Count(octetDeltaCount, 1) | Unsigned64, 8 |
| | Flag(TCP Control bits, 6) | Unsigned8, 1 |
| | Flags(flowFlags, 32900) | Unsigned64,8 |
| | Enterprise ID | |
| | Time for first pkt in microseconds(flowStartMicroseconds, 154) | dateTimeMicroseconds, 8 |
| | Time for lastpkt in microseconds(flowEndMicroseconds, 155) | dateTimeMicroseconds, 8 |

IPv4 server to intermediary record (continued on next figure) – ingress 1100

FIG. 11A

IPv4 server to intermediary record (continued from previous figure)– ingress 1100

| Record Header 1202 | Set ID = 2 | Set Length = 96 |
|---|---|---|
| | Template ID = 261 | Field Count = 19 |
| Record Payload 1204 | Observation point ID (observationPointId, 138) | Unsigned32, 4 |
| | Export process ID (exportingProcessId, 144) | Unsigned32, 4 |
| | Flow ID(flowId, 148) | Unsigned64, 8 |
| | Transaction ID(transactionId, 32897) | Unsigned32, 4 |
| | Enterprise ID | |
| | Connection ID(connectionId, 32901) | Unsigned32, 4 |
| | Enterprise ID | |
| | Ipversion(ipVersion, 60) | Unsigned8, 1 |
| | IP protocol number(protocoldentifier,4) | Unsigned8,1 |
| | Padding(Padding, 210) | Unsigned8,2 |
| | Ipv6 SRC IP(sourceIPv6Address, 27) | Ipv6address,16 |
| | Ipv6 DST IP(destinationIpv6Addres, 28) | Ipv4address, 16 |
| | SRC Port(tcpSourcePort, 182) | Unsigned16, 2 |
| | DST Port(tcpDestinationPort,183) | Unsigned16,2 |
| | Pkt Count(packetDeltaCount, 2) | Unsigned64, 8 |
| | Byte Count(octetDeltaCount, 1) | Unsigned64, 8 |
| | Flag(TCP Control bits, 6) | Unsigned8, 1 |
| | Flags(flowFlags, 32900) | Unsigned64,8 |
| | Enterprise ID | |
| | Time for first pkt in microseconds(flowStartMicroseconds, 154) | dateTimeMicroseconds, 8 |
| | Time for lastpkt in microseconds(flowEndMicroseconds, 155) | dateTimeMicroseconds, 8 |

IPv6 server to intermediary record (continued on next figure) – ingress 1200

FIG. 12A

IPv6 server to intermediary record (continued from previous figure)– ingress 1200

| | Set ID = 2 | Set Length = 104 |
|---|---|---|
| Record Header 1302 | Template ID = 263 | Field Count = 20 |
| | Observation point ID (observationPointId, 138) | Unsigned32, 4 |
| | Export process ID (exportingProcessId, 144) | Unsigned32, 4 |
| | Flow ID(flowId, 148) | Unsigned64, 8 |
| | Transaction ID(transactionId, 32897) | Unsigned32, 4 |
| | Enterprise ID | |
| Record Payload 1304 | Connection ID(connectionId, 32901) | Unsigned32, 4 |
| | Enterprise ID | |
| | Ipversion(ipVersion, 60) | Unsigned8, 1 |
| | IP protocol number(protocoldentifier,4) | Unsigned8, 1 |
| | Padding(Padding, 210) | Unsigned8, 2 |
| | Ipv6 SRC IP(sourceIPv6Address, 27) | Ipv6address, 16 |
| | Ipv6 DST IP(destinationIPv6Address, 28) | Ipv6address, 16 |
| | SRC Port(tcpSourcePort, 182) | Unsigned16, 2 |
| | DST Port(tcpDestinationPort,183) | Unsigned16, 2 |
| | Pkt Count(packetDeltaCount, 2) | Unsigned64, 8 |
| | Byte Count(octetDeltaCount, 1) | Unsigned64, 8 |
| | Flag(TCP Control Bits, 6) | Unsigned8, 1 |
| | Flags(flowFlags, 32900) | Unsigned64, 8 |

IPv6 layer 4 record (continued on next figure) – egress 1300

FIG. 13A

IPv6 layer 4 record (continued from previous figure) – egress 1300

Log message record 1400

Application name template 1950

Load time record template 2080

| Header 2088 | Set ID = 2 | Set Length = 36 |
|---|---|---|
| | Template ID = 267 | Field Count = 4 |
| 2090 | Export process ID (exportingProcessId, 144) | Unsigned32, 4 |
| | Transaction ID (transactionID, 32897) | Unsigned32, 4 |
| | Enterprise ID | |
| | Client Render End time (clientRenderEndTime, 32932) | Variable Length, 65535 |
| | Enterprise ID | |
| | Client Render Start time (clientRenderStartTime, 32933) | Variable length, 65535 |
| | Enterprise ID | |

Render time record template 2086

FIG. 20D

SYSTEMS AND METHODS FOR EXPORTING APPLICATION DETAILS USING APPFLOW

FIELD

The present application generally relates to data communication networks. In particular, the present application relates to systems and methods for identifying applications in flow records via a lightweight identification protocol.

BACKGROUND

Traditionally, different methods have been used for information collection and management of networks and devices. Most popular is the older Simple Network Management Protocol (SNMP). However, while SNMP is extensible and can incorporate new management elements, it does not give finer flow information such as at the HTTP transaction level. Instead, SNMP provides only aggregated device-level information.

Similarly, the newer IP Flow Information Export, or IPFIX, protocol also focuses on lower level flow information. IPFIX is a universal standard for exporting Internet Protocol flow information from routers, switches, probes, and other intermediary devices. IPFIX is defined in Internet Engineering Task Force (IETF) RFCs 5101 and 5102, the latter of which includes over 200 standard information elements. According to RFC 5101, a flow is defined as a set of IP packets passing an observation point in the network during a certain time interval, with packets belonging to a particular flow having common properties. As noted in RFC 5101, however, the flow definition does not necessarily match application-level end-to-end streams.

IPFIX includes features such as template based flow information definition and extensibility options. Key fields are also dynamically defined along with template definitions for particular information. Each template defines an individual flow data record and its key fields, and may contain a set of standard information elements (IE) and enterprise specific information elements (EIE) and their order in the corresponding data record. A data record may be linked to a template using a template ID.

IETF RFC 5470, "Architecture for IP flow information export," defines three key components of the IPFIX architecture. The first is an exporter process, which collects, filters, and/or samples the required flow information and exports. The second component is the collector process, which reads the templates and key fields and distinguishes different flow records and collects them for later consumption from the users. The third component is the users, which interact with the collector process to get the required flow records and process the information to determine intelligent decision points.

IPFIX was originally developed by Cisco Systems, Inc., as the proprietary Netflow protocol. Netflow and IPFIX describe extensible records for describing layer 2 and layer 3 network flows. Typically, these include values aggregated from multiple higher layer communications, and accordingly, fail to address session or application layer transaction boundaries or other fine detail.

Other techniques exist for capturing application layer network information, but each have drawbacks. For example, HTML injection and logging lacks flexibility and extensibility in adding new elements, and requires proprietary applications on both ends of a communication in order to capture data. Port mirroring provides fine detail, but is highly demanding of both network bandwidth and CPU usage.

BRIEF SUMMARY

The present disclosure is directed towards systems and methods for monitoring application level flow for database applications served by a cluster of servers. An application flow monitor may receive and distribute write requests of a client to at least one master server and read requests of the client to one or more slave servers, based on load balancing or similar policies. The application flow monitor may receive responses from the recipient server and may aggregate the requests and responses into Internet Protocol Flow Information Export (IPFIX) messages that may describe the entire communication flow for the application. Accordingly, application flow statistics may be monitored, regardless of which server was involved in any particular request/response exchange, allowing scalability without impairment of administrative processes.

In one aspect, the present disclosure is directed towards systems and methods for tracking application layer flow via a multi-connection intermediary. In one aspect, transaction level or application layer information may be tracked via the intermediary, including one or more of: (i) the request method; (ii) response codes; (iii) URLs; (iv) HTTP cookies; (v) RTT of both ends of the transaction in a quad flow arrangement; (vi) server time to provide first byte of a communication; (vii) server time to provide the last byte of a communication; (viii) flow flags; or any other type and form of transaction level data may be captured, exported, and analyzed. In some embodiments, the application layer flow or transaction level information may be provided in an IPFIX-compliant data record. This may be done to provide template-based data record definition, as well as providing data on an application or transaction level of granularity. In some embodiments, the information may be intelligently aggregated responsive to application layer or transaction level information.

In one aspect, the present disclosure is directed to a method for lightweight identification of flow information by application. The method includes maintaining, by a flow monitor executed by a processor of a device, a counter. The method also includes associating, by the flow monitor, an application with the value of the counter. The method further includes transmitting, by the flow monitor to a data collector executed by a second device, the counter value and a name of the application. The method also includes monitoring, by the flow monitor, a data flow associated with the application to generate a data record. The method also includes transmitting the data record, by the flow monitor to the data collector, the data record including an identification of the application consisting of the counter value.

In some embodiments, the method includes incrementing the counter prior to associating a second application with the value of the counter. In other embodiments, the method includes maintaining a second counter, incrementing the second counter upon rebooting the device, and transmitting the value of the second counter to the data collector with the counter value and the name of the application. In still other embodiments, the method includes maintaining a second counter, incrementing the second counter responsive to a configuration change of the device, and transmitting the value of the second counter to the data collector with the counter value and the name of the application.

In one embodiment of the method, name of the application is an order of magnitude longer than the counter value. In another embodiment, transmitting the counter value and the name of the application further comprises transmitting a device identifier associated with the application. In still another embodiment, transmitting the data record including an identification of the application consisting of the counter value further comprises transmitting the data record for re-association with the name of the application by the data collector, based on a mapping of the name of the application to the counter value maintained by the data collector. In some embodiments, the method includes re-transmitting the counter value and the name of the application responsive to expiration of a timer.

In another aspect, the present disclosure is directed to a method for lightweight identification of flow information by application. The method includes receiving, by a data collector executed by a processor of a device, from a second device, a name of an application and a value of a counter maintained by a flow monitor executed by the second device. The method also includes mapping, by the data collector, the received name of the application to the counter value. The method further includes receiving, by the data collector from the flow monitor, a data flow record including an identification of the application consisting of the counter value. The method also includes re-associating the received data flow record with the name of the application, by the data collector, responsive to the mapping of the name of the application to the counter value.

In some embodiments of the method, receiving the name of the application and value of the counter further includes receiving a value of a second counter. In such embodiments, the method also includes receiving, by the data collector, the name of the application, a second value of the counter, and an incremented value of the second counter, transmitted by the flow monitor responsive to a change in configuration of the second device; and replacing the mapping of the name of the application to the counter value with a mapping of the name of the application to the second counter value.

In other embodiments of the method, the name of the application is an order of magnitude longer than the counter value. In still other embodiments, the method includes receiving, by the data collector, a device identifier, and mapping the name of the application to the device identifier and the counter value.

In yet another aspect, the present disclosure is directed to a system for lightweight identification of flow information by application. The system includes a device comprising a processor executing a flow monitor. The device may comprise a multi-core device with a plurality of cores. The flow monitor may be configured for maintaining a counter, associating an application with the value of the counter, and transmitting, to a data collector executed by a second device, the counter value and a name of the application. The flow monitor is also configured for monitoring a data flow associated with the application to generate a data record, and transmitting the data record, to the data collector, the data record including an identification of the application consisting of the counter value.

In one embodiment of the system, the flow monitor is further configured for incrementing the counter prior to associating a second application with the value of the counter. In another embodiment, the flow monitor is further configured for maintaining a second counter, incrementing the second counter responsive to a configuration change of the device, and incrementing the second counter upon rebooting the device.

In some embodiments, the flow monitor is further configured for maintaining a second counter, incrementing the second counter responsive to a configuration change of the device, and incrementing the second counter responsive to a configuration change of the device. In other embodiments of the system, the name of the application is an order of magnitude longer than the counter value. In still other embodiments, the flow monitor is further configured for transmitting a device identifier associated with the application. In yet still other embodiments, the flow monitor is further configured for transmitting the data record for re-association with the name of the application by the data collector, based on a mapping of the name of the application to the counter value maintained by the data collector. In still yet other embodiments, the flow monitor is further configured for re-transmitting the counter value and the name of the application responsive to expiration of a timer.

In still another aspect, the present disclosure is directed to a method for application performance measurement. The method includes receiving, by a device, a first document for transmission to a client, the first document comprising instructions for the client to transmit a request for an embedded object. The method also includes generating, by a flow monitor executed by a processor of the device, a unique identification associated with the first document, the unique identification identifying a first access of the first document. The method further includes transmitting, by the device, the first document and unique identification to the client. The method also includes receiving, by the device from the client, a request for the embedded object, the request comprising the unique identification. The method also includes transmitting, by the device to a server, the request for the embedded object at a transmit time. The method further includes receiving, by the device from the server, the embedded object at a receipt time. The method also includes transmitting, by the flow monitor to a data collector, a performance record comprising an identification of the object, the server, the transmit time, the receipt time, and the unique identification.

In one embodiment, the method includes receiving, by the device from the client, a second request for the embedded object, the second request not comprising the unique identification; and identifying, by the flow monitor responsive to the absence of the unique identification, that the second request is not associated with the first access of the first document.

In another embodiment, the method includes receiving, by the device from the client, a second request comprising the unique identification and a second receipt time, the second request transmitted by the client responsive to receipt of the additional object transmitted by the device to the client; and transmitting, to the data collector, the second transmit time and second receipt time for aggregation with the performance record. In a further embodiment, the second request comprises an identification of load time of the first document on the client. In another further embodiment, the second request comprises an identification of render time of the first document on the client.

In some embodiments, the method includes initiating a timer, by the flow monitor, on transmission of the first document and unique identification to the client; and transmitting the timer value to the performance monitor in the performance record. In other embodiments, the method includes receiving, by the device from the client, a second performance record comprising a load time of the first document, a render time of the first document, a time spent on the first document, and the unique identification; and transmitting, by the device to the data collector, the second performance record for aggregation with the first performance record. In a further embodiment of the method, transmitting the second performance record for aggregation with the first performance record includes transmitting the second performance record for combination with the first performance record to generate a single application performance record comprising a timeline of receipt and processing of the first document and the embedded object of the first document.

In some embodiments, the method includes initiating a state machine for the first access of the first document. In a further embodiment, the method includes receiving a second performance record from the client; and disabling the state machine, responsive to receipt of the second performance record.

In yet another aspect, the present disclosure is directed to a system for application performance measurement. The system includes a device, in communication with a client, a server, and a data collector, comprising a processor executing a packet processing engine. The packet processing engine is configured for receiving a first document for transmission to a client, the first document comprising instructions for the client to transmit a request for an embedded object. The packet processing engine is also configured for generating a unique identification associated with the first document, the unique identification identifying a first access of the first document. The packet processing engine is further configured for transmitting the first document and unique identification to the client; and receiving, from the client, a request for the embedded object, the request comprising the unique identification. The packet processing engine is further configured for transmitting, to the server, the request for the embedded object at a transmit time; and receiving, from the server, the embedded object at a receipt time. The packet processing engine is also configured for transmitting, to the data collector, a performance record comprising an identification of the object, the server, the transmit time, the receipt time, and the unique identification.

In some embodiments of the system, the packet processing engine is further configured for receiving, from the client, a second request for the embedded object, the second request not comprising the unique identification; and identifying, responsive to the absence of the unique identification, that the second request is not associated with the first access of the first document. In other embodiments of the system, the packet processing engine is further configured for receiving, from the client, a second request comprising the unique identification and a second receipt time, the second request transmitted by the client responsive to receipt of the additional object transmitted by the device to the client; and transmitting, to the data collector, the second transmit time and second receipt time for aggregation with the performance record. In a further embodiment, the second request comprises an identification of load time of the first document on the client. In another further embodiment, the second request comprises an identification of render time of the first document on the client.

In some embodiments, the packet processing engine is further configured for initiating a timer on transmission of the first document and unique identification to the client, and transmitting the timer value to the data collector in the performance record. In other embodiments, the packet processing engine is further configured for receiving, from the client, a second performance record comprising a load time of the first document, a render time of the first document, a time spent on the first document, and the unique identification; and transmitting, to the performance monitor, the second performance record for aggregation with the first performance record. In a further embodiment, transmitting the second performance record for aggregation with the first performance record includes transmitting the second performance record for combination with the first performance record to generate a single application performance record comprising a timeline of receipt and processing of the first document and the embedded object of the first document.

In some embodiments, the packet processing engine is further configured for initiating a state machine for the first access of the first document. In a further embodiment, the packet processing engine is further configured for receiving a second performance record from the client; and disabling the state machine, responsive to receipt of the second performance record.

The details of various embodiments of the invention are set forth in the accompanying drawings and the description below.

BRIEF DESCRIPTION OF THE FIGURES

The foregoing and other objects, aspects, features, and advantages of the invention will become more apparent and better understood by referring to the following description taken in conjunction with the accompanying drawings, in which:

FIGS. 7-13B are tables of embodiments of data record templates useful for tracking application or transport layer flows;

FIG. 20D is a table of an embodiment of an application render time record.

Figure 1A:
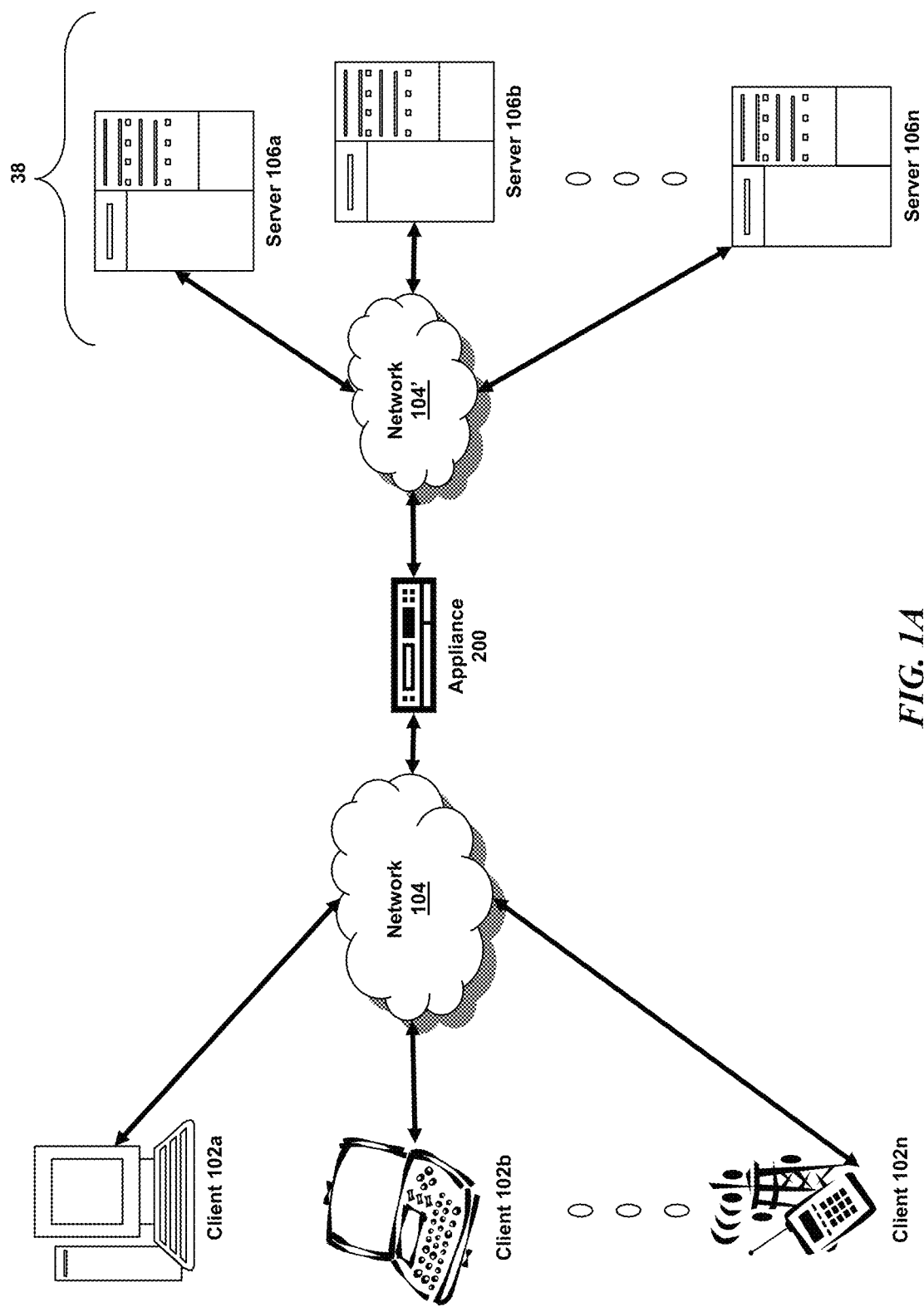
FIG. 1A is a block diagram of an embodiment of a network environment for a client to access a server via an appliance.

The features and advantages of the present invention will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION OF THE INVENTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for accelerating communications between a client and a server;

Section D describes embodiments of systems and methods for virtualizing an application delivery controller;

Section E describes embodiments of systems and methods for providing a multi-core architecture and environment;

Section F describes embodiments of systems and methods for tracking application layer flow via a multi-connection intermediary device;

Section G describes embodiments of systems and methods for monitoring application layer flow of a database application;

Section H describes further embodiments of systems and methods for monitoring application layer flow with a lightweight application identification protocol; and Section I describes embodiments of systems and methods for measurement of application performance.

A. Network and Computing Environment

Prior to discussing the specifics of embodiments of the systems and methods of an appliance and/or client, it may be helpful to discuss the network and computing environments in which such embodiments may be deployed. Referring now to FIG. 1A, an embodiment of a network environment is depicted. In brief overview, the network environment comprises one or more clients 102a-102n (also generally referred to as local machine(s) 102, or client(s) 102) in communication with one or more servers 106a-106n (also generally referred to as server(s) 106, or remote machine(s) 106) via one or more networks 104, 104' (generally referred to as network 104). In some embodiments, a client 102 communicates with a server 106 via an appliance 200.

Although FIG. 1A shows a network 104 and a network 104' between the clients 102 and the servers 106, the clients 102 and the servers 106 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In some embodiments, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 106 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

As shown in FIG. 1A, the appliance 200, which also may be referred to as an interface unit 200 or gateway 200, is shown between the networks 104 and 104'. In some embodiments, the appliance 200 may be located on network 104. For example, a branch office of a corporate enterprise may deploy an appliance 200 at the branch office. In other embodiments, the appliance 200 may be located on network 104'. For example, an appliance 200 may be located at a corporate data center. In yet another embodiment, a plurality of appliances 200 may be deployed on network 104. In some embodiments, a plurality of appliances 200 may be deployed on network 104'. In some embodiments, a first appliance 200 communicates with a second appliance 200'. In other embodiments, the appliance 200 could be a part of any client 102 or server 106 on the same or different network 104,104' as the client 102. One or more appliances 200 may be located at any point in the network or network communications path between a client 102 and a server 106.

In some embodiments, the appliance 200 comprises any of the network devices manufactured by Citrix Systems, Inc. of Ft. Lauderdale Fla., referred to as Citrix NetScaler devices. In other embodiments, the appliance 200 includes any of the product embodiments referred to as WebAccelerator and BigIP manufactured by F5 Networks, Inc. of Seattle, Wash. In another embodiment, the appliance 205 includes any of the DX acceleration device platforms and/or the SSL VPN series of devices, such as SA 700, SA 2000, SA 4000, and SA 6000 devices manufactured by Juniper Networks, Inc. of Sunnyvale, Calif. In yet another embodiment, the appliance 200 includes any application acceleration and/or security related appliances and/or software manufactured by Cisco Systems, Inc. of San Jose, Calif., such as the Cisco ACE Application Control Engine Module service software and network modules, and Cisco AVS Series Application Velocity System.

In some embodiments, the system may include multiple, logically-grouped servers 106. In these embodiments, the logical group of servers may be referred to as a server farm 38. In some of these embodiments, the serves 106 may be geographically dispersed. In some cases, a farm 38 may be administered as a single entity. In other embodiments, the server farm 38 comprises a plurality of server farms 38. In some embodiments, the server farm executes one or more applications on behalf of one or more clients 102.

The servers 106 within each farm 38 can be heterogeneous. One or more of the servers 106 can operate according to one type of operating system platform (e.g., WINDOWS NT, manufactured by Microsoft Corp. of Redmond, Wash.), while one or more of the other servers 106 can operate on according to another type of operating system platform (e.g., Unix or Linux). The servers 106 of each farm 38 do not need to be physically proximate to another server 106 in the same farm 38. Thus, the group of servers 106 logically grouped as a farm 38 may be interconnected using a wide-area network (WAN) connection or medium-area network (MAN) connection. For example, a farm 38 may include servers 106 physically located in different continents or different regions of a continent, country, state, city, campus, or room. Data transmission speeds between servers 106 in the farm 38 can be increased if the servers 106 are connected using a local-area network (LAN) connection or some form of direct connection.

Servers 106 may be referred to as a file server, application server, web server, proxy server, or gateway server. In some embodiments, a server 106 may have the capacity to function as either an application server or as a master application server. In some embodiments, a server 106 may include an Active Directory. The clients 102 may also be referred to as client nodes or endpoints. In some embodiments, a client 102 has the capacity to function as both a client node seeking access to applications on a server and as an application server providing access to hosted applications for other clients 102a-102n.

In some embodiments, a client 102 communicates with a server 106. In some embodiments, the client 102 communicates directly with one of the servers 106 in a farm 38. In another embodiment, the client 102 executes a program neighborhood application to communicate with a server 106 in a farm 38. In still another embodiment, the server 106 provides the functionality of a master node. In some embodiments, the client 102 communicates with the server 106 in the farm 38 through a network 104. Over the network 104, the client 102 can, for example, request execution of various applications hosted by the servers 106a-106n in the farm 38 and receive output of the results of the application execution for display. In some embodiments, only the master node provides the functionality required to identify and provide address information associated with a server 106' hosting a requested application.

In some embodiments, the server 106 provides functionality of a web server. In another embodiment, the server 106a receives requests from the client 102, forwards the requests to a second server 106b and responds to the request by the client 102 with a response to the request from the server 106b. In still another embodiment, the server 106 acquires an enumeration of applications available to the client 102 and address information associated with a server 106 hosting an application identified by the enumeration of applications. In yet another embodiment, the server 106 presents the response to the request to the client 102 using a web interface. In some embodiments, the client 102 communicates directly with the server 106 to access the identified application. In another embodiment, the client 102 receives application output data, such as display data, generated by an execution of the identified application on the server 106.

Figure 1B:
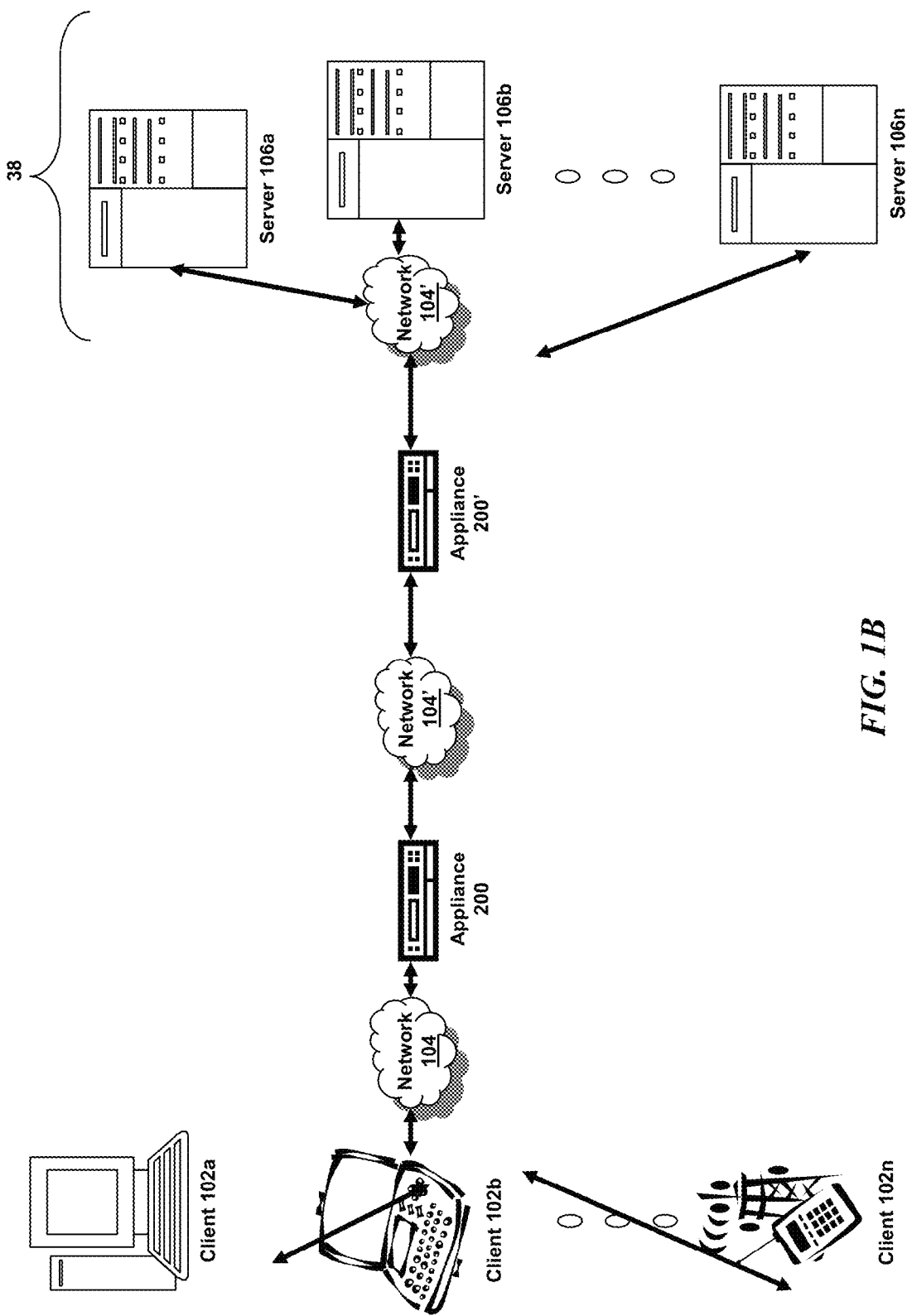
FIG. 1B is a block diagram of an embodiment of an environment for delivering a computing environment from a server to a client via an appliance.
Figure 1C:
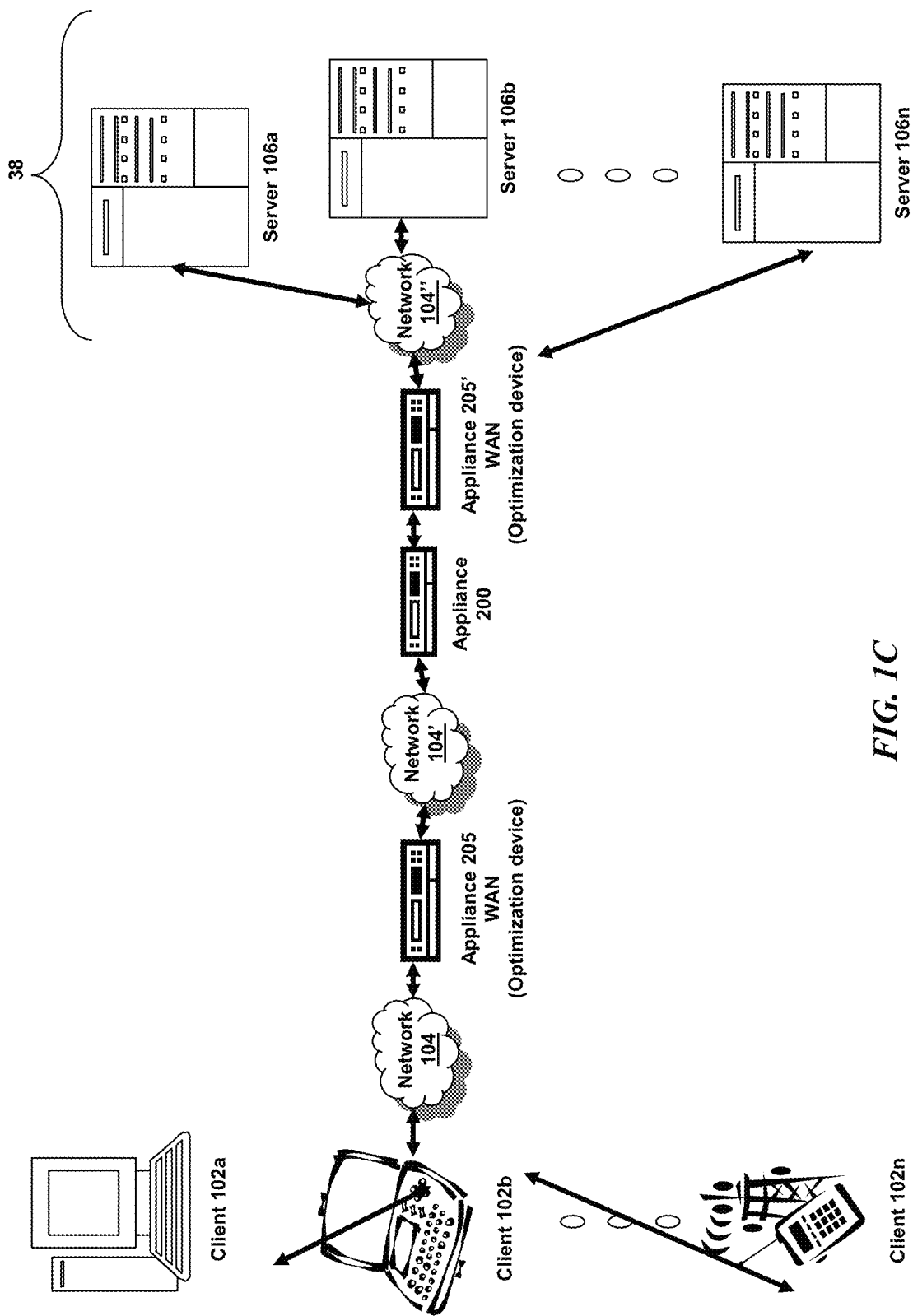
FIG. 1C is a block diagram of another embodiment of an environment for delivering a computing environment from a server to a client via an appliance.

Referring now to FIG. 1B, an embodiment of a network environment deploying multiple appliances 200 is depicted. A first appliance 200 may be deployed on a first network 104 and a second appliance 200' on a second network 104'. For example a corporate enterprise may deploy a first appliance 200 at a branch office and a second appliance 200' at a data center. In another embodiment, the first appliance 200 and second appliance 200' are deployed on the same network 104 or network 104. For example, a first appliance 200 may be deployed for a first server farm 38, and a second appliance 200 may be deployed for a second server farm 38'. In another example, a first appliance 200 may be deployed at a first branch office while the second appliance 200' is deployed at a second branch office'. In some embodiments, the first appliance 200 and second appliance 200' work in cooperation or in conjunction with each other to accelerate network traffic or the delivery of application and data between a client and a server Referring now to FIG. 1C, another embodiment of a network environment deploying the appliance 200 with one or more other types of appliances, such as between one or more WAN optimization appliance 205, 205' is depicted. For example a first WAN optimization appliance 205 is shown between networks 104 and 104' and a second WAN optimization appliance 205' may be deployed between the appliance 200 and one or more servers 106. By way of example, a corporate enterprise may deploy a first WAN optimization appliance 205 at a branch office and a second WAN optimization appliance 205' at a data center. In some embodiments, the appliance 205 may be located on network 104'. In other embodiments, the appliance 205' may be located on network 104. In some embodiments, the appliance 205'may be located on network 104' or network 104". In some embodiments, the appliance 205 and 205' are on the same network. In another embodiment, the appliance 205 and 205' are on different networks. In another example, a first WAN optimization appliance 205 may be deployed for a first server farm 38 and a second WAN optimization appliance 205' for a second server farm 38'

In some embodiments, the appliance 205 is a device for accelerating, optimizing or otherwise improving the performance, operation, or quality of service of any type and form of network traffic, such as traffic to and/or from a WAN connection. In some embodiments, the appliance 205 is a performance enhancing proxy. In other embodiments, the appliance 205 is any type and form of WAN optimization or acceleration device, sometimes also referred to as a WAN optimization controller. In some embodiments, the appliance 205 is any of the product embodiments referred to as WANScaler manufactured by Citrix Systems, Inc. of Ft. Lauderdale, Fla. In other embodiments, the appliance 205 includes any of the product embodiments referred to as BIG-IP link controller and WANjet manufactured by F5 Networks, Inc. of Seattle, Wash. In another embodiment, the appliance 205 includes any of the WX and WXC WAN acceleration device platforms manufactured by Juniper Networks, Inc. of Sunnyvale, Calif. In some embodiments, the appliance 205 includes any of the steelhead line of WAN optimization appliances manufactured by Riverbed Technology of San Francisco, Calif. In other embodiments, the appliance 205 includes any of the WAN related devices manufactured by Expand Networks Inc. of Roseland, N.J. In some embodiments, the appliance 205 includes any of the WAN related appliances manufactured by Packeteer Inc. of Cupertino, Calif., such as the PacketShaper, iShared, and SkyX product embodiments provided by Packeteer. In yet another embodiment, the appliance 205 includes any WAN related appliances and/or software manufactured by Cisco Systems, Inc. of San Jose, Calif., such as the Cisco Wide Area Network Application Services software and network modules, and Wide Area Network engine appliances.

In some embodiments, the appliance 205 provides application and data acceleration services for branch-office or remote offices. In some embodiments, the appliance 205 includes optimization of Wide Area File Services (WAFS). In another embodiment, the appliance 205 accelerates the delivery of files, such as via the Common Internet File System (CIFS) protocol. In other embodiments, the appliance 205 provides caching in memory and/or storage to accelerate delivery of applications and data. In some embodiments, the appliance 205 provides compression of network traffic at any level of the network stack or at any protocol or network layer. In another embodiment, the appliance 205 provides transport layer protocol optimizations, flow control, performance enhancements or modifications and/or management to accelerate delivery of applications and data over a WAN connection. For example, In some embodiments, the appliance 205 provides Transport Control Protocol (TCP) optimizations. In other embodiments, the appliance 205 provides optimizations, flow control, performance enhancements or modifications and/or management for any session or application layer protocol.

In another embodiment, the appliance 205 encoded any type and form of data or information into custom or standard TCP and/or IP header fields or option fields of network packet to announce presence, functionality or capability to another appliance 205'. In another embodiment, an appliance 205' may communicate with another appliance 205' using data encoded in both TCP and/or IP header fields or options. For example, the appliance may use TCP option(s) or IP header fields or options to communicate one or more parameters to be used by the appliances 205, 205' in performing functionality, such as WAN acceleration, or for working in conjunction with each other.

In some embodiments, the appliance 200 preserves any of the information encoded in TCP and/or IP header and/or option fields communicated between appliances 205 and 205'. For example, the appliance 200 may terminate a transport layer connection traversing the appliance 200, such as a transport layer connection from between a client and a server traversing appliances 205 and 205'. In some embodiments, the appliance 200 identifies and preserves any encoded information in a transport layer packet transmitted by a first appliance 205 via a first transport layer connection and communicates a transport layer packet with the encoded information to a second appliance 205' via a second transport layer connection.

Figure 1D:
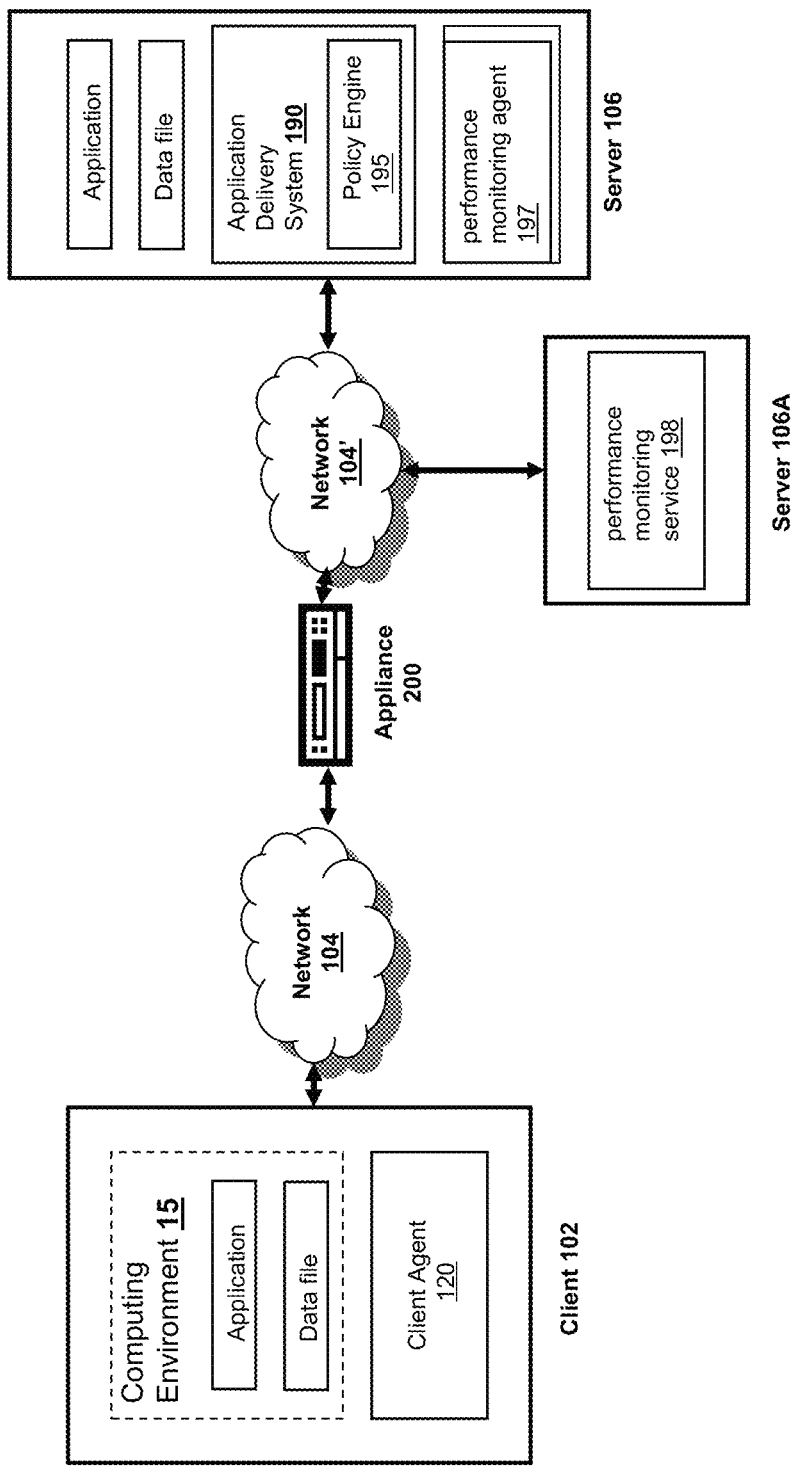
FIG. 1D is a block diagram of another embodiment of an environment for delivering a computing environment from a server to a client via an appliance.

Referring now to FIG. 1D, a network environment for delivering and/or operating a computing environment on a client 102 is depicted. In some embodiments, a server 106 includes an application delivery system 190 for delivering a computing environment or an application and/or data file to one or more clients 102. In brief overview, a client 10 is in communication with a server 106 via network 104, 104' and appliance 200. For example, the client 102 may reside in a remote office of a company, e.g., a branch office, and the server 106 may reside at a corporate data center. The client 102 comprises a client agent 120, and a computing environment 15. The computing environment 15 may execute or operate an application that accesses, processes or uses a data file. The computing environment 15, application and/or data file may be delivered via the appliance 200 and/or the server 106.

In some embodiments, the appliance 200 accelerates delivery of a computing environment 15, or any portion thereof, to a client 102. In some embodiments, the appliance 200 accelerates the delivery of the computing environment 15 by the application delivery system 190. For example, the embodiments described herein may be used to accelerate delivery of a streaming application and data file processable by the application from a central corporate data center to a remote user location, such as a branch office of the company. In another embodiment, the appliance 200 accelerates transport layer traffic between a client 102 and a server 106. The appliance 200 may provide acceleration techniques for accelerating any transport layer payload from a server 106 to a client 102, such as: 1) transport layer connection pooling, 2) transport layer connection multiplexing, 3) transport control protocol buffering, 4) compression and 5) caching. In some embodiments, the appliance 200 provides load balancing of servers 106 in responding to requests from clients 102. In other embodiments, the appliance 200 acts as a proxy or access server to provide access to the one or more servers 106. In another embodiment, the appliance 200 provides a secure virtual private network connection from a first network 104 of the client 102 to the second network 104' of the server 106, such as an SSL VPN connection. It yet other embodiments, the appliance 200 provides application firewall security, control and management of the connection and communications between a client 102 and a server 106.

In some embodiments, the application delivery management system 190 provides application delivery techniques to deliver a computing environment to a desktop of a user, remote or otherwise, based on a plurality of execution methods and based on any authentication and authorization policies applied via a policy engine 195. With these techniques, a remote user may obtain a computing environment and access to server stored applications and data files from any network connected device 100. In some embodiments, the application delivery system 190 may reside or execute on a server 106. In another embodiment, the application delivery system 190 may reside or execute on a plurality of servers 106a-106n. In some embodiments, the application delivery system 190 may execute in a server farm 38. In some embodiments, the server 106 executing the application delivery system 190 may also store or provide the application and data file. In another embodiment, a first set of one or more servers 106 may execute the application delivery system 190, and a different server 106n may store or provide the application and data file. In some embodiments, each of the application delivery system 190, the application, and data file may reside or be located on different servers. In yet another embodiment, any portion of the application delivery system 190 may reside, execute or be stored on or distributed to the appliance 200, or a plurality of appliances.

The client 102 may include a computing environment 15 for executing an application that uses or processes a data file. The client 102 via networks 104, 104' and appliance 200 may request an application and data file from the server 106. In some embodiments, the appliance 200 may forward a request from the client 102 to the server 106. For example, the client 102 may not have the application and data file stored or accessible locally. In response to the request, the application delivery system 190 and/or server 106 may deliver the application and data file to the client 102. For example, In some embodiments, the server 106 may transmit the application as an application stream to operate in computing environment 15 on client 102.

In some embodiments, the application delivery system 190 comprises any portion of the Citrix Access Suite™ by Citrix Systems, Inc., such as the MetaFrame or Citrix Presentation Server™ and/or any of the Microsoft® Windows Terminal Services manufactured by the Microsoft Corporation. In some embodiments, the application delivery system 190 may deliver one or more applications to clients 102 or users via a remote-display protocol or otherwise via remote-based or server-based computing. In another embodiment, the application delivery system 190 may deliver one or more applications to clients or users via steaming of the application.

In some embodiments, the application delivery system 190 includes a policy engine 195 for controlling and managing the access to, selection of application execution methods and the delivery of applications. In some embodiments, the policy engine 195 determines the one or more applications a user or client 102 may access. In another embodiment, the policy engine 195 determines how the application should be delivered to the user or client 102, e.g., the method of execution. In some embodiments, the application delivery system 190 provides a plurality of delivery techniques from which to select a method of application execution, such as a server-based computing, streaming or delivering the application locally to the client 120 for local execution.

In some embodiments, a client 102 requests execution of an application program and the application delivery system 190 comprising a server 106 selects a method of executing the application program. In some embodiments, the server 106 receives credentials from the client 102. In another embodiment, the server 106 receives a request for an enumeration of available applications from the client 102. In some embodiments, in response to the request or receipt of credentials, the application delivery system 190 enumerates a plurality of application programs available to the client 102. The application delivery system 190 receives a request to execute an enumerated application. The application delivery system 190 selects one of a predetermined number of methods for executing the enumerated application, for example, responsive to a policy of a policy engine. The application delivery system 190 may select a method of execution of the application enabling the client 102 to receive application-output data generated by execution of the application program on a server 106. The application delivery system 190 may select a method of execution of the application enabling the local machine 10 to execute the application program locally after retrieving a plurality of application files comprising the application. In yet another embodiment, the application delivery system 190 may select a method of execution of the application to stream the application via the network 104 to the client 102.

A client 102 may execute, operate or otherwise provide an application, which can be any type and/or form of software, program, or executable instructions such as any type and/or form of web browser, web-based client, client-server application, a thin-client computing client, an ActiveX control, or a Java applet, or any other type and/or form of executable instructions capable of executing on client 102. In some embodiments, the application may be a server-based or a remote-based application executed on behalf of the client 102 on a server 106. In one embodiments the server 106 may display output to the client 102 using any thin-client or remote-display protocol, such as the Independent Computing Architecture (ICA) protocol manufactured by Citrix Systems, Inc. of Ft. Lauderdale, Fla. or the Remote Desktop Protocol (RDP) manufactured by the Microsoft Corporation of Redmond, Wash. The application can use any type of protocol and it can be, for example, an HTTP client, an FTP client, an Oscar client, or a Telnet client. In other embodiments, the application comprises any type of software related to VoIP communications, such as a soft IP telephone. In further embodiments, the application comprises any application related to real-time data communications, such as applications for streaming video and/or audio.

In some embodiments, the server 106 or a server farm 38 may be running one or more applications, such as an application providing a thin-client computing or remote display presentation application. In some embodiments, the server 106 or server farm 38 executes as an application, any portion of the Citrix Access Suite™ by Citrix Systems, Inc., such as the MetaFrame or Citrix Presentation Server™, and/or any of the Microsoft® Windows Terminal Services manufactured by the Microsoft Corporation. In some embodiments, the application is an ICA client, developed by Citrix Systems, Inc. of Fort Lauderdale, Fla. In other embodiments, the application includes a Remote Desktop (RDP) client, developed by Microsoft Corporation of Redmond, Wash. Also, the server 106 may run an application, which for example, may be an application server providing email services such as Microsoft Exchange manufactured by the Microsoft Corporation of Redmond, Wash., a web or Internet server, or a desktop sharing server, or a collaboration server. In some embodiments, any of the applications may comprise any type of hosted service or products, such as GoToMeeting™ provided by Citrix Online Division, Inc. of Santa Barbara, California, WebEx™ provided by WebEx, Inc. of Santa Clara, Calif., or Microsoft Office Live Meeting provided by Microsoft Corporation of Redmond, Wash.

Still referring to FIG. 1D, an embodiment of the network environment may include a monitoring server 106A. The monitoring server 106A may include any type and form performance monitoring service 198. The performance monitoring service 198 may include monitoring, measurement and/or management software and/or hardware, including data collection, aggregation, analysis, management and reporting. In some embodiments, the performance monitoring service 198 includes one or more monitoring agents 197. The monitoring agent 197 includes any software, hardware or combination thereof for performing monitoring, measurement and data collection activities on a device, such as a client 102, server 106 or an appliance 200, 205. In some embodiments, the monitoring agent 197 includes any type and form of script, such as Visual Basic script, or Javascript. In some embodiments, the monitoring agent 197 executes transparently to any application and/or user of the device. In some embodiments, the monitoring agent 197 is installed and operated unobtrusively to the application or client. In yet another embodiment, the monitoring agent 197 is installed and operated without any instrumentation for the application or device.

In some embodiments, the monitoring agent 197 monitors, measures and collects data on a predetermined frequency. In other embodiments, the monitoring agent 197 monitors, measures and collects data based upon detection of any type and form of event. For example, the monitoring agent 197 may collect data upon detection of a request for a web page or receipt of an HTTP response. In another example, the monitoring agent 197 may collect data upon detection of any user input events, such as a mouse click. The monitoring agent 197 may report or provide any monitored, measured or collected data to the monitoring service 198. In some embodiments, the monitoring agent 197 transmits information to the monitoring service 198 according to a schedule or a predetermined frequency. In another embodiment, the monitoring agent 197 transmits information to the monitoring service 198 upon detection of an event.

In some embodiments, the monitoring service 198 and/or monitoring agent 197 performs monitoring and performance measurement of any network resource or network infrastructure element, such as a client, server, server farm, appliance 200, appliance 205, or network connection. In some embodiments, the monitoring service 198 and/or monitoring agent 197 performs monitoring and performance measurement of any transport layer connection, such as a TCP or UDP connection. In another embodiment, the monitoring service 198 and/or monitoring agent 197 monitors and measures network latency. In yet one embodiment, the monitoring service 198 and/or monitoring agent 197 monitors and measures bandwidth utilization.

In other embodiments, the monitoring service 198 and/or monitoring agent 197 monitors and measures end-user response times. In some embodiments, the monitoring service 198 performs monitoring and performance measurement of an application. In another embodiment, the monitoring service 198 and/or monitoring agent 197 performs monitoring and performance measurement of any session or connection to the application. In some embodiments, the monitoring service 198 and/or monitoring agent 197 monitors and measures performance of a browser. In another embodiment, the monitoring service 198 and/or monitoring agent 197 monitors and measures performance of HTTP based transactions. In some embodiments, the monitoring service 198 and/or monitoring agent 197 monitors and measures performance of a Voice over IP (VoIP) application or session. In other embodiments, the monitoring service 198 and/or monitoring agent 197 monitors and measures performance of a remote display protocol application, such as an ICA client or RDP client. In yet another embodiment, the monitoring service 198 and/or monitoring agent 197 monitors and measures performance of any type and form of streaming media. In still a further embodiment, the monitoring service 198 and/or monitoring agent 197 monitors and measures performance of a hosted application or a Software-As-A-Service (SaaS) delivery model.

In some embodiments, the monitoring service 198 and/or monitoring agent 197 performs monitoring and performance measurement of one or more transactions, requests or responses related to application. In other embodiments, the monitoring service 198 and/or monitoring agent 197 monitors and measures any portion of an application layer stack, such as any .NET or J2EE calls. In some embodiments, the monitoring service 198 and/or monitoring agent 197 monitors and measures database or SQL transactions. In yet another embodiment, the monitoring service 198 and/or monitoring agent 197 monitors and measures any method, function or application programming interface (API) call.

In some embodiments, the monitoring service 198 and/or monitoring agent 197 performs monitoring and performance measurement of a delivery of application and/or data from a server to a client via one or more appliances, such as appliance 200 and/or appliance 205. In some embodiments, the monitoring service 198 and/or monitoring agent 197 monitors and measures performance of delivery of a virtualized application. In other embodiments, the monitoring service 198 and/or monitoring agent 197 monitors and measures performance of delivery of a streaming application. In another embodiment, the monitoring service 198 and/or monitoring agent 197 monitors and measures performance of delivery of a desktop application to a client and/or the execution of the desktop application on the client. In another embodiment, the monitoring service 198 and/or monitoring agent 197 monitors and measures performance of a client/server application.

In some embodiments, the monitoring service 198 and/or monitoring agent 197 is designed and constructed to provide application performance management for the application delivery system 190. For example, the monitoring service 198 and/or monitoring agent 197 may monitor, measure and manage the performance of the delivery of applications via the Citrix Presentation Server. In this example, the monitoring service 198 and/or monitoring agent 197 monitors individual ICA sessions. The monitoring service 198 and/or monitoring agent 197 may measure the total and per session system resource usage, as well as application and networking performance. The monitoring service 198 and/or monitoring agent 197 may identify the active servers for a given user and/or user session. In some embodiments, the monitoring service 198 and/or monitoring agent 197 monitors back-end connections between the application delivery system 190 and an application and/or database server. The monitoring service 198 and/or monitoring agent 197 may measure network latency, delay and volume per user-session or ICA session.

In some embodiments, the monitoring service 198 and/or monitoring agent 197 measures and monitors memory usage for the application delivery system 190, such as total memory usage, per user session and/or per process. In other embodiments, the monitoring service 198 and/or monitoring agent 197 measures and monitors CPU usage the application delivery system 190, such as total CPU usage, per user session and/or per process. In another embodiments, the monitoring service 198 and/or monitoring agent 197 measures and monitors the time required to log-in to an application, a server, or the application delivery system, such as Citrix Presentation Server. In some embodiments, the monitoring service 198 and/or monitoring agent 197 measures and monitors the duration a user is logged into an application, a server, or the application delivery system 190. In some embodiments, the monitoring service 198 and/or monitoring agent 197 measures and monitors active and inactive session counts for an application, server or application delivery system session. In yet another embodiment, the monitoring service 198 and/or monitoring agent 197 measures and monitors user session latency.

In yet further embodiments, the monitoring service 198 and/or monitoring agent 197 measures and monitors measures and monitors any type and form of server metrics. In some embodiments, the monitoring service 198 and/or monitoring agent 197 measures and monitors metrics related to system memory, CPU usage, and disk storage. In another embodiment, the monitoring service 198 and/or monitoring agent 197 measures and monitors metrics related to page faults, such as page faults per second. In other embodiments, the monitoring service 198 and/or monitoring agent 197 measures and monitors round-trip time metrics. In yet another embodiment, the monitoring service 198 and/or monitoring agent 197 measures and monitors metrics related to application crashes, errors and/or hangs.

In some embodiments, the monitoring service 198 and monitoring agent 198 includes any of the product embodiments referred to as EdgeSight manufactured by Citrix Systems, Inc. of Ft. Lauderdale, Fla. In another embodiment, the performance monitoring service 198 and/or monitoring agent 198 includes any portion of the product embodiments referred to as the TrueView product suite manufactured by the Symphoniq Corporation of Palo Alto, Calif. In some embodiments, the performance monitoring service 198 and/or monitoring agent 198 includes any portion of the product embodiments referred to as the TeaLeaf CX product suite manufactured by the TeaLeaf Technology Inc. of San Francisco, Calif. In other embodiments, the performance monitoring service 198 and/or monitoring agent 198 includes any portion of the business service management products, such as the BMC Performance Manager and Patrol products, manufactured by BMC Software, Inc. of Houston, Tex.

Figure 1E:
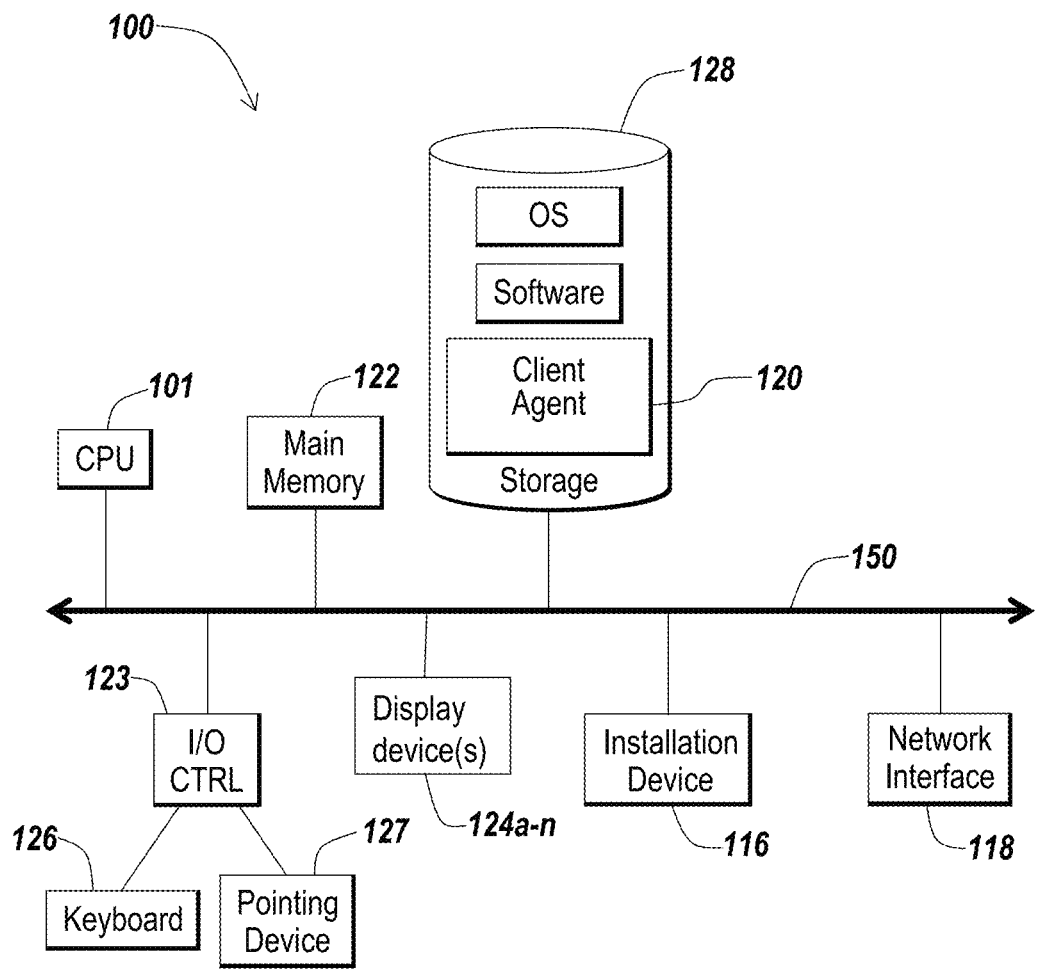
FIGS. 1E-1H are block diagrams of embodiments of a computing device.
Figure 1F:
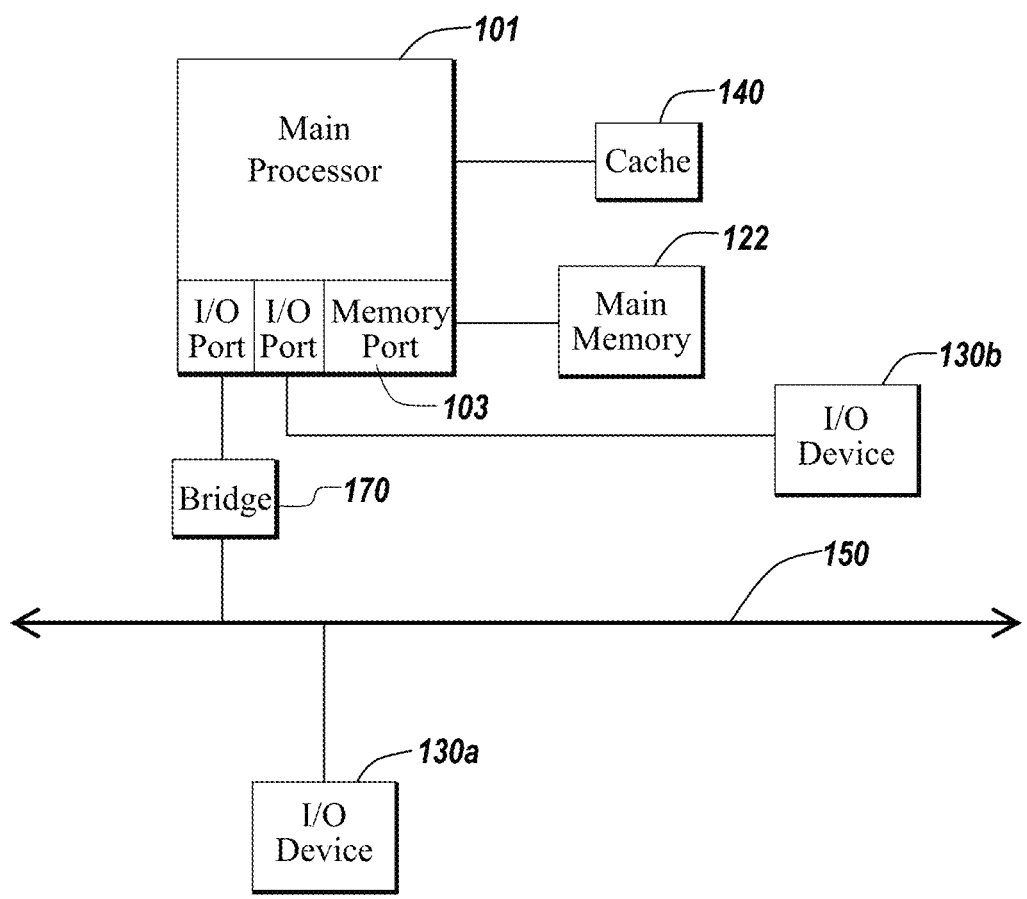

The client 102, server 106, and appliance 200 may be deployed as and/or executed on any type and form of computing device, such as a computer, network device or appliance capable of communicating on any type and form of network and performing the operations described herein. FIGS. 1E and 1F depict block diagrams of a computing device 100 useful for practicing an embodiment of the client 102, server 106 or appliance 200. As shown in FIGS. 1E and 1F, each computing device 100 includes a central processing unit 101, and a main memory unit 122. As shown in FIG. 1E, a computing device 100 may include a visual display device 124, a keyboard 126 and/or a pointing device 127, such as a mouse. Each computing device 100 may also include additional optional elements, such as one or more input/output devices 130a-130b (generally referred to using reference numeral 130), and a cache memory 140 in communication with the central processing unit 101.

The central processing unit 101 is any logic circuitry that responds to and processes instructions fetched from the main memory unit 122. In many embodiments, the central processing unit is provided by a microprocessor unit, such as: those manufactured by Intel Corporation of Mountain View, Calif.; those manufactured by Motorola Corporation of Schaumburg, Ill.; those manufactured by Transmeta Corporation of Santa Clara, Calif.; the RS/6000 processor, those manufactured by International Business Machines of White Plains, N.Y.; or those manufactured by Advanced Micro Devices of Sunnyvale, Calif. The computing device 100 may be based on any of these processors, or any other processor capable of operating as described herein.

Main memory unit 122 may be one or more memory chips capable of storing data and allowing any storage location to be directly accessed by the microprocessor 101, such as Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), or Ferroelectric RAM (FRAM). The main memory 122 may be based on any of the above described memory chips, or any other available memory chips capable of operating as described herein. In the embodiment shown in FIG. 1E, the processor 101 communicates with main memory 122 via a system bus 150 (described in more detail below). FIG. 1F depicts an embodiment of a computing device 100 in which the processor communicates directly with main memory 122 via a memory port 103. For example, in FIG. 1F the main memory 122 may be DRDRAM.

FIG. 1F depicts an embodiment in which the main processor 101 communicates directly with cache memory 140 via a secondary bus, sometimes referred to as a backside bus. In other embodiments, the main processor 101 communicates with cache memory 140 using the system bus 150. Cache memory 140 typically has a faster response time than main memory 122 and is typically provided by SRAM, BSRAM, or EDRAM. In the embodiment shown in FIG. 1F, the processor 101 communicates with various I/O devices 130 via a local system bus 150. Various busses may be used to connect the central processing unit 101 to any of the I/O devices 130, including a VESA VL bus, an ISA bus, an EISA bus, a MicroChannel Architecture (MCA) bus, a PCI bus, a PCI-X bus, a PCI-Express bus, or a NuBus. For embodiments in which the I/O device is a video display 124, the processor 101 may use an Advanced Graphics Port (AGP) to communicate with the display 124. FIG. 1F depicts an embodiment of a computer 100 in which the main processor 101 communicates directly with I/O device 130b via HyperTransport, Rapid I/O, or InfiniBand. FIG. 1F also depicts an embodiment in which local busses and direct communication are mixed: the processor 101 communicates with I/O device 130b using a local interconnect bus while communicating with I/O device 130a directly.

The computing device 100 may support any suitable installation device 116, such as a floppy disk drive for receiving floppy disks such as 3.5-inch, 5.25-inch disks or ZIP disks, a CD-ROM drive, a CD-R/RW drive, a DVD-ROM drive, tape drives of various formats, USB device, hard-drive or any other device suitable for installing software and programs such as any client agent 120, or portion thereof. The computing device 100 may further comprise a storage device 128, such as one or more hard disk drives or redundant arrays of independent disks, for storing an operating system and other related software, and for storing application software programs such as any program related to the client agent 120. Optionally, any of the installation devices 116 could also be used as the storage device 128. Additionally, the operating system and the software can be run from a bootable medium, for example, a bootable CD, such as KNOPPIX®, a bootable CD for GNU/Linux that is available as a GNU/Linux distribution from knoppix.net.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 100 to any type of network capable of communication and performing the operations described herein. A wide variety of I/O devices 130a-130n may be present in the computing device 100. Input devices include keyboards, mice, trackpads, trackballs, microphones, and drawing tablets. Output devices include video displays, speakers, inkjet printers, laser printers, and dye-sublimation printers. The I/O devices 130 may be controlled by an I/O controller 123 as shown in FIG. 1E. The I/O controller may control one or more I/O devices such as a keyboard 126 and a pointing device 127, e.g., a mouse or optical pen. Furthermore, an I/O device may also provide storage 128 and/or an installation medium 116 for the computing device 100. In still other embodiments, the computing device 100 may provide USB connections to receive handheld USB storage devices such as the USB Flash Drive line of devices manufactured by Twintech Industry, Inc. of Los Alamitos, California.

In some embodiments, the computing device 100 may comprise or be connected to multiple display devices 124a-124n, which each may be of the same or different type and/or form. As such, any of the I/O devices 130a-130n and/or the I/O controller 123 may comprise any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In some embodiments, a video adapter may comprise multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices, such as computing devices 100a and 100b connected to the computing device 100, for example, via a network. These embodiments may include any type of software designed and constructed to use another computer's display device as a second display device 124a for the computing device 100. One ordinarily skilled in the art will recognize and appreciate the various ways and embodiments that a computing device 100 may be configured to have multiple display devices 124a-124n.

In further embodiments, an I/O device 130 may be a bridge 170 between the system bus 150 and an external communication bus, such as a USB bus, an Apple Desktop Bus, an RS-232 serial connection, a SCSI bus, a FireWire bus, a FireWire 800 bus, an Ethernet bus, an AppleTalk bus, a Gigabit Ethernet bus, an Asynchronous Transfer Mode bus, a HIPPI bus, a Super HIPPI bus, a SerialPlus bus, a SCI/LAMP bus, a FibreChannel bus, or a Serial Attached small computer system interface bus.

A computing device 100 of the sort depicted in FIGS. 1E and 1F typically operate under the control of operating systems, which control scheduling of tasks and access to system resources. The computing device 100 can be running any operating system such as any of the versions of the Microsoft® Windows operating systems, the different releases of the Unix and Linux operating systems, any version of the Mac OS® for Macintosh computers, any embedded operating system, any real-time operating system, any open source operating system, any proprietary operating system, any operating systems for mobile computing devices, or any other operating system capable of running on the computing device and performing the operations described herein. Typical operating systems include: WINDOWS 3.x, WINDOWS 95, WINDOWS 98, WINDOWS 2000, WINDOWS NT 3.51, WINDOWS NT 4.0, WINDOWS CE, and WINDOWS XP, all of which are manufactured by Microsoft Corporation of Redmond, Wash.; MacOS, manufactured by Apple Computer of Cupertino, California; OS/2, manufactured by International Business Machines of Armonk, N.Y.; and Linux, a freely-available operating system distributed by Caldera Corp. of Salt Lake City, Utah, or any type and/or form of a Unix operating system, among others.

In other embodiments, the computing device 100 may have different processors, operating systems, and input devices consistent with the device. For example, in one embodiment the computer 100 is a Treo 180, 270, 1060, 600 or 650 smart phone manufactured by Palm, Inc. In this embodiment, the Treo smart phone is operated under the control of the PalmOS operating system and includes a stylus input device as well as a five-way navigator device. Moreover, the computing device 100 can be any workstation, desktop computer, laptop or notebook computer, server, handheld computer, mobile telephone, any other computer, or other form of computing or telecommunications device that is capable of communication and that has sufficient processor power and memory capacity to perform the operations described herein.

Figure 1G:
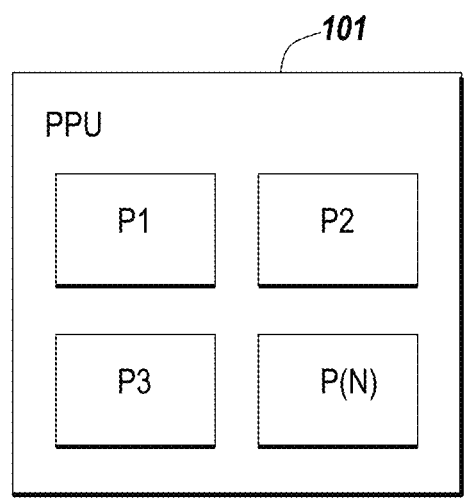

As shown in FIG. 1G, the computing device 100 may comprise multiple processors and may provide functionality for simultaneous execution of instructions or for simultaneous execution of one instruction on more than one piece of data. In some embodiments, the computing device 100 may comprise a parallel processor with one or more cores. In one of these embodiments, the computing device 100 is a shared memory parallel device, with multiple processors and/or multiple processor cores, accessing all available memory as a single global address space. In another of these embodiments, the computing device 100 is a distributed memory parallel device with multiple processors each accessing local memory only. In still another of these embodiments, the computing device 100 has both some memory which is shared and some memory which can only be accessed by particular processors or subsets of processors. In still even another of these embodiments, the computing device 100, such as a multi-core microprocessor, combines two or more independent processors into a single package, often a single integrated circuit (IC). In yet another of these embodiments, the computing device 100 includes a chip having a CELL BROADBAND ENGINE architecture and including a Power processor element and a plurality of synergistic processing elements, the Power processor element and the plurality of synergistic processing elements linked together by an internal high speed bus, which may be referred to as an element interconnect bus.

In some embodiments, the processors provide functionality for execution of a single instruction simultaneously on multiple pieces of data (SIMD). In other embodiments, the processors provide functionality for execution of multiple instructions simultaneously on multiple pieces of data (MIMD). In still other embodiments, the processor may use any combination of SIMD and MIMD cores in a single device.

Figure 1H:
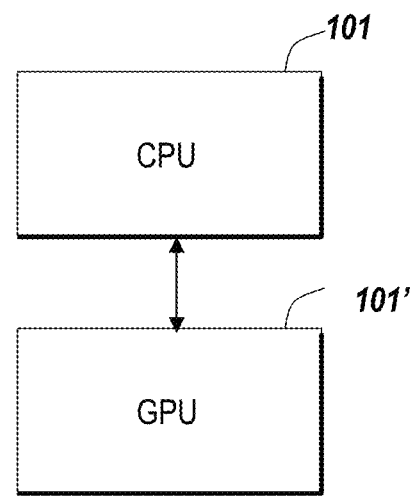

In some embodiments, the computing device 100 may comprise a graphics processing unit. In one of these embodiments, depicted in FIG. 1H, the computing device 100 includes at least one central processing unit 101 and at least one graphics processing unit. In another of these embodiments, the computing device 100 includes at least one parallel processing unit and at least one graphics processing unit. In still another of these embodiments, the computing device 100 includes a plurality of processing units of any type, one of the plurality of processing units comprising a graphics processing unit.

In some embodiments, a first computing device 100a executes an application on behalf of a user of a client computing device 100b. In other embodiments, a computing device 100a executes a virtual machine, which provides an execution session within which applications execute on behalf of a user or a client computing devices 100b. In one of these embodiments, the execution session is a hosted desktop session. In another of these embodiments, the computing device 100 executes a terminal services session. The terminal services session may provide a hosted desktop environment. In still another of these embodiments, the execution session provides access to a computing environment, which may comprise one or more of: an application, a plurality of applications, a desktop application, and a desktop session in which one or more applications may execute.

B. Appliance Architecture

Figure 2A:
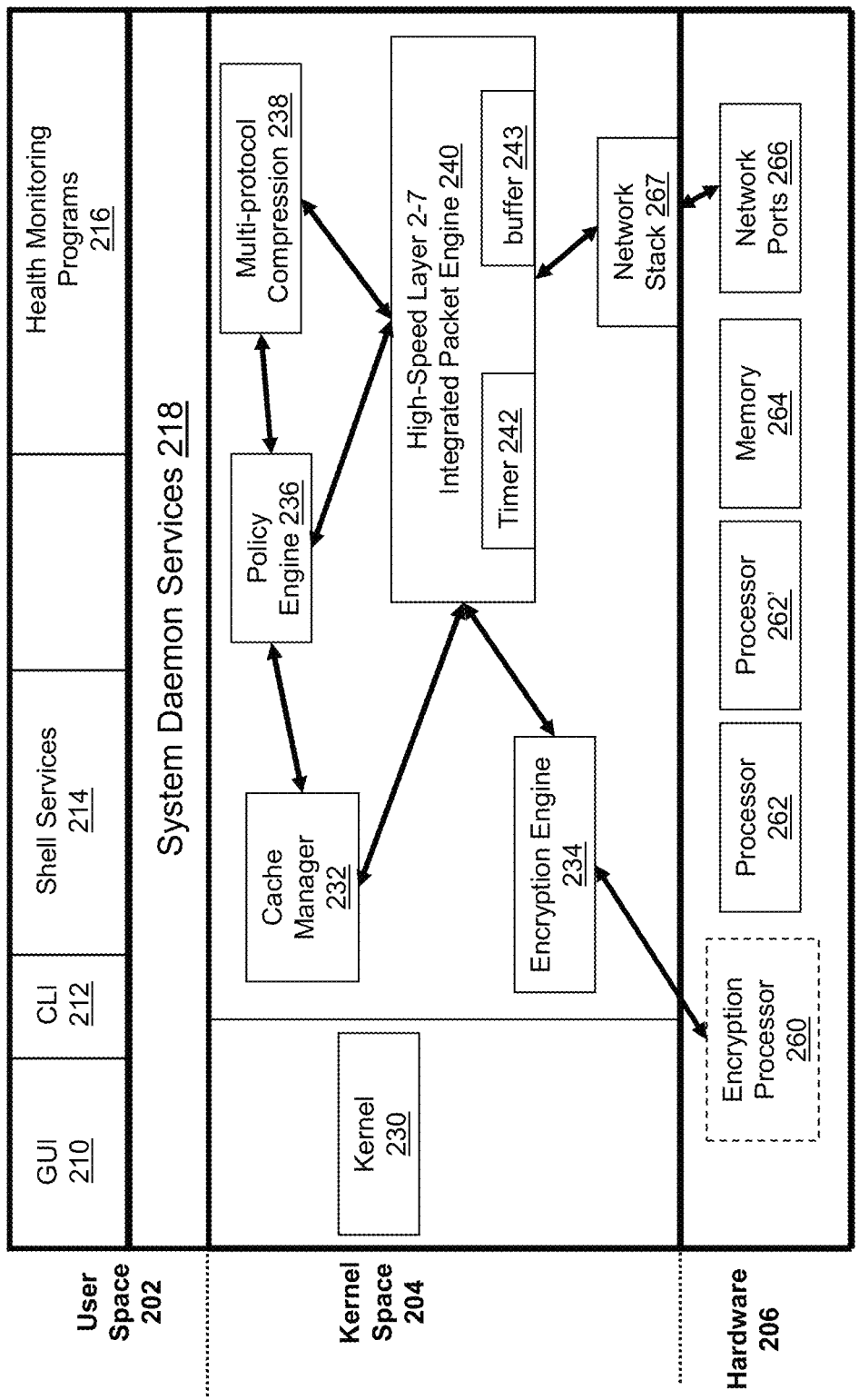
FIG. 2A is a block diagram of an embodiment of an appliance for processing communications between a client and a server.

FIG. 2A illustrates an example embodiment of the appliance 200. The architecture of the appliance 200 in FIG. 2A is provided by way of illustration only and is not intended to be limiting. As shown in FIG. 2, appliance 200 comprises a hardware layer 206 and a software layer divided into a user space 202 and a kernel space 204.

Hardware layer 206 provides the hardware elements upon which programs and services within kernel space 204 and user space 202 are executed. Hardware layer 206 also provides the structures and elements which allow programs and services within kernel space 204 and user space 202 to communicate data both internally and externally with respect to appliance 200. As shown in FIG. 2, the hardware layer 206 includes a processing unit 262 for executing software programs and services, a memory 264 for storing software and data, network ports 266 for transmitting and receiving data over a network, and an encryption processor 260 for performing functions related to Secure Sockets Layer processing of data transmitted and received over the network. In some embodiments, the central processing unit 262 may perform the functions of the encryption processor 260 in a single processor. Additionally, the hardware layer 206 may comprise multiple processors for each of the processing unit 262 and the encryption processor 260. The processor 262 may include any of the processors 101 described above in connection with FIGS. 1E and 1F. For example, In some embodiments, the appliance 200 comprises a first processor 262 and a second processor 262'. In other embodiments, the processor 262 or 262' comprises a multi-core processor.

Although the hardware layer 206 of appliance 200 is generally illustrated with an encryption processor 260, processor 260 may be a processor for performing functions related to any encryption protocol, such as the Secure Socket Layer (SSL) or Transport Layer Security (TLS) protocol. In some embodiments, the processor 260 may be a general purpose processor (GPP), and in further embodiments, may have executable instructions for performing processing of any security related protocol.

Although the hardware layer 206 of appliance 200 is illustrated with certain elements in FIG. 2, the hardware portions or components of appliance 200 may comprise any type and form of elements, hardware or software, of a computing device, such as the computing device 100 illustrated and discussed herein in conjunction with FIGS. 1E and 1F. In some embodiments, the appliance 200 may comprise a server, gateway, router, switch, bridge or other type of computing or network device, and have any hardware and/or software elements associated therewith.

The operating system of appliance 200 allocates, manages, or otherwise segregates the available system memory into kernel space 204 and user space 204. In example software architecture 200, the operating system may be any type and/or form of Unix operating system although the invention is not so limited. As such, the appliance 200 can be running any operating system such as any of the versions of the Microsoft® Windows operating systems, the different releases of the Unix and Linux operating systems, any version of the Mac OS® for Macintosh computers, any embedded operating system, any network operating system, any real-time operating system, any open source operating system, any proprietary operating system, any operating systems for mobile computing devices or network devices, or any other operating system capable of running on the appliance 200 and performing the operations described herein.

The kernel space 204 is reserved for running the kernel 230, including any device drivers, kernel extensions or other kernel related software. As known to those skilled in the art, the kernel 230 is the core of the operating system, and provides access, control, and management of resources and hardware-related elements of the application 104. In accordance with an embodiment of the appliance 200, the kernel space 204 also includes a number of network services or processes working in conjunction with a cache manager 232, sometimes also referred to as the integrated cache, the benefits of which are described in detail further herein. Additionally, the embodiment of the kernel 230 will depend on the embodiment of the operating system installed, configured, or otherwise used by the device 200.

In some embodiments, the device 200 comprises one network stack 267, such as a TCP/IP based stack, for communicating with the client 102 and/or the server 106. In some embodiments, the network stack 267 is used to communicate with a first network, such as network 108, and a second network 110. In some embodiments, the device 200 terminates a first transport layer connection, such as a TCP connection of a client 102, and establishes a second transport layer connection to a server 106 for use by the client 102, e.g., the second transport layer connection is terminated at the appliance 200 and the server 106. The first and second transport layer connections may be established via a single network stack 267. In other embodiments, the device 200 may comprise multiple network stacks, for example 267 and

267', and the first transport layer connection may be established or terminated at one network stack 267, and the second transport layer connection on the second network stack 267'. For example, one network stack may be for receiving and transmitting network packet on a first network, and another network stack for receiving and transmitting network packets on a second network. In some embodiments, the network stack 267 comprises a buffer 243 for queuing one or more network packets for transmission by the appliance 200.

As shown in FIG. 2, the kernel space 204 includes the cache manager 232, a high-speed layer 2-7 integrated packet engine 240, an encryption engine 234, a policy engine 236 and multi-protocol compression logic 238. Running these components or processes 232, 240, 234, 236 and 238 in kernel space 204 or kernel mode instead of the user space 202 improves the performance of each of these components, alone and in combination. Kernel operation means that these components or processes 232, 240, 234, 236 and 238 run in the core address space of the operating system of the device 200. For example, running the encryption engine 234 in kernel mode improves encryption performance by moving encryption and decryption operations to the kernel, thereby reducing the number of transitions between the memory space or a kernel thread in kernel mode and the memory space or a thread in user mode. For example, data obtained in kernel mode may not need to be passed or copied to a process or thread running in user mode, such as from a kernel level data structure to a user level data structure. In another aspect, the number of context switches between kernel mode and user mode are also reduced. Additionally, synchronization of and communications between any of the components or processes 232, 240, 235, 236 and 238 can be performed more efficiently in the kernel space 204.

In some embodiments, any portion of the components 232, 240, 234, 236 and 238 may run or operate in the kernel space 204, while other portions of these components 232, 240, 234, 236 and 238 may run or operate in user space 202. In some embodiments, the appliance 200 uses a kernel-level data structure providing access to any portion of one or more network packets, for example, a network packet comprising a request from a client 102 or a response from a server 106. In some embodiments, the kernel-level data structure may be obtained by the packet engine 240 via a transport layer driver interface or filter to the network stack 267. The kernel-level data structure may comprise any interface and/or data accessible via the kernel space 204 related to the network stack 267, network traffic or packets received or transmitted by the network stack 267. In other embodiments, the kernel-level data structure may be used by any of the components or processes 232, 240, 234, 236 and 238 to perform the desired operation of the component or process. In some embodiments, a component 232, 240, 234, 236 and 238 is running in kernel mode 204 when using the kernel-level data structure, while in another embodiment, the component 232, 240, 234, 236 and 238 is running in user mode when using the kernel-level data structure. In some embodiments, the kernel-level data structure may be copied or passed to a second kernel-level data structure, or any desired user-level data structure.

The cache manager 232 may comprise software, hardware or any combination of software and hardware to provide cache access, control and management of any type and form of content, such as objects or dynamically generated objects served by the originating servers 106. The data, objects or content processed and stored by the cache manager 232 may comprise data in any format, such as a markup language, or communicated via any protocol. In some embodiments, the cache manager 232 duplicates original data stored elsewhere or data previously computed, generated or transmitted, in which the original data may require longer access time to fetch, compute or otherwise obtain relative to reading a cache memory element. Once the data is stored in the cache memory element, future use can be made by accessing the cached copy rather than refetching or recomputing the original data, thereby reducing the access time. In some embodiments, the cache memory element may comprise a data object in memory 264 of device 200. In other embodiments, the cache memory element may comprise memory having a faster access time than memory 264. In another embodiment, the cache memory element may comprise any type and form of storage element of the device 200, such as a portion of a hard disk. In some embodiments, the processing unit 262 may provide cache memory for use by the cache manager 232. In yet further embodiments, the cache manager 232 may use any portion and combination of memory, storage, or the processing unit for caching data, objects, and other content.

Furthermore, the cache manager 232 includes any logic, functions, rules, or operations to perform any embodiments of the techniques of the appliance 200 described herein. For example, the cache manager 232 includes logic or functionality to invalidate objects based on the expiration of an invalidation time period or upon receipt of an invalidation command from a client 102 or server 106. In some embodiments, the cache manager 232 may operate as a program, service, process or task executing in the kernel space 204, and in other embodiments, in the user space 202. In some embodiments, a first portion of the cache manager 232 executes in the user space 202 while a second portion executes in the kernel space 204. In some embodiments, the cache manager 232 can comprise any type of general purpose processor (GPP), or any other type of integrated circuit, such as a Field Programmable Gate Array (FPGA), Programmable Logic Device (PLD), or Application Specific Integrated Circuit (ASIC).

The policy engine 236 may include, for example, an intelligent statistical engine or other programmable application(s). In some embodiments, the policy engine 236 provides a configuration mechanism to allow a user to identify, specify, define or configure a caching policy. Policy engine 236, in some embodiments, also has access to memory to support data structures such as lookup tables or hash tables to enable user-selected caching policy decisions. In other embodiments, the policy engine 236 may comprise any logic, rules, functions or operations to determine and provide access, control and management of objects, data or content being cached by the appliance 200 in addition to access, control and management of security, network traffic, network access, compression or any other function or operation performed by the appliance 200. Further examples of specific caching policies are further described herein.

The encryption engine 234 comprises any logic, business rules, functions or operations for handling the processing of any security related protocol, such as SSL or TLS, or any function related thereto. For example, the encryption engine 234 encrypts and decrypts network packets, or any portion thereof, communicated via the appliance 200. The encryption engine 234 may also setup or establish SSL or TLS connections on behalf of the client 102a-102n, server 106a-106n, or appliance 200. As such, the encryption engine 234 provides offloading and acceleration of SSL processing. In some embodiments, the encryption engine 234 uses a tunneling protocol to provide a virtual private network between a client 102a-102n and a server 106a-106n. In some embodiments, the encryption engine 234 is in communication with the Encryption processor 260. In other embodiments, the encryption engine 234 comprises executable instructions running on the Encryption processor 260.

The multi-protocol compression engine 238 comprises any logic, business rules, function or operations for compressing one or more protocols of a network packet, such as any of the protocols used by the network stack 267 of the device 200. In some embodiments, multi-protocol compression engine 238 compresses bi-directionally between clients 102a-102n and servers 106a-106n any TCP/IP based protocol, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In other embodiments, multi-protocol compression engine 238 provides compression of Hypertext Markup Language (HTML) based protocols and in some embodiments, provides compression of any markup languages, such as the Extensible Markup Language (XML). In some embodiments, the multi-protocol compression engine 238 provides compression of any high-performance protocol, such as any protocol designed for appliance 200 to appliance 200 communications. In another embodiment, the multi-protocol compression engine 238 compresses any payload of or any communication using a modified transport control protocol, such as Transaction TCP (T/TCP), TCP with selection acknowledgements (TCP-SACK), TCP with large windows (TCP-LW), a congestion prediction protocol such as the TCP-Vegas protocol, and a TCP spoofing protocol.

As such, the multi-protocol compression engine 238 accelerates performance for users accessing applications via desktop clients, e.g., Microsoft Outlook and non-Web thin clients, such as any client launched by popular enterprise applications like Oracle, SAP and Siebel, and even mobile clients, such as the Pocket PC. In some embodiments, the multi-protocol compression engine 238 by executing in the kernel mode 204 and integrating with packet processing engine 240 accessing the network stack 267 is able to compress any of the protocols carried by the TCP/IP protocol, such as any application layer protocol.

High speed layer 2-7 integrated packet engine 240, also generally referred to as a packet processing engine or packet engine, is responsible for managing the kernel-level processing of packets received and transmitted by appliance 200 via network ports 266. The high speed layer 2-7 integrated packet engine 240 may comprise a buffer for queuing one or more network packets during processing, such as for receipt of a network packet or transmission of a network packet. Additionally, the high speed layer 2-7 integrated packet engine 240 is in communication with one or more network stacks 267 to send and receive network packets via network ports 266. The high speed layer 2-7 integrated packet engine 240 works in conjunction with encryption engine 234, cache manager 232, policy engine 236 and multi-protocol compression logic 238. In particular, encryption engine 234 is configured to perform SSL processing of packets, policy engine 236 is configured to perform functions related to traffic management such as request-level content switching and request-level cache redirection, and multi-protocol compression logic 238 is configured to perform functions related to compression and decompression of data.

The high speed layer 2-7 integrated packet engine 240 includes a packet processing timer 242. In some embodiments, the packet processing timer 242 provides one or more time intervals to trigger the processing of incoming, i.e., received, or outgoing, i.e., transmitted, network packets. In some embodiments, the high speed layer 2-7 integrated packet engine 240 processes network packets responsive to the timer 242. The packet processing timer 242 provides any type and form of signal to the packet engine 240 to notify, trigger, or communicate a time related event, interval or occurrence. In many embodiments, the packet processing timer 242 operates in the order of milliseconds, such as for example 100 ms, 50 ms or 25 ms. For example, in some embodiments, the packet processing timer 242 provides time intervals or otherwise causes a network packet to be processed by the high speed layer 2-7 integrated packet engine 240 at a 10 ms time interval, while in other embodiments, at a 5 ms time interval, and still yet in further embodiments, as short as a 3, 2, or 1 ms time interval. The high speed layer 2-7 integrated packet engine 240 may be interfaced, integrated or in communication with the encryption engine 234, cache manager 232, policy engine 236 and multi-protocol compression engine 238 during operation. As such, any of the logic, functions, or operations of the encryption engine 234, cache manager 232, policy engine 236 and multi-protocol compression logic 238 may be performed responsive to the packet processing timer 242 and/or the packet engine 240. Therefore, any of the logic, functions, or operations of the encryption engine 234, cache manager 232, policy engine 236 and multi-protocol compression logic 238 may be performed at the granularity of time intervals provided via the packet processing timer 242, for example, at a time interval of less than or equal to 10 ms. For example, In some embodiments, the cache manager 232 may perform invalidation of any cached objects responsive to the high speed layer 2-7 integrated packet engine 240 and/or the packet processing timer 242. In another embodiment, the expiry or invalidation time of a cached object can be set to the same order of granularity as the time interval of the packet processing timer 242, such as at every 10 ms.

In contrast to kernel space 204, user space 202 is the memory area or portion of the operating system used by user mode applications or programs otherwise running in user mode. A user mode application may not access kernel space 204 directly and uses service calls in order to access kernel services. As shown in FIG. 2, user space 202 of appliance 200 includes a graphical user interface (GUI) 210, a command line interface (CLI) 212, shell services 214, health monitoring program 216, and daemon services 218. GUI 210 and CLI 212 provide a means by which a system administrator or other user can interact with and control the operation of appliance 200, such as via the operating system of the appliance 200. The GUI 210 or CLI 212 can comprise code running in user space 202 or kernel space 204. The GUI 210 may be any type and form of graphical user interface and may be presented via text, graphical or otherwise, by any type of program or application, such as a browser. The CLI 212 may be any type and form of command line or text-based interface, such as a command line provided by the operating system. For example, the CLI 212 may comprise a shell, which is a tool to enable users to interact with the operating system. In some embodiments, the CLI 212 may be provided via a bash, csh, tcsh, or ksh type shell. The shell services 214 comprises the programs, services, tasks, processes or executable instructions to support interaction with the appliance 200 or operating system by a user via the GUI 210 and/or CLI 212.

Health monitoring program 216 is used to monitor, check, report and ensure that network systems are functioning properly and that users are receiving requested content over a network. Health monitoring program 216 comprises one or more programs, services, tasks, processes or executable instructions to provide logic, rules, functions or operations for monitoring any activity of the appliance 200. In some embodiments, the health monitoring program 216 intercepts and inspects any network traffic passed via the appliance 200. In other embodiments, the health monitoring program 216 interfaces by any suitable means and/or mechanisms with one or more of the following: the encryption engine 234, cache manager 232, policy engine 236, multi-protocol compression logic 238, packet engine 240, daemon services 218, and shell services 214. As such, the health monitoring program 216 may call any application programming interface (API) to determine a state, status, or health of any portion of the appliance 200. For example, the health monitoring program 216 may ping or send a status inquiry on a periodic basis to check if a program, process, service or task is active and currently running. In another example, the health monitoring program 216 may check any status, error or history logs provided by any program, process, service or task to determine any condition, status or error with any portion of the appliance 200.

Daemon services 218 are programs that run continuously or in the background and handle periodic service requests received by appliance 200. In some embodiments, a daemon service may forward the requests to other programs or processes, such as another daemon service 218 as appropriate. As known to those skilled in the art, a daemon service 218 may run unattended to perform continuous or periodic system wide functions, such as network control, or to perform any desired task. In some embodiments, one or more daemon services 218 run in the user space 202, while in other embodiments, one or more daemon services 218 run in the kernel space.

Figure 2B:
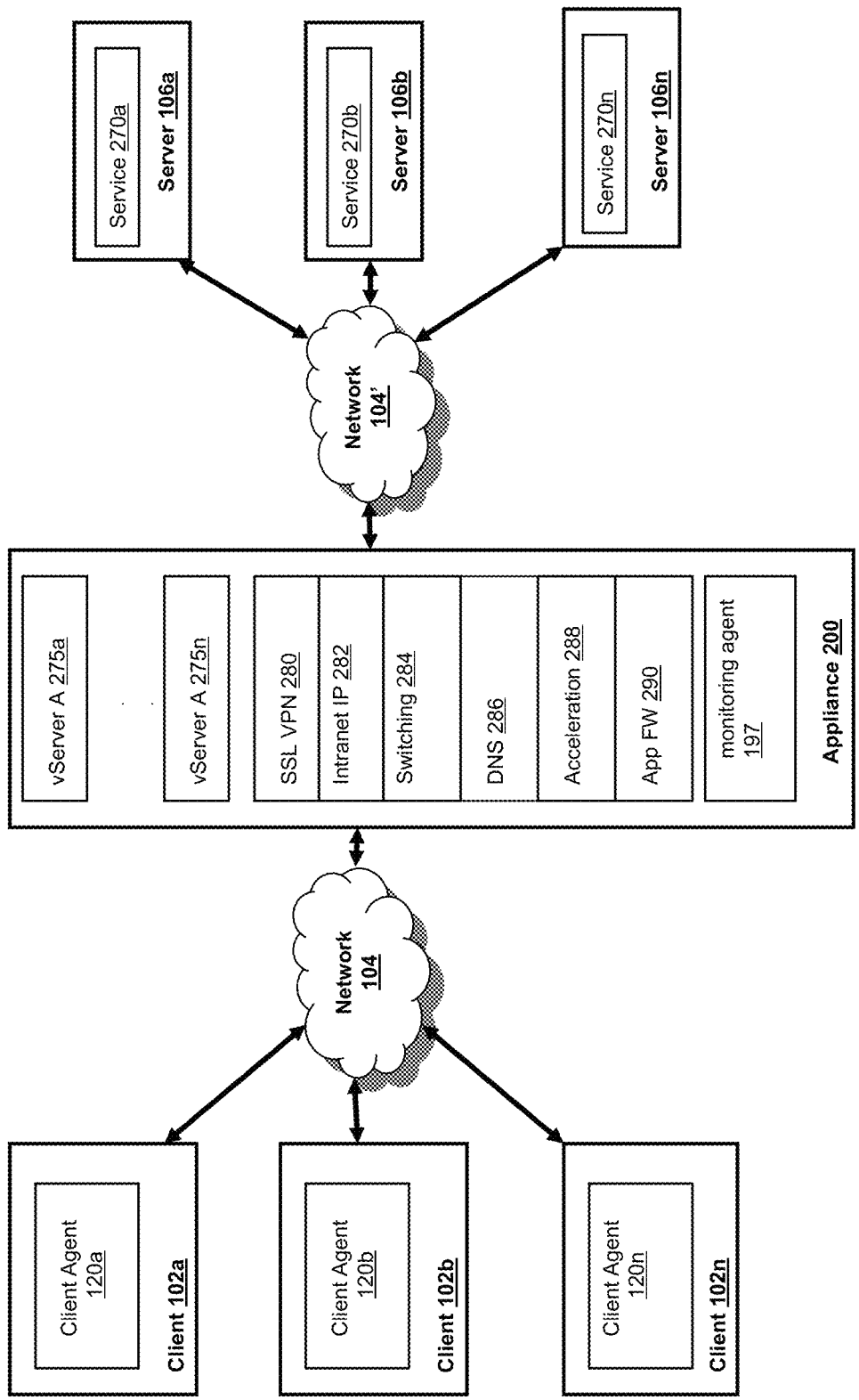
FIG. 2B is a block diagram of another embodiment of an appliance for optimizing, accelerating, load-balancing and routing communications between a client and a server.

Referring now to FIG. 2B, another embodiment of the appliance 200 is depicted. In brief overview, the appliance 200 provides one or more of the following services, functionality or operations: SSL VPN connectivity 280, switching/load balancing 284, Domain Name Service resolution 286, acceleration 288 and an application firewall 290 for communications between one or more clients 102 and one or more servers 106. Each of the servers 106 may provide one or more network related services 270a-270n (referred to as services 270). For example, a server 106 may provide an http service 270. The appliance 200 comprises one or more virtual servers or virtual internet protocol servers, referred to as a vServer, VIP server, or just VIP 275a-275n (also referred herein as vServer 275). The vServer 275 receives, intercepts or otherwise processes communications between a client 102 and a server 106 in accordance with the configuration and operations of the appliance 200.

The vServer 275 may comprise software, hardware or any combination of software and hardware. The vServer 275 may comprise any type and form of program, service, task, process or executable instructions operating in user mode 202, kernel mode 204 or any combination thereof in the appliance 200. The vServer 275 includes any logic, functions, rules, or operations to perform any embodiments of the techniques described herein, such as SSL VPN 280, switching/load balancing 284, Domain Name Service resolution 286, acceleration 288 and an application firewall 290. In some embodiments, the vServer 275 establishes a connection to a service 270 of a server 106. The service 275 may comprise any program, application, process, task or set of executable instructions capable of connecting to and communicating to the appliance 200, client 102 or vServer 275. For example, the service 275 may comprise a web server, http server, ftp, email or database server. In some embodiments, the service 270 is a daemon process or network driver for listening, receiving and/or sending communications for an application, such as email, database or an enterprise application. In some embodiments, the service 270 may communicate on a specific IP address, or IP address and port.

In some embodiments, the vServer 275 applies one or more policies of the policy engine 236 to network communications between the client 102 and server 106. In some embodiments, the policies are associated with a vServer 275. In another embodiment, the policies are based on a user, or a group of users. In yet another embodiment, a policy is global and applies to one or more vServers 275a-275n, and any user or group of users communicating via the appliance 200. In some embodiments, the policies of the policy engine have conditions upon which the policy is applied based on any content of the communication, such as internet protocol address, port, protocol type, header or fields in a packet, or the context of the communication, such as user, group of the user, vServer 275, transport layer connection, and/or identification or attributes of the client 102 or server 106.

In other embodiments, the appliance 200 communicates or interfaces with the policy engine 236 to determine authentication and/or authorization of a remote user or a remote client 102 to access the computing environment 15, application, and/or data file from a server 106. In another embodiment, the appliance 200 communicates or interfaces with the policy engine 236 to determine authentication and/or authorization of a remote user or a remote client 102 to have the application delivery system 190 deliver one or more of the computing environment 15, application, and/or data file. In yet another embodiment, the appliance 200 establishes a VPN or SSL VPN connection based on the policy engine's 236 authentication and/or authorization of a remote user or a remote client 102 In some embodiments, the appliance 200 controls the flow of network traffic and communication sessions based on policies of the policy engine 236. For example, the appliance 200 may control the access to a computing environment 15, application or data file based on the policy engine 236.

In some embodiments, the vServer 275 establishes a transport layer connection, such as a TCP or UDP connection with a client 102 via the client agent 120. In some embodiments, the vServer 275 listens for and receives communications from the client 102. In other embodiments, the vServer 275 establishes a transport layer connection, such as a TCP or UDP connection with a client server 106. In some embodiments, the vServer 275 establishes the transport layer connection to an internet protocol address and port of a server 270 running on the server 106. In another embodiment, the vServer 275 associates a first transport layer connection to a client 102 with a second transport layer connection to the server 106. In some embodiments, a vServer 275 establishes a pool of transport layer connections to a server 106 and multiplexes client requests via the pooled transport layer connections.

In some embodiments, the appliance 200 provides a SSL VPN connection 280 between a client 102 and a server 106. For example, a client 102 on a first network 102 requests to establish a connection to a server 106 on a second network 104'. In some embodiments, the second network 104' is not routable from the first network 104. In other embodiments, the client 102 is on a public network 104 and the server 106 is on a private network 104', such as a corporate network. In some embodiments, the client agent 120 intercepts communications of the client 102 on the first network 104, encrypts the communications, and transmits the communications via a first transport layer connection to the appliance 200. The appliance 200 associates the first transport layer connection on the first network 104 to a second transport layer connection to the server 106 on the second network 104. The appliance 200 receives the intercepted communication from the client agent 102, decrypts the communications, and transmits the communication to the server 106 on the second network 104 via the second transport layer connection. The second transport layer connection may be a pooled transport layer connection. As such, the appliance 200 provides an end-to-end secure transport layer connection for the client 102 between the two networks 104, 104'.

In some embodiments, the appliance 200 hosts an intranet internet protocol or IntranetIP 282 address of the client 102 on the virtual private network 104. The client 102 has a local network identifier, such as an internet protocol (IP) address and/or host name on the first network 104. When connected to the second network 104' via the appliance 200, the appliance 200 establishes, assigns or otherwise provides an IntranetIP address 282, which is a network identifier, such as IP address and/or host name, for the client 102 on the second network 104'. The appliance 200 listens for and receives on the second or private network 104' for any communications directed towards the client 102 using the client's established IntranetIP 282. In some embodiments, the appliance 200 acts as or on behalf of the client 102 on the second private network 104. For example, in another embodiment, a vServer 275 listens for and responds to communications to the IntranetIP 282 of the client 102. In some embodiments, if a computing device 100 on the second network 104' transmits a request, the appliance 200 processes the request as if it were the client 102. For example, the appliance 200 may respond to a ping to the client's IntranetIP 282. In another example, the appliance may establish a connection, such as a TCP or UDP connection, with computing device 100 on the second network 104 requesting a connection with the client's IntranetIP 282.

In some embodiments, the appliance 200 provides one or more of the following acceleration techniques 288 to communications between the client 102 and server 106: 1) compression; 2) decompression; 3) Transmission Control Protocol pooling; 4) Transmission Control Protocol multiplexing; 5) Transmission Control Protocol buffering; and 6) caching. In some embodiments, the appliance 200 relieves servers 106 of much of the processing load caused by repeatedly opening and closing transport layers connections to clients 102 by opening one or more transport layer connections with each server 106 and maintaining these connections to allow repeated data accesses by clients via the Internet. This technique is referred to herein as "connection pooling".

In some embodiments, in order to seamlessly splice communications from a client 102 to a server 106 via a pooled transport layer connection, the appliance 200 translates or multiplexes communications by modifying sequence number and acknowledgment numbers at the transport layer protocol level. This is referred to as "connection multiplexing". In some embodiments, no application layer protocol interaction is required. For example, in the case of an in-bound packet (that is, a packet received from a client 102), the source network address of the packet is changed to that of an output port of appliance 200, and the destination network address is changed to that of the intended server. In the case of an outbound packet (that is, one received from a server 106), the source network address is changed from that of the server 106 to that of an output port of appliance 200 and the destination address is changed from that of appliance 200 to that of the requesting client 102. The sequence numbers and acknowledgment numbers of the packet are also translated to sequence numbers and acknowledgement numbers expected by the client 102 on the appliance's 200 transport layer connection to the client 102. In some embodiments, the packet checksum of the transport layer protocol is recalculated to account for these translations.

In another embodiment, the appliance 200 provides switching or load-balancing functionality 284 for communications between the client 102 and server 106. In some embodiments, the appliance 200 distributes traffic and directs client requests to a server 106 based on layer 4 or application-layer request data. In some embodiments, although the network layer or layer 2 of the network packet identifies a destination server 106, the appliance 200 determines the server 106 to distribute the network packet by application information and data carried as payload of the transport layer packet. In some embodiments, the health monitoring programs 216 of the appliance 200 monitor the health of servers to determine the server 106 for which to distribute a client's request. In some embodiments, if the appliance 200 detects a server 106 is not available or has a load over a predetermined threshold, the appliance 200 can direct or distribute client requests to another server 106.

In some embodiments, the appliance 200 acts as a Domain Name Service (DNS) resolver or otherwise provides resolution of a DNS request from clients 102. In some embodiments, the appliance intercepts a DNS request transmitted by the client 102. In some embodiments, the appliance 200 responds to a client's DNS request with an IP address of or hosted by the appliance 200. In this embodiment, the client 102 transmits network communication for the domain name to the appliance 200. In another embodiment, the appliance 200 responds to a client's DNS request with an IP address of or hosted by a second appliance 200'. In some embodiments, the appliance 200 responds to a client's DNS request with an IP address of a server 106 determined by the appliance 200.

In yet another embodiment, the appliance 200 provides application firewall functionality 290 for communications between the client 102 and server 106. In some embodiments, the policy engine 236 provides rules for detecting and blocking illegitimate requests. In some embodiments, the application firewall 290 protects against denial of service (DoS) attacks. In other embodiments, the appliance inspects the content of intercepted requests to identify and block application-based attacks. In some embodiments, the rules/policy engine 236 comprises one or more application firewall or security control policies for providing protections against various classes and types of web or Internet based vulnerabilities, such as one or more of the following: 1) buffer overflow, 2) CGI-BIN parameter manipulation, 3) form/hidden field manipulation, 4) forceful browsing, 5) cookie or session poisoning, 6) broken access control list (ACLs) or weak passwords, 7) cross-site scripting (XSS), 8) command injection, 9) SQL injection, 10) error triggering sensitive information leak, 11) insecure use of cryptography, 12) server misconfiguration, 13) back doors and debug options, 14) website defacement, 15) platform or operating systems vulnerabilities, and 16) zero-day exploits. In an embodiment, the application firewall 290 provides HTML form field protection in the form of inspecting or analyzing the network communication for one or more of the following: 1) required fields are returned, 2) no added field allowed, 3) read-only and hidden field enforcement, 4) drop-down list and radio button field conformance, and 5) form-field max-length enforcement. In some embodiments, the application firewall 290 ensures cookies are not modified. In other embodiments, the application firewall 290 protects against forceful browsing by enforcing legal URLs.

In still yet other embodiments, the application firewall 290 protects any confidential information contained in the network communication. The application firewall 290 may inspect or analyze any network communication in accordance with the rules or polices of the engine 236 to identify any confidential information in any field of the network packet. In some embodiments, the application firewall 290 identifies in the network communication one or more occurrences of a credit card number, password, social security number, name, patient code, contact information, and age. The encoded portion of the network communication may comprise these occurrences or the confidential information. Based on these occurrences, In some embodiments, the application firewall 290 may take a policy action on the network communication, such as prevent transmission of the network communication. In another embodiment, the application firewall 290 may rewrite, remove or otherwise mask such identified occurrence or confidential information.

Still referring to FIG. 2B, the appliance 200 may include a performance monitoring agent 197 as discussed above in conjunction with FIG. 1D. In some embodiments, the appliance 200 receives the monitoring agent 197 from the monitoring service 198 or monitoring server 106 as depicted in FIG. 1D. In some embodiments, the appliance 200 stores the monitoring agent 197 in storage, such as disk, for delivery to any client or server in communication with the appliance 200. For example, In some embodiments, the appliance 200 transmits the monitoring agent 197 to a client upon receiving a request to establish a transport layer connection. In other embodiments, the appliance 200 transmits the monitoring agent 197 upon establishing the transport layer connection with the client 102. In another embodiment, the appliance 200 transmits the monitoring agent 197 to the client upon intercepting or detecting a request for a web page. In yet another embodiment, the appliance 200 transmits the monitoring agent 197 to a client or a server in response to a request from the monitoring server 198. In some embodiments, the appliance 200 transmits the monitoring agent 197 to a second appliance 200' or appliance 205.

In other embodiments, the appliance 200 executes the monitoring agent 197. In some embodiments, the monitoring agent 197 measures and monitors the performance of any application, program, process, service, task or thread executing on the appliance 200. For example, the monitoring agent 197 may monitor and measure performance and operation of vServers 275A-275N. In another embodiment, the monitoring agent 197 measures and monitors the performance of any transport layer connections of the appliance 200. In some embodiments, the monitoring agent 197 measures and monitors the performance of any user sessions traversing the appliance 200. In some embodiments, the monitoring agent 197 measures and monitors the performance of any virtual private network connections and/or sessions traversing the appliance 200, such an SSL VPN session. In still further embodiments, the monitoring agent 197 measures and monitors the memory, CPU and disk usage and performance of the appliance 200. In yet another embodiment, the monitoring agent 197 measures and monitors the performance of any acceleration technique 288 performed by the appliance 200, such as SSL offloading, connection pooling and multiplexing, caching, and compression. In some embodiments, the monitoring agent 197 measures and monitors the performance of any load balancing and/or content switching 284 performed by the appliance 200. In other embodiments, the monitoring agent 197 measures and monitors the performance of application firewall 290 protection and processing performed by the appliance 200.

C. Client Agent

Figure 3:
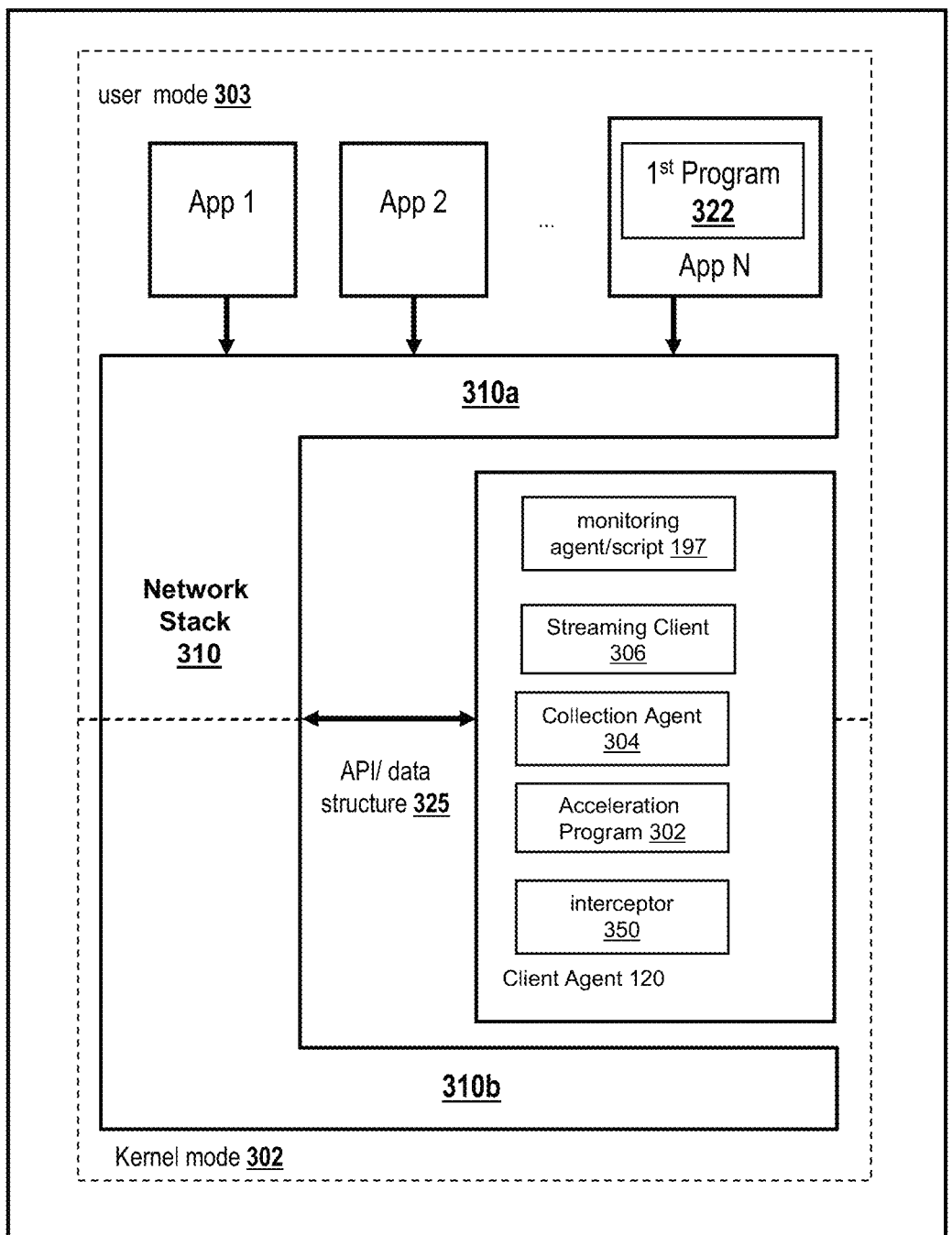
FIG. 3 is a block diagram of an embodiment of a client for communicating with a server via the appliance.

Referring now to FIG. 3, an embodiment of the client agent 120 is depicted. The client 102 includes a client agent 120 for establishing and exchanging communications with the appliance 200 and/or server 106 via a network 104. In brief overview, the client 102 operates on computing device 100 having an operating system with a kernel mode 302 and a user mode 303, and a network stack 310 with one or more layers 310a-310b. The client 102 may have installed and/or execute one or more applications. In some embodiments, one or more applications may communicate via the network stack 310 to a network 104. One of the applications, such as a web browser, may also include a first program 322. For example, the first program 322 may be used in some embodiments to install and/or execute the client agent 120, or any portion thereof. The client agent 120 includes an interception mechanism, or interceptor 350, for intercepting network communications from the network stack 310 from the one or more applications.

The network stack 310 of the client 102 may comprise any type and form of software, or hardware, or any combinations thereof, for providing connectivity to and communications with a network. In some embodiments, the network stack 310 comprises a software implementation for a network protocol suite. The network stack 310 may comprise one or more network layers, such as any networks layers of the Open Systems Interconnection (OSI) communications model as those skilled in the art recognize and appreciate. As such, the network stack 310 may comprise any type and form of protocols for any of the following layers of the OSI model: 1) physical link layer, 2) data link layer, 3) network layer, 4) transport layer, 5) session layer, 6) presentation layer, and 7) application layer. In some embodiments, the network stack 310 may comprise a transport control protocol (TCP) over the network layer protocol of the internet protocol (IP), generally referred to as TCP/IP. In some embodiments, the TCP/IP protocol may be carried over the Ethernet protocol, which may comprise any of the family of IEEE wide-area-network (WAN) or local-area-network (LAN) protocols, such as those protocols covered by the IEEE 802.3. In some embodiments, the network stack 310 comprises any type and form of a wireless protocol, such as IEEE 802.11 and/or mobile internet protocol.

In view of a TCP/IP based network, any TCP/IP based protocol may be used, including Messaging Application Programming Interface (MAPI) (email), File Transfer Protocol (FTP), HyperText Transfer Protocol (HTTP), Common Internet File System (CIFS) protocol (file transfer), Independent Computing Architecture (ICA) protocol, Remote Desktop Protocol (RDP), Wireless Application Protocol (WAP), Mobile IP protocol, and Voice Over IP (VoIP) protocol. In another embodiment, the network stack 310 comprises any type and form of transport control protocol, such as a modified transport control protocol, for example a Transaction TCP (T/TCP), TCP with selection acknowledgements (TCP-SACK), TCP with large windows (TCP-LW), a congestion prediction protocol such as the TCP-Vegas protocol, and a TCP spoofing protocol. In other embodiments, any type and form of user datagram protocol (UDP), such as UDP over IP, may be used by the network stack 310, such as for voice communications or real-time data communications.

Furthermore, the network stack 310 may include one or more network drivers supporting the one or more layers, such as a TCP driver or a network layer driver. The network drivers may be included as part of the operating system of the computing device 100 or as part of any network interface cards or other network access components of the computing device 100. In some embodiments, any of the network drivers of the network stack 310 may be customized, modified or adapted to provide a custom or modified portion of the network stack 310 in support of any of the techniques described herein. In other embodiments, the acceleration program 302 is designed and constructed to operate with or work in conjunction with the network stack 310 installed or otherwise provided by the operating system of the client 102.

The network stack 310 comprises any type and form of interfaces for receiving, obtaining, providing or otherwise accessing any information and data related to network communications of the client 102. In some embodiments, an interface to the network stack 310 comprises an application programming interface (API). The interface may also comprise any function call, hooking or filtering mechanism, event or call back mechanism, or any type of interfacing technique. The network stack 310 via the interface may receive or provide any type and form of data structure, such as an object, related to functionality or operation of the network stack 310. For example, the data structure may comprise information and data related to a network packet or one or more network packets. In some embodiments, the data structure comprises a portion of the network packet processed at a protocol layer of the network stack 310, such as a network packet of the transport layer. In some embodiments, the data structure 325 comprises a kernel-level data structure, while in other embodiments, the data structure 325 comprises a user-mode data structure. A kernel-level data structure may comprise a data structure obtained or related to a portion of the network stack 310 operating in kernel-mode 302, or a network driver or other software running in kernel-mode 302, or any data structure obtained or received by a service, process, task, thread or other executable instructions running or operating in kernel-mode of the operating system.

Additionally, some portions of the network stack 310 may execute or operate in kernel-mode 302, for example, the data link or network layer, while other portions execute or operate in user-mode 303, such as an application layer of the network stack 310. For example, a first portion 310a of the network stack may provide user-mode access to the network stack 310 to an application while a second portion 310a of the network stack 310 provides access to a network. In some embodiments, a first portion 310a of the network stack may comprise one or more upper layers of the network stack 310, such as any of layers 5-7. In other embodiments, a second portion 310b of the network stack 310 comprises one or more lower layers, such as any of layers 1-4. Each of the first portion 310a and second portion 310b of the network stack 310 may comprise any portion of the network stack 310, at any one or more network layers, in user-mode 203, kernel-mode, 202, or combinations thereof, or at any portion of a network layer or interface point to a network layer or any portion of or interface point to the user-mode 203 and kernel-mode 203.

The interceptor 350 may comprise software, hardware, or any combination of software and hardware. In some embodiments, the interceptor 350 intercept a network communication at any point in the network stack 310, and redirects or transmits the network communication to a destination desired, managed or controlled by the interceptor 350 or client agent 120. For example, the interceptor 350 may intercept a network communication of a network stack 310 of a first network and transmit the network communication to the appliance 200 for transmission on a second network 104. In some embodiments, the interceptor 350 comprises any type interceptor 350 comprises a driver, such as a network driver constructed and designed to interface and work with the network stack 310. In some embodiments, the client agent 120 and/or interceptor 350 operates at one or more layers of the network stack 310, such as at the transport layer. In some embodiments, the interceptor 350 comprises a filter driver, hooking mechanism, or any form and type of suitable network driver interface that interfaces to the transport layer of the network stack, such as via the transport driver interface (TDI). In some embodiments, the interceptor 350 interfaces to a first protocol layer, such as the transport layer and another protocol layer, such as any layer above the transport protocol layer, for example, an application protocol layer. In some embodiments, the interceptor 350 may comprise a driver complying with the Network Driver Interface Specification (NDIS), or a NDIS driver. In another embodiment, the interceptor 350 may comprise a mini-filter or a mini-port driver. In some embodiments, the interceptor 350, or portion thereof, operates in kernel-mode 202. In another embodiment, the interceptor 350, or portion thereof, operates in user-mode 203. In some embodiments, a portion of the interceptor 350 operates in kernel-mode 202 while another portion of the interceptor 350 operates in user-mode 203. In other embodiments, the client agent 120 operates in user-mode 203 but interfaces via the interceptor 350 to a kernel-mode driver, process, service, task or portion of the operating system, such as to obtain a kernel-level data structure 225. In further embodiments, the interceptor 350 is a user-mode application or program, such as application.

In some embodiments, the interceptor 350 intercepts any transport layer connection requests. In these embodiments, the interceptor 350 execute transport layer application programming interface (API) calls to set the destination information, such as destination IP address and/or port to a desired location for the location. In this manner, the interceptor 350 intercepts and redirects the transport layer connection to a IP address and port controlled or managed by the interceptor 350 or client agent 120. In some embodiments, the interceptor 350 sets the destination information for the connection to a local IP address and port of the client 102 on which the client agent 120 is listening. For example, the client agent 120 may comprise a proxy service listening on a local IP address and port for redirected transport layer communications. In some embodiments, the client agent 120 then communicates the redirected transport layer communication to the appliance 200.

In some embodiments, the interceptor 350 intercepts a Domain Name Service (DNS) request. In some embodiments, the client agent 120 and/or interceptor 350 resolves the DNS request. In another embodiment, the interceptor transmits the intercepted DNS request to the appliance 200 for DNS resolution. In some embodiments, the appliance 200 resolves the DNS request and communicates the DNS response to the client agent 120. In some embodiments, the appliance 200 resolves the DNS request via another appliance 200' or a DNS server 106.

In yet another embodiment, the client agent 120 may comprise two agents 120 and 120'. In some embodiments, a first agent 120 may comprise an interceptor 350 operating at the network layer of the network stack 310. In some embodiments, the first agent 120 intercepts network layer requests such as Internet Control Message Protocol (ICMP) requests (e.g., ping and traceroute). In other embodiments, the second agent 120' may operate at the transport layer and intercept transport layer communications. In some embodiments, the first agent 120 intercepts communications at one layer of the network stack 210 and interfaces with or communicates the intercepted communication to the second agent 120'.

The client agent 120 and/or interceptor 350 may operate at or interface with a protocol layer in a manner transparent to any other protocol layer of the network stack 310. For example, In some embodiments, the interceptor 350 operates or interfaces with the transport layer of the network stack 310 transparently to any protocol layer below the transport layer, such as the network layer, and any protocol layer above the transport layer, such as the session, presentation or application layer protocols. This allows the other protocol layers of the network stack 310 to operate as desired and without modification for using the interceptor 350. As such, the client agent 120 and/or interceptor 350 can interface with the transport layer to secure, optimize, accelerate, route or load-balance any communications provided via any protocol carried by the transport layer, such as any application layer protocol over TCP/IP.

Furthermore, the client agent 120 and/or interceptor may operate at or interface with the network stack 310 in a manner transparent to any application, a user of the client 102, and any other computing device, such as a server, in communications with the client 102. The client agent 120 and/or interceptor 350 may be installed and/or executed on the client 102 in a manner without modification of an application. In some embodiments, the user of the client 102 or a computing device in communications with the client 102 are not aware of the existence, execution or operation of the client agent 120 and/or interceptor 350. As such, in some embodiments, the client agent 120 and/or interceptor 350 is installed, executed, and/or operated transparently to an application, user of the client 102, another computing device, such as a server, or any of the protocol layers above and/or below the protocol layer interfaced to by the interceptor 350.

The client agent 120 includes an acceleration program 302, a streaming client 306, a collection agent 304, and/or monitoring agent 197. In some embodiments, the client agent 120 comprises an Independent Computing Architecture (ICA) client, or any portion thereof, developed by Citrix Systems, Inc. of Fort Lauderdale, Fla., and is also referred to as an ICA client. In some embodiments, the client 120 comprises an application streaming client 306 for streaming an application from a server 106 to a client 102. In some embodiments, the client agent 120 comprises an acceleration program 302 for accelerating communications between client 102 and server 106. In another embodiment, the client agent 120 includes a collection agent 304 for performing end-point detection/scanning and collecting end-point information for the appliance 200 and/or server 106.

In some embodiments, the acceleration program 302 comprises a client-side acceleration program for performing one or more acceleration techniques to accelerate, enhance or otherwise improve a client's communications with and/or access to a server 106, such as accessing an application provided by a server 106. The logic, functions, and/or operations of the executable instructions of the acceleration program 302 may perform one or more of the following acceleration techniques: 1) multi-protocol compression, 2) transport control protocol pooling, 3) transport control protocol multiplexing, 4) transport control protocol buffering, and 5) caching via a cache manager. Additionally, the acceleration program 302 may perform encryption and/or decryption of any communications received and/or transmitted by the client 102. In some embodiments, the acceleration program 302 performs one or more of the acceleration techniques in an integrated manner or fashion. Additionally, the acceleration program 302 can perform compression on any of the protocols, or multiple-protocols, carried as a payload of a network packet of the transport layer protocol.

The streaming client 306 comprises an application, program, process, service, task or executable instructions for receiving and executing a streamed application from a server 106. A server 106 may stream one or more application data files to the streaming client 306 for playing, executing or otherwise causing to be executed the application on the client 102. In some embodiments, the server 106 transmits a set of compressed or packaged application data files to the streaming client 306. In some embodiments, the plurality of application files are compressed and stored on a file server within an archive file such as a CAB, ZIP, SIT, TAR, JAR or other archive. In some embodiments, the server 106 decompresses, unpackages or unarchives the application files and transmits the files to the client 102. In another embodiment, the client 102 decompresses, unpackages or unarchives the application files. The streaming client 306 dynamically installs the application, or portion thereof, and executes the application. In some embodiments, the streaming client 306 may be an executable program. In some embodiments, the streaming client 306 may be able to launch another executable program.

The collection agent 304 comprises an application, program, process, service, task or executable instructions for identifying, obtaining and/or collecting information about the client 102. In some embodiments, the appliance 200 transmits the collection agent 304 to the client 102 or client agent 120. The collection agent 304 may be configured according to one or more policies of the policy engine 236 of the appliance. In other embodiments, the collection agent 304 transmits collected information on the client 102 to the appliance 200. In some embodiments, the policy engine 236 of the appliance 200 uses the collected information to determine and provide access, authentication and authorization control of the client's connection to a network 104.

In some embodiments, the collection agent 304 comprises an end-point detection and scanning mechanism, which identifies and determines one or more attributes or characteristics of the client. For example, the collection agent 304 may identify and determine any one or more of the following client-side attributes: 1) the operating system an/or a version of an operating system, 2) a service pack of the operating system, 3) a running service, 4) a running process, and 5) a file. The collection agent 304 may also identify and determine the presence or versions of any one or more of the following on the client: 1) antivirus software, 2) personal firewall software, 3) anti-spam software, and 4) internet security software. The policy engine 236 may have one or more policies based on any one or more of the attributes or characteristics of the client or client-side attributes.

In some embodiments, the client agent 120 includes a monitoring agent 197 as discussed in conjunction with FIGS. 1D and 2B. The monitoring agent 197 may be any type and form of script, such as Visual Basic or Java script. In some embodiments, the monitoring agent 197 monitors and measures performance of any portion of the client agent 120. For example, in some embodiments, the monitoring agent 197 monitors and measures performance of the acceleration program 302. In another embodiment, the monitoring agent 197 monitors and measures performance of the streaming client 306. In other embodiments, the monitoring agent 197 monitors and measures performance of the collection agent 304. In still another embodiment, the monitoring agent 197 monitors and measures performance of the interceptor 350. In some embodiments, the monitoring agent 197 monitors and measures any resource of the client 102, such as memory, CPU and disk.

The monitoring agent 197 may monitor and measure performance of any application of the client. In some embodiments, the monitoring agent 197 monitors and measures performance of a browser on the client 102. In some embodiments, the monitoring agent 197 monitors and measures performance of any application delivered via the client agent 120. In other embodiments, the monitoring agent 197 measures and monitors end user response times for an application, such as web-based or HTTP response times. The monitoring agent 197 may monitor and measure performance of an ICA or RDP client. In another embodiment, the monitoring agent 197 measures and monitors metrics for a user session or application session. In some embodiments, monitoring agent 197 measures and monitors an ICA or RDP session. In some embodiments, the monitoring agent 197 measures and monitors the performance of the appliance 200 in accelerating delivery of an application and/or data to the client 102.

In some embodiments and still referring to FIG. 3, a first program 322 may be used to install and/or execute the client agent 120, or portion thereof, such as the interceptor 350, automatically, silently, transparently, or otherwise. In some embodiments, the first program 322 comprises a plugin component, such an ActiveX control or Java control or script that is loaded into and executed by an application. For example, the first program comprises an ActiveX control loaded and run by a web browser application, such as in the memory space or context of the application. In another embodiment, the first program 322 comprises a set of executable instructions loaded into and run by the application, such as a browser. In some embodiments, the first program 322 comprises a designed and constructed program to install the client agent 120. In some embodiments, the first program 322 obtains, downloads, or receives the client agent 120 via the network from another computing device. In another embodiment, the first program 322 is an installer program or a plug and play manager for installing programs, such as network drivers, on the operating system of the client 102.

D. Systems and Methods for Providing Virtualized Application Delivery Controller Referring now to FIG. 4A, a block diagram depicts one embodiment of a virtualization environment 400. In brief overview, a computing device 100 includes a hypervisor layer, a virtualization layer, and a hardware layer. The hypervisor layer includes a hypervisor 401 (also referred to as a virtualization manager) that allocates and manages access to a number of physical resources in the hardware layer (e.g., the processor(s) 421, and disk(s) 428) by at least one virtual machine executing in the virtualization layer. The virtualization layer includes at least one operating system 410 and a plurality of virtual resources allocated to the at least one operating system 410. Virtual resources may include, without limitation, a plurality of virtual processors 432a, 432b, 432c (generally 432), and virtual disks 442a, 442b, 442c (generally 442), as well as virtual resources such as virtual memory and virtual network interfaces. The plurality of virtual resources and the operating system 410 may be referred to as a virtual machine 406. A virtual machine 406 may include a control operating system 405 in communication with the hypervisor 401 and used to execute applications for managing and configuring other virtual machines on the computing device 100.

In greater detail, a hypervisor 401 may provide virtual resources to an operating system in any manner which simulates the operating system having access to a physical device. A hypervisor 401 may provide virtual resources to any number of guest operating systems 410a, 410b (generally 410). In some embodiments, a computing device 100 executes one or more types of hypervisors. In these embodiments, hypervisors may be used to emulate virtual hardware, partition physical hardware, virtualize physical hardware, and execute virtual machines that provide access to computing environments. Hypervisors may include those manufactured by VMWare, Inc., of Palo Alto, Calif.; the XEN hypervisor, an open source product whose development is overseen by the open source Xen.org community; HyperV, VirtualServer or virtual PC hypervisors provided by Microsoft, or others. In some embodiments, a computing device 100 executing a hypervisor that creates a virtual machine platform on which guest operating systems may execute is referred to as a host server. In one of these embodiments, for example, the computing device 100 is a XEN SERVER provided by Citrix Systems, Inc., of Fort Lauderdale, Fla.

In some embodiments, a hypervisor 401 executes within an operating system executing on a computing device. In one of these embodiments, a computing device executing an operating system and a hypervisor 401 may be said to have a host operating system (the operating system executing on the computing device), and a guest operating system (an operating system executing within a computing resource partition provided by the hypervisor 401). In other embodiments, a hypervisor 401 interacts directly with hardware on a computing device, instead of executing on a host operating system. In one of these embodiments, the hypervisor 401 may be said to be executing on "bare metal," referring to the hardware comprising the computing device.

In some embodiments, a hypervisor 401 may create a virtual machine 406a-c (generally 406) in which an operating system 410 executes. In one of these embodiments, for example, the hypervisor 401 loads a virtual machine image to create a virtual machine 406. In another of these embodiments, the hypervisor 401 executes an operating system 410 within the virtual machine 406. In still another of these embodiments, the virtual machine 406 executes an operating system 410.

In some embodiments, the hypervisor 401 controls processor scheduling and memory partitioning for a virtual machine 406 executing on the computing device 100. In one of these embodiments, the hypervisor 401 controls the execution of at least one virtual machine 406. In another of these embodiments, the hypervisor 401 presents at least one virtual machine 406 with an abstraction of at least one hardware resource provided by the computing device 100. In other embodiments, the hypervisor 401 controls whether and how physical processor capabilities are presented to the virtual machine 406.

A control operating system 405 may execute at least one application for managing and configuring the guest operating systems. In some embodiments, the control operating system 405 may execute an administrative application, such as an application including a user interface providing administrators with access to functionality for managing the execution of a virtual machine, including functionality for executing a virtual machine, terminating an execution of a virtual machine, or identifying a type of physical resource for allocation to the virtual machine. In another embodiment, the hypervisor 401 executes the control operating system 405 within a virtual machine 406 created by the hypervisor 401. In still another embodiment, the control operating system 405 executes in a virtual machine 406 that is authorized to directly access physical resources on the computing device 100. In some embodiments, a control operating system 405a on a computing device 100a may exchange data with a control operating system 405b on a computing device 100b, via communications between a hypervisor 401a and a hypervisor 401b. In this way, one or more computing devices 100 may exchange data with one or more of the other computing devices 100 regarding processors and other physical resources available in a pool of resources. In one of these embodiments, this functionality allows a hypervisor to manage a pool of resources distributed across a plurality of physical computing devices. In another of these embodiments, multiple hypervisors manage one or more of the guest operating systems executed on one of the computing devices 100.

In some embodiments, the control operating system 405 executes in a virtual machine 406 that is authorized to interact with at least one guest operating system 410. In another embodiment, a guest operating system 410 communicates with the control operating system 405 via the hypervisor 401 in order to request access to a disk or a network. In still another embodiment, the guest operating system 410 and the control operating system 405 may communicate via a communication channel established by the hypervisor 401, such as, for example, via a plurality of shared memory pages made available by the hypervisor 401.

In some embodiments, the control operating system 405 includes a network back-end driver for communicating directly with networking hardware provided by the computing device 100. In one of these embodiments, the network back-end driver processes at least one virtual machine request from at least one guest operating system 110. In other embodiments, the control operating system 405 includes a block back-end driver for communicating with a storage element on the computing device 100. In one of these embodiments, the block back-end driver reads and writes data from the storage element based upon at least one request received from a guest operating system 410.

In some embodiments, the control operating system 405 includes a tools stack 404. In another embodiment, a tools stack 404 provides functionality for interacting with the hypervisor 401, communicating with other control operating systems 405 (for example, on a second computing device 100b), or managing virtual machines 406b, 406c on the computing device 100. In another embodiment, the tools stack 404 includes customized applications for providing improved management functionality to an administrator of a virtual machine farm. In some embodiments, at least one of the tools stack 404 and the control operating system 405 include a management API that provides an interface for remotely configuring and controlling virtual machines 406 running on a computing device 100. In other embodiments, the control operating system 405 communicates with the hypervisor 401 through the tools stack 404.

In some embodiments, the hypervisor 401 executes a guest operating system 410 within a virtual machine 406 created by the hypervisor 401. In another embodiment, the guest operating system 410 provides a user of the computing device 100 with access to resources within a computing environment. In still another embodiment, a resource includes a program, an application, a document, a file, a plurality of applications, a plurality of files, an executable program file, a desktop environment, a computing environment, or other resource made available to a user of the computing device 100. In yet another embodiment, the resource may be delivered to the computing device 100 via a plurality of access methods including, but not limited to, conventional installation directly on the computing device 100, delivery to the computing device 100 via a method for application streaming, delivery to the computing device 100 of output data generated by an execution of the resource on a second computing device 100' and communicated to the computing device 100 via a presentation layer protocol, delivery to the computing device 100 of output data generated by an execution of the resource via a virtual machine executing on a second computing device 100', or execution from a removable storage device connected to the computing device 100, such as a USB device, or via a virtual machine executing on the computing device 100 and generating output data. In some embodiments, the computing device 100 transmits output data generated by the execution of the resource to another computing device 100'.

In some embodiments, the guest operating system 410, in conjunction with the virtual machine on which it executes, forms a fully-virtualized virtual machine which is not aware that it is a virtual machine; such a machine may be referred to as a "Domain U HVM (Hardware Virtual Machine) virtual machine". In another embodiment, a fully-virtualized machine includes software emulating a Basic Input/Output System (BIOS) in order to execute an operating system within the fully-virtualized machine. In still another embodiment, a fully-virtualized machine may include a driver that provides functionality by communicating with the hypervisor 401. In such an embodiment, the driver may be aware that it executes within a virtualized environment. In another embodiment, the guest operating system 410, in conjunction with the virtual machine on which it executes, forms a paravirtualized virtual machine, which is aware that it is a virtual machine; such a machine may be referred to as a "Domain U PV virtual machine". In another embodiment, a paravirtualized machine includes additional drivers that a fully-virtualized machine does not include. In still another embodiment, the paravirtualized machine includes the network back-end driver and the block back-end driver included in a control operating system 405, as described above.

Figure 4A:
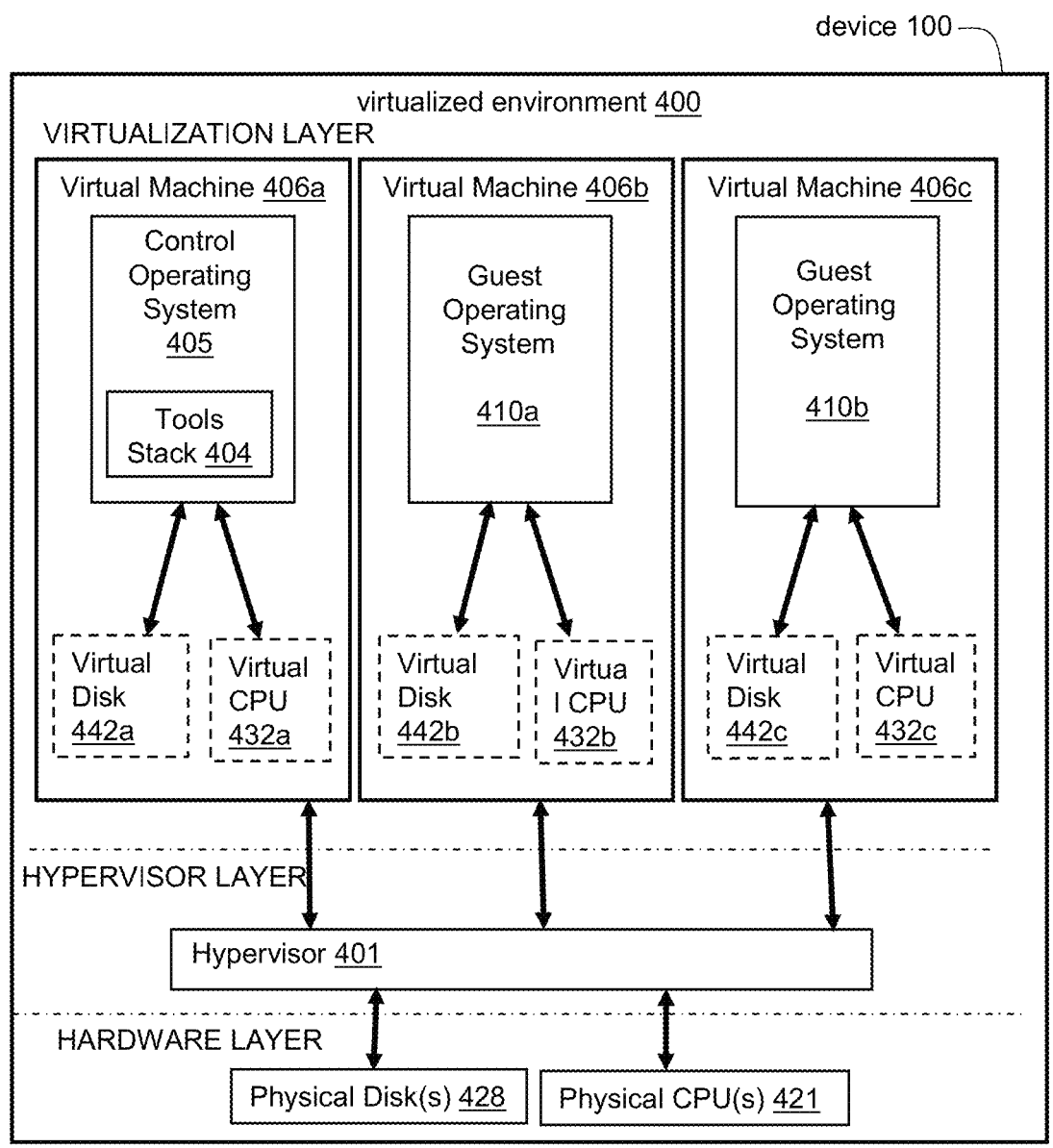
FIG. 4A is a block diagram of an embodiment of a virtualization environment.
Figure 4B:
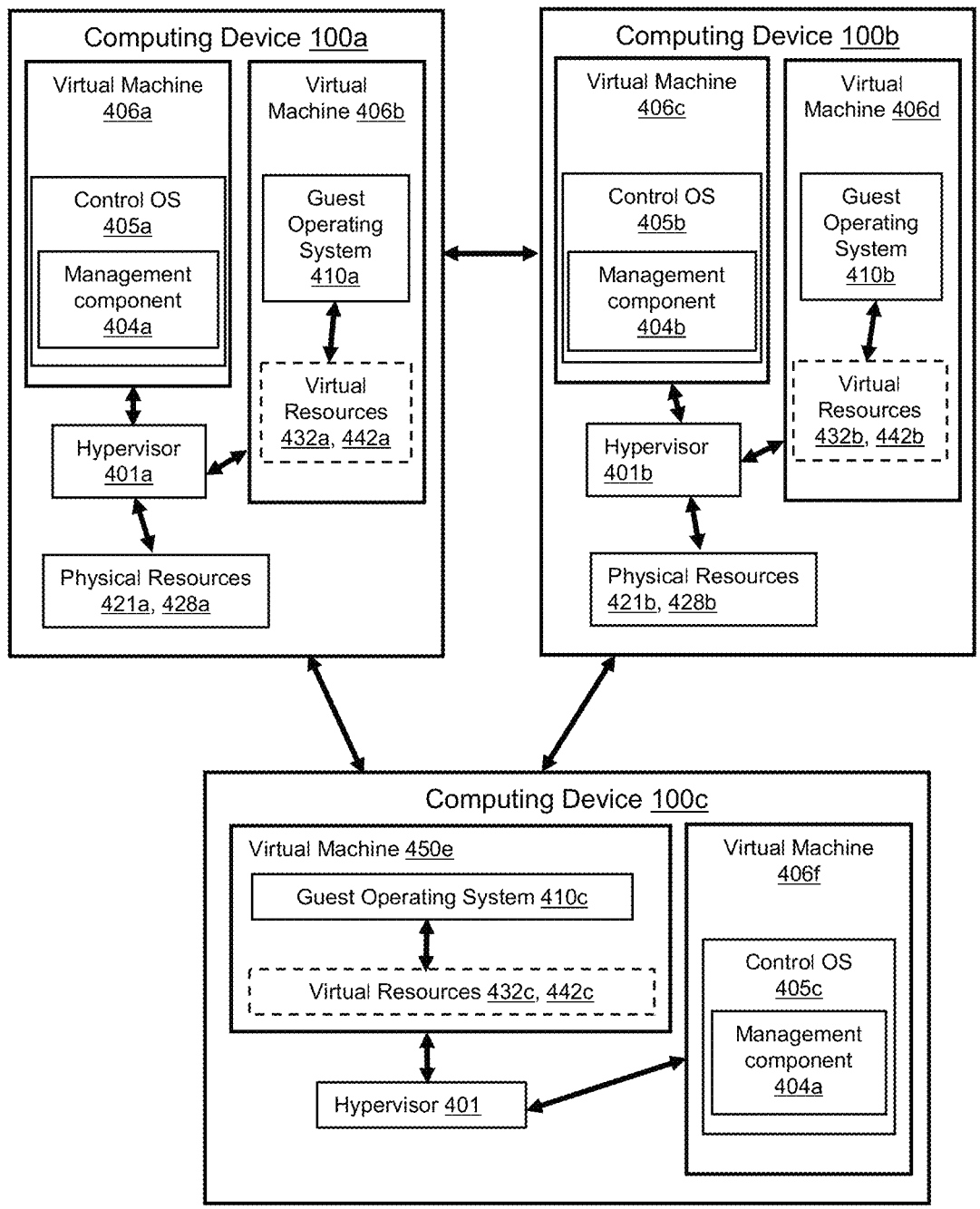
FIG. 4B is a block diagram of another embodiment of a virtualization environment.

Referring now to FIG. 4B, a block diagram depicts one embodiment of a plurality of networked computing devices in a system in which at least one physical host executes a virtual machine. In brief overview, the system includes a management component 404 and a hypervisor 401. The system includes a plurality of computing devices 100, a plurality of virtual machines 406, a plurality of hypervisors 401, a plurality of management components referred to variously as tools stacks 404 or management components 404, and a physical resource 421, 428. The plurality of physical machines 100 may each be provided as computing devices 100, described above in connection with FIGS. 1E-1H and 4A.

In greater detail, a physical disk 428 is provided by a computing device 100 and stores at least a portion of a virtual disk 442. In some embodiments, a virtual disk 442 is associated with a plurality of physical disks 428. In one of these embodiments, one or more computing devices 100 may exchange data with one or more of the other computing devices 100 regarding processors and other physical resources available in a pool of resources, allowing a hypervisor to manage a pool of resources distributed across a plurality of physical computing devices. In some embodiments, a computing device 100 on which a virtual machine 406 executes is referred to as a physical host 100 or as a host machine 100.

The hypervisor executes on a processor on the computing device 100. The hypervisor allocates, to a virtual disk, an amount of access to the physical disk. In some embodiments, the hypervisor 401 allocates an amount of space on the physical disk. In another embodiment, the hypervisor 401 allocates a plurality of pages on the physical disk. In some embodiments, the hypervisor provisions the virtual disk 442 as part of a process of initializing and executing a virtual machine 450.

In some embodiments, the management component 404a is referred to as a pool management component 404a. In another embodiment, a management operating system 405a, which may be referred to as a control operating system 405a, includes the management component. In some embodiments, the management component is referred to as a tools stack. In one of these embodiments, the management component is the tools stack 404 described above in connection with FIG. 4A. In other embodiments, the management component 404 provides a user interface for receiving, from a user such as an administrator, an identification of a virtual machine 406 to provision and/or execute. In still other embodiments, the management component 404 provides a user interface for receiving, from a user such as an administrator, the request for migration of a virtual machine 406b from one physical machine 100 to another. In further embodiments, the management component 404a identifies a computing device 100b on which to execute a requested virtual machine 406d and instructs the hypervisor 401b on the identified computing device 100b to execute the identified virtual machine; such a management component may be referred to as a pool management component.

Figure 4C:
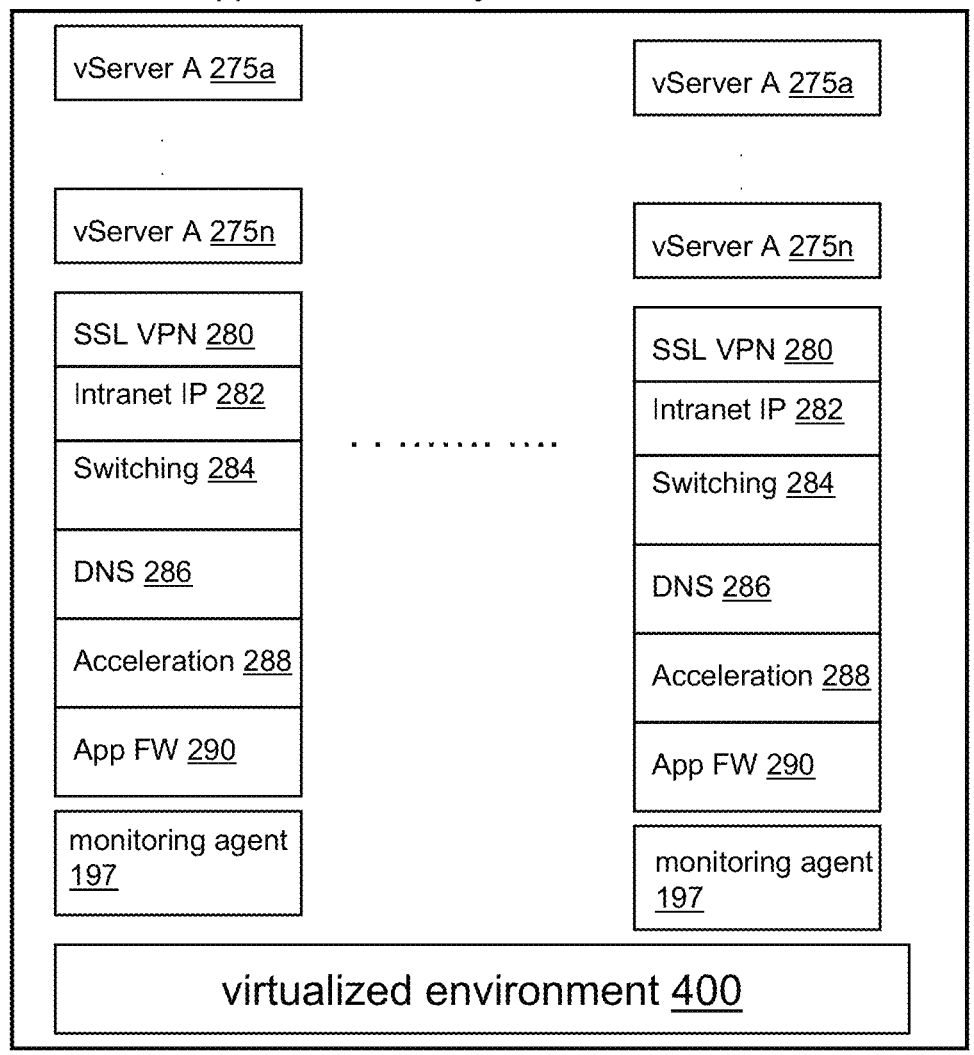
FIG. 4C is a block diagram of an embodiment of a virtualized appliance.

Referring now to FIG. 4C, embodiments of a virtual application delivery controller or virtual appliance 450 are depicted. In brief overview, any of the functionality and/or embodiments of the appliance 200 (e.g., an application delivery controller) described above in connection with FIGS. 2A and 2B may be deployed in any embodiment of the virtualized environment described above in connection with FIGS. 4A and 4B. Instead of the functionality of the application delivery controller being deployed in the form of an appliance 200, such functionality may be deployed in a virtualized environment 400 on any computing device 100, such as a client 102, server 106 or appliance 200.

Referring now to FIG. 4C, a diagram of an embodiment of a virtual appliance 450 operating on a hypervisor 401 of a server 106 is depicted. As with the appliance 200 of FIGS. 2A and 2B, the virtual appliance 450 may provide functionality for availability, performance, offload and security. For availability, the virtual appliance may perform load balancing between layers 4 and 7 of the network and may also perform intelligent service health monitoring. For performance increases via network traffic acceleration, the virtual appliance may perform caching and compression. To offload processing of any servers, the virtual appliance may perform connection multiplexing and pooling and/or SSL processing. For security, the virtual appliance may perform any of the application firewall functionality and SSL VPN function of appliance 200.

Any of the modules of the appliance 200 as described in connection with FIG. 2A may be packaged, combined, designed or constructed in a form of the virtualized appliance delivery controller 450 deployable as one or more software modules or components executable in a virtualized environment 300 or non-virtualized environment on any server, such as an off the shelf server. For example, the virtual appliance may be provided in the form of an installation package to install on a computing device. With reference to FIG. 2A, any of the cache manager 232, policy engine 236, compression 238, encryption engine 234, packet engine 240, GUI 210, CLI 212, shell services 214 and health monitoring programs 216 may be designed and constructed as a software component or module to run on any operating system of a computing device and/or of a virtualized environment 300. Instead of using the encryption processor 260, processor 262, memory 264 and network stack 267 of the appliance 200, the virtualized appliance 400 may use any of these resources as provided by the virtualized environment 400 or as otherwise available on the server 106.

Still referring to FIG. 4C, and in brief overview, any one or more vServers 275A-275N may be in operation or executed in a virtualized environment 400 of any type of computing device 100, such as any server 106. Any of the modules or functionality of the appliance 200 described in connection with FIG. 2B may be designed and constructed to operate in either a virtualized or non-virtualized environment of a server. Any of the vServer 275, SSL VPN 280, Intranet UP 282, Switching 284, DNS 286, acceleration 288, App FW 280 and monitoring agent may be packaged, combined, designed or constructed in a form of application delivery controller 450 deployable as one or more software modules or components executable on a device and/or virtualized environment 400.

In some embodiments, a server may execute multiple virtual machines 406a-406n in the virtualization environment with each virtual machine running the same or different embodiments of the virtual application delivery controller 450. In some embodiments, the server may execute one or more virtual appliances 450 on one or more virtual machines on a core of a multi-core processing system. In some embodiments, the server may execute one or more virtual appliances 450 on one or more virtual machines on each processor of a multiple processor device.

E. Systems and Methods for Providing A Multi-Core Architecture

In accordance with Moore's Law, the number of transistors that may be placed on an integrated circuit may double approximately every two years. However, CPU speed increases may reach plateaus, for example CPU speed has been around 3.5-4 GHz range since 2005. In some cases, CPU manufacturers may not rely on CPU speed increases to gain additional performance. Some CPU manufacturers may add additional cores to their processors to provide additional performance. Products, such as those of software and networking vendors, that rely on CPUs for performance gains may improve their performance by leveraging these multi-core CPUs. The software designed and constructed for a single CPU may be redesigned and/or rewritten to take advantage of a multi-threaded, parallel architecture or otherwise a multi-core architecture.

A multi-core architecture of the appliance 200, referred to as nCore or multi-core technology, allows the appliance in some embodiments to break the single core performance barrier and to leverage the power of multi-core CPUs. In the previous architecture described in connection with FIG. 2A, a single network or packet engine is run. The multiple cores of the nCore technology and architecture allow multiple packet engines to run concurrently and/or in parallel. With a packet engine running on each core, the appliance architecture leverages the processing capacity of additional cores. In some embodiments, this provides up to a 7× increase in performance and scalability.

Figure 5A:
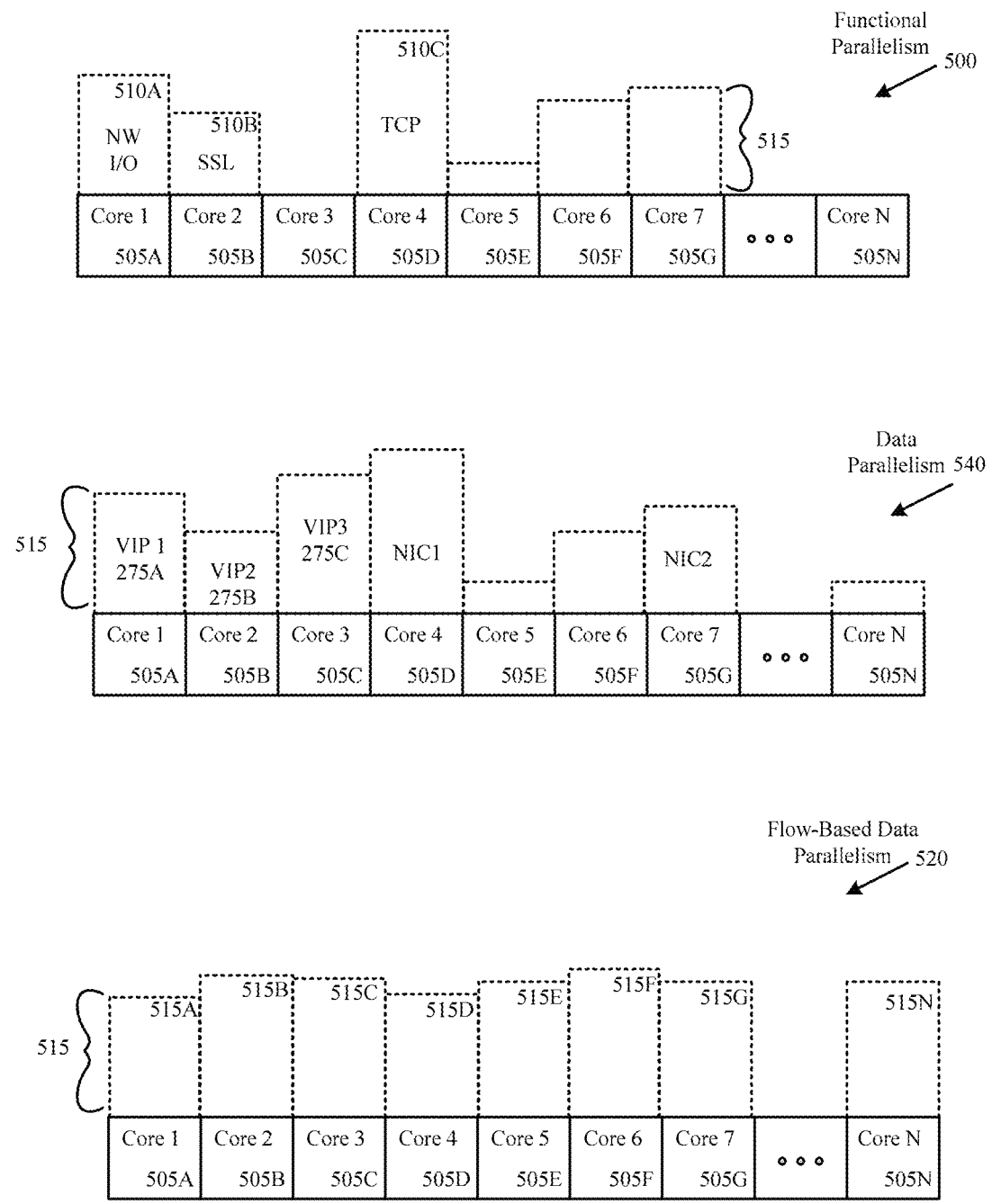
FIG. 5A are block diagrams of embodiments of approaches to implementing parallelism in a multi-core system.

Illustrated in FIG. 5A are some embodiments of work, task, load or network traffic distribution across one or more processor cores according to a type of parallelism or parallel computing scheme, such as functional parallelism, data parallelism or flow-based data parallelism. In brief overview, FIG. 5A illustrates embodiments of a multi-core system such as an appliance 200' with n-cores, a total of cores numbers 1 through N. In some embodiments, work, load or network traffic can be distributed among a first core 505A, a second core 505B, a third core 505C, a fourth core 505D, a fifth core 505E, a sixth core 505F, a seventh core 505G, and so on such that distribution is across all or two or more of the n cores 505N (hereinafter referred to collectively as cores 505.) There may be multiple VIPs 275 each running on a respective core of the plurality of cores. There may be multiple packet engines 240 each running on a respective core of the plurality of cores. Any of the approaches used may lead to different, varying or similar work load or performance level 515 across any of the cores. For a functional parallelism approach, each core may run a different function of the functionalities provided by the packet engine, a VIP 275 or appliance 200. In a data parallelism approach, data may be paralleled or distributed across the cores based on the Network Interface Card (NIC) or VIP 275 receiving the data. In another data parallelism approach, processing may be distributed across the cores by distributing data flows to each core.

In further detail to FIG. 5A, in some embodiments, load, work or network traffic can be distributed among cores 505 according to functional parallelism 500. Functional parallelism may be based on each core performing one or more respective functions. In some embodiments, a first core may perform a first function while a second core performs a second function. In functional parallelism approach, the functions to be performed by the multi-core system are divided and distributed to each core according to functionality. In some embodiments, functional parallelism may be referred to as task parallelism and may be achieved when each processor or core executes a different process or function on the same or different data. The core or processor may execute the same or different code. In some cases, different execution threads or code may communicate with one another as they work. Communication may take place to pass data from one thread to the next as part of a workflow.

In some embodiments, distributing work across the cores 505 according to functional parallelism 500, can comprise distributing network traffic according to a particular function such as network input/output management (NW I/O) 510A, secure sockets layer (SSL) encryption and decryption 510B and transmission control protocol (TCP) functions 510C. This may lead to a work, performance or computing load 515 based on a volume or level of functionality being used. In some embodiments, distributing work across the cores 505 according to data parallelism 540, can comprise distributing an amount of work 515 based on distributing data associated with a particular hardware or software component. In some embodiments, distributing work across the cores 505 according to flow-based data parallelism 520, can comprise distributing data based on a context or flow such that the amount of work 515A-N on each core may be similar, substantially equal or relatively evenly distributed.

In the case of the functional parallelism approach, each core may be configured to run one or more functionalities of the plurality of functionalities provided by the packet engine or VIP of the appliance. For example, core 1 may perform network I/O processing for the appliance 200' while core 2 performs TCP connection management for the appliance. Likewise, core 3 may perform SSL offloading while core 4 may perform layer 7 or application layer processing and traffic management. Each of the cores may perform the same function or different functions. Each of the cores may perform more than one function. Any of the cores may run any of the functionality or portions thereof identified and/or described in conjunction with FIGS. 2A and 2B. In this the approach, the work across the cores may be divided by function in either a coarse-grained or fine-grained manner. In some cases, as illustrated in FIG. 5A, division by function may lead to different cores running at different levels of performance or load 515.

In the case of the functional parallelism approach, each core may be configured to run one or more functionalities of the plurality of functionalities provided by the packet engine of the appliance. For example, core 1 may perform network I/O processing for the appliance 200' while core 2 performs TCP connection management for the appliance. Likewise, core 3 may perform SSL offloading while core 4 may perform layer 7 or application layer processing and traffic management. Each of the cores may perform the same function or different functions. Each of the cores may perform more than one function. Any of the cores may run any of the functionality or portions thereof identified and/or described in conjunction with FIGS. 2A and 2B. In this the approach, the work across the cores may be divided by function in either a coarse-grained or fine-grained manner. In some cases, as illustrated in FIG. 5A division by function may lead to different cores running at different levels of load or performance.

Figure 5B:
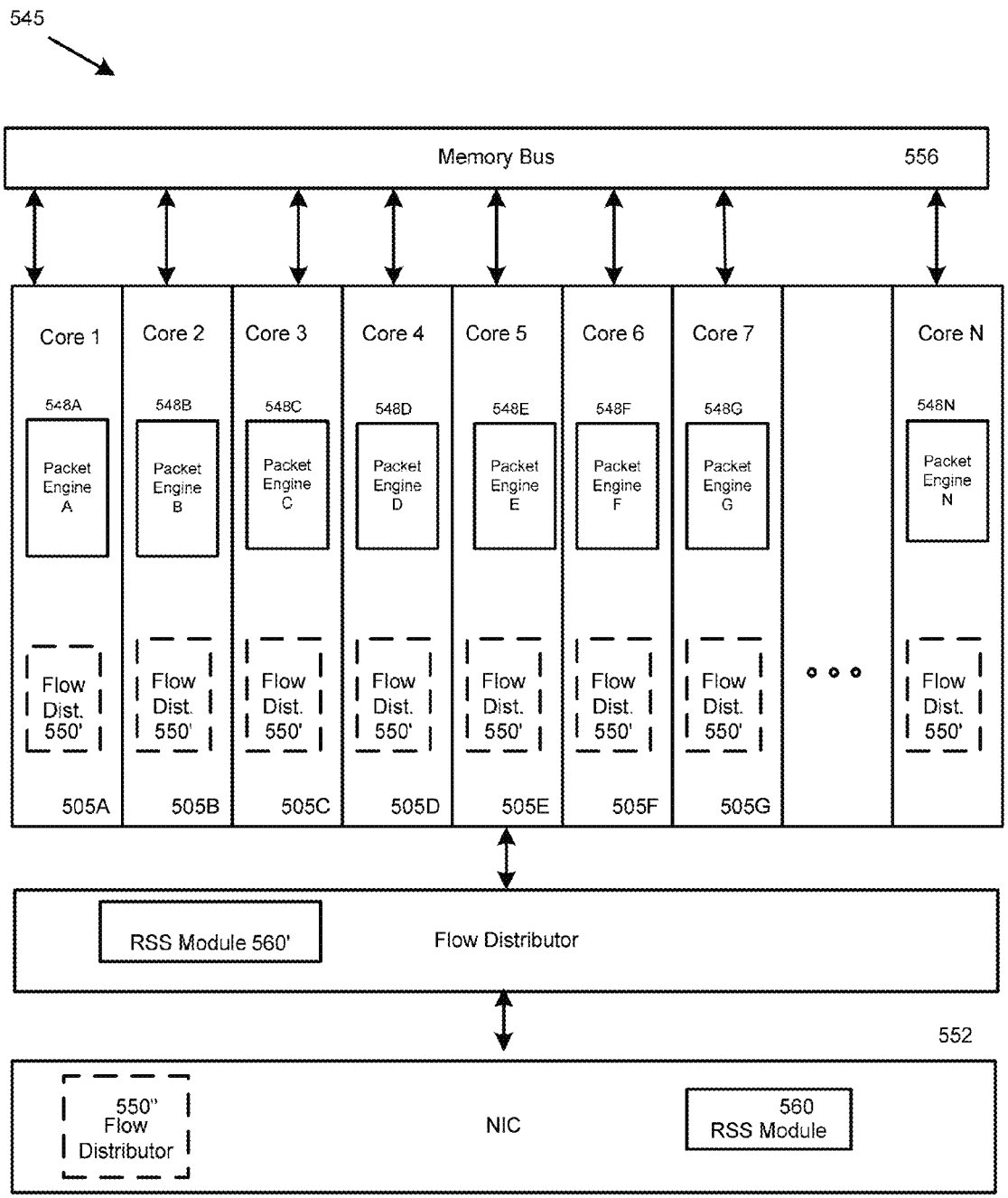
FIG. 5B is a block diagram of an embodiment of a system utilizing a multi-core system.

The functionality or tasks may be distributed in any arrangement and scheme. For example, FIG. 5B illustrates a first core, Core 1 505A, processing applications and processes associated with network I/O functionality 510A. Network traffic associated with network I/O, in some embodiments, can be associated with a particular port number. Thus, outgoing and incoming packets having a port destination associated with NW I/O 510A will be directed towards Core 1 505A which is dedicated to handling all network traffic associated with the NW I/O port. Similarly, Core 2 505B is dedicated to handling functionality associated with SSL processing and Core 4 505D may be dedicated handling all TCP level processing and functionality.

While FIG. 5A illustrates functions such as network I/O, SSL and TCP, other functions can be assigned to cores. These other functions can include any one or more of the functions or operations described herein. For example, any of the functions described in conjunction with FIGS. 2A and 2B may be distributed across the cores on a functionality basis. In some cases, a first VIP 275A may run on a first core while a second VIP 275B with a different configuration may run on a second core. In some embodiments, each core 505 can handle a particular functionality such that each core 505 can handle the processing associated with that particular function. For example, Core 2 505B may handle SSL offloading while Core 4 505D may handle application layer processing and traffic management.

In other embodiments, work, load or network traffic may be distributed among cores 505 according to any type and form of data parallelism 540. In some embodiments, data parallelism may be achieved in a multi-core system by each core performing the same task or functionally on different pieces of distributed data. In some embodiments, a single execution thread or code controls operations on all pieces of data. In other embodiments, different threads or instructions control the operation, but may execute the same code. In some embodiments, data parallelism is achieved from the perspective of a packet engine, vServers (VIPs) 275A-C, network interface cards (NIC) 542D-E and/or any other networking hardware or software included on or associated with an appliance 200. For example, each core may run the same packet engine or VIP code or configuration but operate on different sets of distributed data. Each networking hardware or software construct can receive different, varying or substantially the same amount of data, and as a result may have varying, different or relatively the same amount of load 515.

In the case of a data parallelism approach, the work may be divided up and distributed based on VIPs, NICs and/or data flows of the VIPs or NICs. In one of these approaches, the work of the multi-core system may be divided or distributed among the VIPs by having each VIP work on a distributed set of data. For example, each core may be configured to run one or more VIPs. Network traffic may be distributed to the core for each VIP handling that traffic. In another of these approaches, the work of the appliance may be divided or distributed among the cores based on which NIC receives the network traffic. For example, network traffic of a first NIC may be distributed to a first core while network traffic of a second NIC may be distributed to a second core. In some cases, a core may process data from multiple NICs.

While FIG. 5A illustrates a single vServer associated with a single core 505, as is the case for VIP1 275A, VIP2 275B and VIP3 275C. In some embodiments, a single vServer can be associated with one or more cores 505. In contrast, one or more vServers can be associated with a single core 505. Associating a vServer with a core 505 may include that core 505 to process all functions associated with that particular vServer. In some embodiments, each core executes a VIP having the same code and configuration. In other embodiments, each core executes a VIP having the same code but different configuration. In some embodiments, each core executes a VIP having different code and the same or different configuration.

Like vServers, NICs can also be associated with particular cores 505. In many embodiments, NICs can be connected to one or more cores 505 such that when a NIC receives or transmits data packets, a particular core 505 handles the processing involved with receiving and transmitting the data packets. In some embodiments, a single NIC can be associated with a single core 505, as is the case with NIC1 542D and NIC2 542E. In other embodiments, one or more NICs can be associated with a single core 505. In other embodiments, a single NIC can be associated with one or more cores 505. In these embodiments, load could be distributed amongst the one or more cores 505 such that each core 505 processes a substantially similar amount of load. A core 505 associated with a NIC may process all functions and/or data associated with that particular NIC.

While distributing work across cores based on data of VIPs or NICs may have a level of independency, in some embodiments, this may lead to unbalanced use of cores as illustrated by the varying loads 515 of FIG. 5A.

In some embodiments, load, work or network traffic can be distributed among cores 505 based on any type and form of data flow. In another of these approaches, the work may be divided or distributed among cores based on data flows. For example, network traffic between a client and a server traversing the appliance may be distributed to and processed by one core of the plurality of cores. In some cases, the core initially establishing the session or connection may be the core for which network traffic for that session or connection is distributed. In some embodiments, the data flow is based on any unit or portion of network traffic, such as a transaction, a request/response communication or traffic originating from an application on a client. In this manner and in some embodiments, data flows between clients and servers traversing the appliance 200' may be distributed in a more balanced manner than the other approaches.

In flow-based data parallelism 520, distribution of data is related to any type of flow of data, such as request/response pairings, transactions, sessions, connections or application communications. For example, network traffic between a client and a server traversing the appliance may be distributed to and processed by one core of the plurality of cores. In some cases, the core initially establishing the session or connection may be the core for which network traffic for that session or connection is distributed. The distribution of data flow may be such that each core 505 carries a substantially equal or relatively evenly distributed amount of load, data or network traffic.

In some embodiments, the data flow is based on any unit or portion of network traffic, such as a transaction, a request/response communication or traffic originating from an application on a client. In this manner and in some embodiments, data flows between clients and servers traversing the appliance 200' may be distributed in a more balanced manner than the other approached. In some embodiments, data flow can be distributed based on a transaction or a series of transactions. This transaction, in some embodiments, can be between a client and a server and can be characterized by an IP address or other packet identifier. For example, Core 1 505A can be dedicated to transactions between a particular client and a particular server, therefore the load 515A on Core 1 505A may be comprised of the network traffic associated with the transactions between the particular client and server. Allocating the network traffic to Core 1 505A can be accomplished by routing all data packets originating from either the particular client or server to Core 1 505A.

While work or load can be distributed to the cores based in part on transactions, in other embodiments load or work can be allocated on a per packet basis. In these embodiments, the appliance 200 can intercept data packets and allocate them to a core 505 having the least amount of load. For example, the appliance 200 could allocate a first incoming data packet to Core 1 505A because the load 515A on Core 1 is less than the load 515B-N on the rest of the cores 505B-N. Once the first data packet is allocated to Core 1 505A, the amount of load 515A on Core 1 505A is increased proportional to the amount of processing resources needed to process the first data packet. When the appliance 200 intercepts a second data packet, the appliance 200 will allocate the load to Core 4 505D because Core 4 505D has the second least amount of load. Allocating data packets to the core with the least amount of load can, in some embodiments, ensure that the load 515A-N distributed to each core 505 remains substantially equal.

In other embodiments, load can be allocated on a per unit basis where a section of network traffic is allocated to a particular core 505. The above-mentioned example illustrates load balancing on a per/packet basis. In other embodiments, load can be allocated based on a number of packets such that every 10, 100 or 1000 packets are allocated to the core 505 having the least amount of load. The number of packets allocated to a core 505 can be a number determined by an application, user or administrator and can be any number greater than zero. In still other embodiments, load can be allocated based on a time metric such that packets are distributed to a particular core 505 for a predetermined amount of time. In these embodiments, packets can be distributed to a particular core 505 for five milliseconds or for any period of time determined by a user, program, system, administrator or otherwise. After the predetermined time period elapses, data packets are transmitted to a different core 505 for the predetermined period of time.

Flow-based data parallelism methods for distributing work, load or network traffic among the one or more cores 505 can comprise any combination of the above-mentioned embodiments. These methods can be carried out by any part of the appliance 200, by an application or set of executable instructions executing on one of the cores 505, such as the packet engine, or by any application, program or agent executing on a computing device in communication with the appliance 200.

The functional and data parallelism computing schemes illustrated in FIG. 5A can be combined in any manner to generate a hybrid parallelism or distributed processing scheme that encompasses function parallelism 500, data parallelism 540, flow-based data parallelism 520 or any portions thereof. In some cases, the multi-core system may use any type and form of load balancing schemes to distribute load among the one or more cores 505. The load balancing scheme may be used in any combination with any of the functional and data parallelism schemes or combinations thereof.

Illustrated in FIG. 5B is an embodiment of a multi-core system 545, which may be any type and form of one or more systems, appliances, devices or components. This system 545, in some embodiments, can be included within an appliance 200 having one or more processing cores 505A-N. The system 545 can further include one or more packet engines (PE) or packet processing engines (PPE) 548A-N communicating with a memory bus 556. The memory bus may be used to communicate with the one or more processing cores 505A-N. Also included within the system 545 can be one or more network interface cards (NIC) 552 and a flow distributor 550 which can further communicate with the one or more processing cores 505A-N. The flow distributor 550 can comprise a Receive Side Scaler (RSS) or Receive Side Scaling (RSS) module 560.

Further referring to FIG. 5B, and in more detail, in one embodiment the packet engine(s) 548A-N can comprise any portion of the appliance 200 described herein, such as any portion of the appliance described in FIGS. 2A and 2B. The packet engine(s) 548A-N can, in some embodiments, comprise any of the following elements: the packet engine 240, a network stack 267; a cache manager 232; a policy engine 236; a compression engine 238; an encryption engine 234; a GUI 210; a CLI 212; shell services 214; monitoring programs 216; and any other software or hardware element able to receive data packets from one of either the memory bus 556 or the one of more cores 505A-N. In some embodiments, the packet engine(s) 548A-N can comprise one or more vServers 275A-N, or any portion thereof. In other embodiments, the packet engine(s) 548A-N can provide any combination of the following functionalities: SSL VPN 280; Intranet UP 282; switching 284; DNS 286; packet acceleration 288; App FW 280; monitoring such as the monitoring provided by a monitoring agent 197; functionalities associated with functioning as a TCP stack; load balancing; SSL offloading and processing; content switching; policy evaluation; caching; compression; encoding; decompression; decoding; application firewall functionalities; XML processing and acceleration; and SSL VPN connectivity.

The packet engine(s) 548A-N can, in some embodiments, be associated with a particular server, user, client or network. When a packet engine 548 becomes associated with a particular entity, that packet engine 548 can process data packets associated with that entity. For example, should a packet engine 548 be associated with a first user, that packet engine 548 will process and operate on packets generated by the first user, or packets having a destination address associated with the first user. Similarly, the packet engine 548 may choose not to be associated with a particular entity such that the packet engine 548 can process and otherwise operate on any data packets not generated by that entity or destined for that entity.

In some instances, the packet engine(s) 548A-N can be configured to carry out the any of the functional and/or data parallelism schemes illustrated in FIG. 5A. In these instances, the packet engine(s) 548A-N can distribute functions or data among the processing cores 505A-N so that the distribution is according to the parallelism or distribution scheme. In some embodiments, a single packet engine(s) 548A-N carries out a load balancing scheme, while in other embodiments one or more packet engine(s) 548A-N carry out a load balancing scheme. Each core 505A-N, In some embodiments, can be associated with a particular packet engine 548 such that load balancing can be carried out by the packet engine. Load balancing may in this embodiment, require that each packet engine 548A-N associated with a core 505 communicate with the other packet engines associated with cores so that the packet engines 548A-N can collectively determine where to distribute load. One embodiment of this process can include an arbiter that receives votes from each packet engine for load. The arbiter can distribute load to each packet engine 548A-N based in part on the age of the engine's vote and in some cases a priority value associated with the current amount of load on an engine's associated core 505.

Any of the packet engines running on the cores may run in user mode, kernel or any combination thereof. In some embodiments, the packet engine operates as an application or program running is user or application space. In these embodiments, the packet engine may use any type and form of interface to access any functionality provided by the kernel. In some embodiments, the packet engine operates in kernel mode or as part of the kernel. In some embodiments, a first portion of the packet engine operates in user mode while a second portion of the packet engine operates in kernel mode. In some embodiments, a first packet engine on a first core executes in kernel mode while a second packet engine on a second core executes in user mode. In some embodiments, the packet engine or any portions thereof operates on or in conjunction with the NIC or any drivers thereof.

In some embodiments the memory bus 556 can be any type and form of memory or computer bus. While a single memory bus 556 is depicted in FIG. 5B, the system 545 can comprise any number of memory buses 556. In some embodiments, each packet engine 548 can be associated with one or more individual memory buses 556.

The NIC 552 can in some embodiments be any of the network interface cards or mechanisms described herein. The NIC 552 can have any number of ports. The NIC can be designed and constructed to connect to any type and form of network 104. While a single NIC 552 is illustrated, the system 545 can comprise any number of NICs 552. In some embodiments, each core 505A-N can be associated with one or more single NICs 552. Thus, each core 505 can be associated with a single NIC 552 dedicated to a particular core 505. The cores 505A-N can comprise any of the processors described herein. Further, the cores 505A-N can be configured according to any of the core 505 configurations described herein. Still further, the cores 505A-N can have any of the core 505 functionalities described herein. While FIG. 5B illustrates seven cores 505A-G, any number of cores 505 can be included within the system 545. In particular, the system 545 can comprise "N" cores, where "N" is a whole number greater than zero.

A core may have or use memory that is allocated or assigned for use to that core. The memory may be considered private or local memory of that core and only accessible by that core. A core may have or use memory that is shared or assigned to multiple cores. The memory may be considered public or shared memory that is accessible by more than one core. A core may use any combination of private and public memory. With separate address spaces for each core, some level of coordination is eliminated from the case of using the same address space. With a separate address space, a core can perform work on information and data in the core's own address space without worrying about conflicts with other cores. Each packet engine may have a separate memory pool for TCP and/or SSL connections.

Further referring to FIG. 5B, any of the functionality and/or embodiments of the cores 505 described above in connection with FIG. 5A can be deployed in any embodiment of the virtualized environment described above in connection with FIGS. 4A and 4B. Instead of the functionality of the cores 505 being deployed in the form of a physical processor 505, such functionality may be deployed in a virtualized environment 400 on any computing device 100, such as a client 102, server 106 or appliance 200. In other embodiments, instead of the functionality of the cores 505 being deployed in the form of an appliance or a single device, the functionality may be deployed across multiple devices in any arrangement. For example, one device may comprise two or more cores and another device may comprise two or more cores. For example, a multi-core system may include a cluster of computing devices, a server farm or network of computing devices. In some embodiments, instead of the functionality of the cores 505 being deployed in the form of cores, the functionality may be deployed on a plurality of processors, such as a plurality of single core processors.

In some embodiments, the cores 505 may be any type and form of processor. In some embodiments, a core can function substantially similar to any processor or central processing unit described herein. In some embodiment, the cores 505 may comprise any portion of any processor described herein. While FIG. 5A illustrates seven cores, there can exist any "N" number of cores within an appliance 200, where "N" is any whole number greater than one. In some embodiments, the cores 505 can be installed within a common appliance 200, while in other embodiments the cores 505 can be installed within one or more appliance(s) 200 communicatively connected to one another. The cores 505 can in some embodiments comprise graphics processing software, while in other embodiments the cores 505 provide general processing capabilities. The cores 505 can be installed physically near each other and/or can be communicatively connected to each other. The cores may be connected by any type and form of bus or subsystem physically and/or communicatively coupled to the cores for transferring data between to, from and/or between the cores.

While each core 505 can comprise software for communicating with other cores, in some embodiments a core manager (not shown) can facilitate communication between each core 505. In some embodiments, the kernel may provide core management. The cores may interface or communicate with each other using a variety of interface mechanisms. In some embodiments, core to core messaging may be used to communicate between cores, such as a first core sending a message or data to a second core via a bus or subsystem connecting the cores. In some embodiments, cores may communicate via any type and form of shared memory interface. In some embodiments, there may be one or more memory locations shared among all the cores. In some embodiments, each core may have separate memory locations shared with each other core. For example, a first core may have a first shared memory with a second core and a second share memory with a third core. In some embodiments, cores may communicate via any type of programming or API, such as function calls via the kernel. In some embodiments, the operating system may recognize and support multiple core devices and provide interfaces and API for inter-core communications.

The flow distributor 550 can be any application, program, library, script, task, service, process or any type and form of executable instructions executing on any type and form of hardware. In some embodiments, the flow distributor 550 may any design and construction of circuitry to perform any of the operations and functions described herein. In some embodiments, the flow distributor distribute, forwards, routes, controls and/ors manage the distribution of data packets among the cores 505 and/or packet engine or VIPs running on the cores. The flow distributor 550, in some embodiments, can be referred to as an interface master. In some embodiments, the flow distributor 550 comprises a set of executable instructions executing on a core or processor of the appliance 200. In another embodiment, the flow distributor 550 comprises a set of executable instructions executing on a computing machine in communication with the appliance 200. In some embodiments, the flow distributor 550 comprises a set of executable instructions executing on a NIC, such as firmware. In still other embodiments, the flow distributor 550 comprises any combination of software and hardware to distribute data packets among cores or processors. In some embodiments, the flow distributor 550 executes on at least one of the cores 505A-N, while in other embodiments a separate flow distributor 550 assigned to each core 505A-N executes on an associated core 505A-N. The flow distributor may use any type and form of statistical or probabilistic algorithms or decision making to balance the flows across the cores. The hardware of the appliance, such as a NIC, or the kernel may be designed and constructed to support sequential operations across the NICs and/or cores.

In embodiments where the system 545 comprises one or more flow distributors 550, each flow distributor 550 can be associated with a processor 505 or a packet engine 548. The flow distributors 550 can comprise an interface mechanism that allows each flow distributor 550 to communicate with the other flow distributors 550 executing within the system 545. In one instance, the one or more flow distributors 550 can determine how to balance load by communicating with each other. This process can operate substantially similarly to the process described above for submitting votes to an arbiter which then determines which flow distributor 550 should receive the load. In other embodiments, a first flow distributor 550' can identify the load on an associated core and determine whether to forward a first data packet to the associated core based on any of the following criteria: the load on the associated core is above a predetermined threshold; the load on the associated core is below a predetermined threshold; the load on the associated core is less than the load on the other cores; or any other metric that can be used to determine where to forward data packets based in part on the amount of load on a processor.

The flow distributor 550 can distribute network traffic among the cores 505 according to a distribution, computing or load balancing scheme such as those described herein. In some embodiments, the flow distributor can distribute network traffic according to any one of a functional parallelism distribution scheme 550, a data parallelism load distribution scheme 540, a flow-based data parallelism distribution scheme 520, or any combination of these distribution scheme or any load balancing scheme for distributing load among multiple processors. The flow distributor 550 can therefore act as a load distributor by taking in data packets and distributing them across the processors according to an operative load balancing or distribution scheme. In some embodiments, the flow distributor 550 can comprise one or more operations, functions or logic to determine how to distribute packers, work or load accordingly. In still other embodiments, the flow distributor 550 can comprise one or more sub operations, functions or logic that can identify a source address and a destination address associated with a data packet, and distribute packets accordingly.

In some embodiments, the flow distributor 550 can comprise a receive-side scaling (RSS) network driver, module 560 or any type and form of executable instructions which distribute data packets among the one or more cores 505. The RSS module 560 can comprise any combination of hardware and software, In some embodiments, the RSS module 560 works in conjunction with the flow distributor 550 to distribute data packets across the cores 505A-N or among multiple processors in a multi-processor network. The RSS module 560 can execute within the NIC 552 in some embodiments, and in other embodiments can execute on any one of the cores 505.

In some embodiments, the RSS module 560 uses the MICROSOFT receive-side-scaling (RSS) scheme. In some embodiments, RSS is a Microsoft Scalable Networking initiative technology that enables receive processing to be balanced across multiple processors in the system while maintaining in-order delivery of the data. The RSS may use any type and form of hashing scheme to determine a core or processor for processing a network packet.

The RSS module 560 can apply any type and form hash function such as the Toeplitz hash function. The hash function may be applied to the hash type or any the sequence of values. The hash function may be a secure hash of any security level or is otherwise cryptographically secure. The hash function may use a hash key. The size of the key is dependent upon the hash function. For the Toeplitz hash, the size may be 40 bytes for IPv6 and 16 bytes for IPv4.

The hash function may be designed and constructed based on any one or more criteria or design goals. In some embodiments, a hash function may be used that provides an even distribution of hash result for different hash inputs and different hash types, including TCP/IPv4, TCP/IPv6, IPv4, and IPv6 headers. In some embodiments, a hash function may be used that provides a hash result that is evenly distributed when a small number of buckets are present (for example, two or four). In some embodiments, hash function may be used that provides a hash result that is randomly distributed when a large number of buckets were present (for example, 64 buckets). In some embodiments, the hash function is determined based on a level of computational or resource usage. In some embodiments, the hash function is determined based on ease or difficulty of implementing the hash in hardware. In some embodiments, the hash function is determined based on the ease or difficulty of a malicious remote host to send packets that would all hash to the same bucket.

The RSS may generate hashes from any type and form of input, such as a sequence of values. This sequence of values can include any portion of the network packet, such as any header, field or payload of network packet, or portions thereof. In some embodiments, the input to the hash may be referred to as a hash type and include any tuples of information associated with a network packet or data flow, such as any of the following: a four tuple comprising at least two IP addresses and two ports; a four tuple comprising any four sets of values; a six tuple; a two tuple; and/or any other sequence of numbers or values. The following are example of hash types that may be used by RSS:

- 4-tuple of source TCP Port, source IP version 4 (IPv4) address, destination TCP Port, and destination IPv4 address.
- 4-tuple of source TCP Port, source IP version 6 (IPv6) address, destination TCP Port, and destination IPv6 address.
- 2-tuple of source IPv4 address, and destination IPv4 address.
- 2-tuple of source IPv6 address, and destination IPv6 address.
- 2-tuple of source IPv6 address, and destination IPv6 address, including support for parsing IPv6 extension headers.

The hash result or any portion thereof may used to identify a core or entity, such as a packet engine or VIP, for distributing a network packet. In some embodiments, one or more hash bits or mask are applied to the hash result. The hash bit or mask may be any number of bits or bytes. A NIC may support any number of bits, such as seven bits. The network stack may set the actual number of bits to be used during initialization. The number will be between 1 and 7, inclusive.

The hash result may be used to identify the core or entity via any type and form of table, such as a bucket table or indirection table. In some embodiments, the number of hash-result bits are used to index into the table. The range of the hash mask may effectively define the size of the indirection table. ny portion of the hash result or the hast result itself may be used to index the indirection table. The values in the table may identify any of the cores or processor, such as by a core or processor identifier. In some embodiments, all of the cores of the multi-core system are identified in the table. In other embodiments, a port of the cores of the multi-core system are identified in the table. The indirection table may comprise any number of buckets for example 2 to 128 buckets that may be indexed by a hash mask. Each bucket may comprise a range of index values that identify a core or processor. In some embodiments, the flow controller and/or RSS module may rebalance the network rebalance the network load by changing the indirection table.

In some embodiments, the multi-core system 575 does not include a RSS driver or RSS module 560. In some of these embodiments, a software steering module (not shown) or a software embodiment of the RSS module within the system can operate in conjunction with or as part of the flow distributor 550 to steer packets to cores 505 within the multi-core system 575.

The flow distributor 550, in some embodiments, executes within any module or program on the appliance 200, on any one of the cores 505 and on any one of the devices or components included within the multi-core system 575. In some embodiments, the flow distributor 550' can execute on the first core 505A, while in other embodiments the flow distributor 550" can execute on the NIC 552. In still other embodiments, an instance of the flow distributor 550' can execute on each core 505 included in the multi-core system 575. In this embodiment, each instance of the flow distributor 550' can communicate with other instances of the flow distributor 550' to forward packets back and forth across the cores 505. There exist situations where a response to a request packet may not be processed by the same core, i.e. the first core processes the request while the second core processes the response. In these situations, the instances of the flow distributor 550' can intercept the packet and forward it to the desired or correct core 505, i.e. a flow distributor instance 550' can forward the response to the first core. Multiple instances of the flow distributor 550' can execute on any number of cores 505 and any combination of cores 505.

The flow distributor may operate responsive to any one or more rules or policies. The rules may identify a core or packet processing engine to receive a network packet, data or data flow. The rules may identify any type and form of tuple information related to a network packet, such as a 4-tuple of source and destination IP address and source and destination ports. Based on a received packet matching the tuple specified by the rule, the flow distributor may forward the packet to a core or packet engine. In some embodiments, the packet is forwarded to a core via shared memory and/or core to core messaging.

Although FIG. 5B illustrates the flow distributor 550 as executing within the multi-core system 575, in some embodiments the flow distributor 550 can execute on a computing device or appliance remotely located from the multi-core system 575. In such an embodiment, the flow distributor 550 can communicate with the multi-core system 575 to take in data packets and distribute the packets across the one or more cores 505. The flow distributor 550 can, In some embodiments, receive data packets destined for the appliance 200, apply a distribution scheme to the received data packets and distribute the data packets to the one or more cores 505 of the multi-core system 575. In some embodiments, the flow distributor 550 can be included in a router or other appliance such that the router can target particular cores 505 by altering meta data associated with each packet so that each packet is targeted towards a sub-node of the multi-core system 575. In such an embodiment, CISCO's vn-tag mechanism can be used to alter or tag each packet with the appropriate meta data.

Figure 5C:
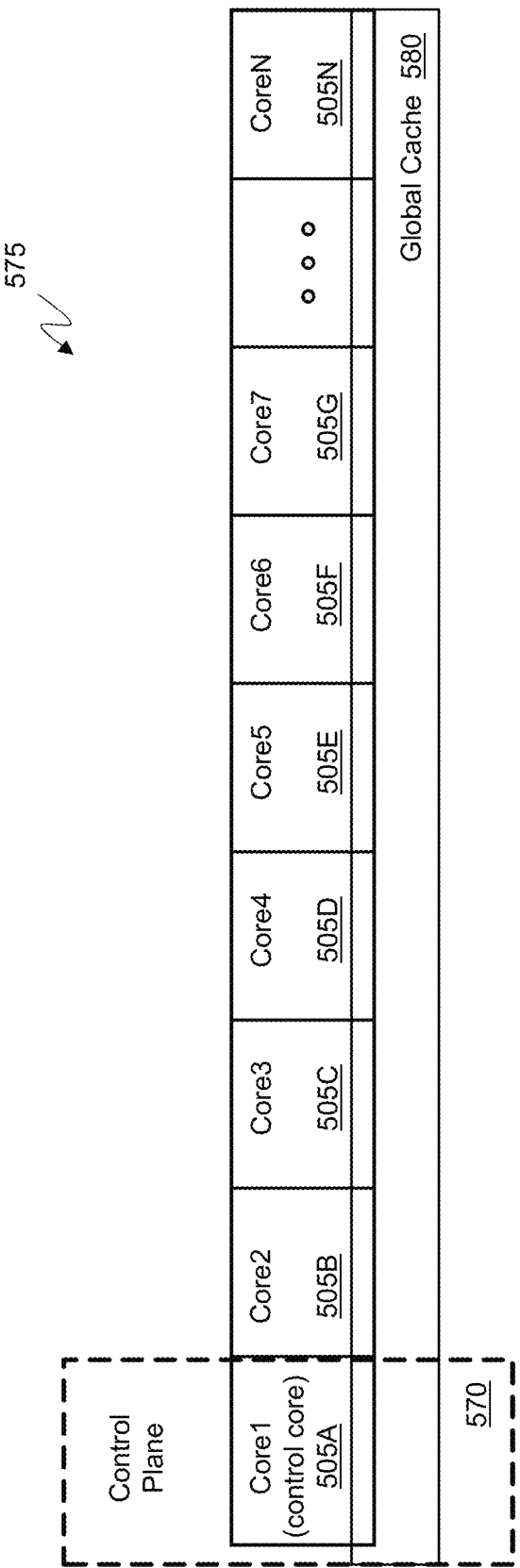
FIG. 5C is a block diagram of another embodiment of an aspect of a multi-core system

Illustrated in FIG. 5C is an embodiment of a multi-core system 575 comprising one or more processing cores 505A-N. In brief overview, one of the cores 505 can be designated as a control core 505A and can be used as a control plane 570 for the other cores 505. The other cores may be secondary cores which operate in a data plane while the control core provides the control plane. The cores 505A-N may share a global cache 580. While the control core provides a control plane, the other cores in the multi-core system form or provide a data plane. These cores perform data processing functionality on network traffic while the control provides initialization, configuration and control of the multi-core system.

Further referring to FIG. 5C, and in more detail, the cores 505A-N as well as the control core 505A can be any processor described herein. Furthermore, the cores 505A-N and the control core 505A can be any processor able to function within the system 575 described in FIG. 5C. Still further, the cores 505A-N and the control core 505A can be any core or group of cores described herein. The control core may be a different type of core or processor than the other cores. In some embodiments, the control may operate a different packet engine or have a packet engine configured differently than the packet engines of the other cores.

Any portion of the memory of each of the cores may be allocated to or used for a global cache that is shared by the cores. In brief overview, a predetermined percentage or predetermined amount of each of the memory of each core may be used for the global cache. For example, 50% of each memory of each code may be dedicated or allocated to the shared global cache. That is, in the illustrated embodiment, 2 GB of each core excluding the control plane core or core 1 may be used to form a 28 GB shared global cache. The configuration of the control plane such as via the configuration services may determine the amount of memory used for the shared global cache. In some embodiments, each core may provide a different amount of memory for use by the global cache. In other embodiments, any one core may not provide any memory or use the global cache. In some embodiments, any of the cores may also have a local cache in memory not allocated to the global shared memory. Each of the cores may store any portion of network traffic to the global shared cache. Each of the cores may check the cache for any content to use in a request or response. Any of the cores may obtain content from the global shared cache to use in a data flow, request or response.

The global cache 580 can be any type and form of memory or storage element, such as any memory or storage element described herein. In some embodiments, the cores 505 may have access to a predetermined amount of memory (i.e. 32 GB or any other memory amount commensurate with the system 575). The global cache 580 can be allocated from that predetermined amount of memory while the rest of the available memory can be allocated among the cores 505. In other embodiments, each core 505 can have a predetermined amount of memory. The global cache 580 can comprise an amount of the memory allocated to each core 505. This memory amount can be measured in bytes, or can be measured as a percentage of the memory allocated to each core 505. Thus, the global cache 580 can comprise 1 GB of memory from the memory associated with each core 505, or can comprise 20 percent or one-half of the memory associated with each core 505. In some embodiments, only a portion of the cores 505 provide memory to the global cache 580, while in other embodiments the global cache 580 can comprise memory not allocated to the cores 505.

Each core 505 can use the global cache 580 to store network traffic or cache data. In some embodiments, the packet engines of the core use the global cache to cache and use data stored by the plurality of packet engines. For example, the cache manager of FIG. 2A and cache functionality of FIG. 2B may use the global cache to share data for acceleration. For example, each of the packet engines may store responses, such as HTML data, to the global cache. Any of the cache managers operating on a core may access the global cache to server caches responses to client requests.

In some embodiments, the cores 505 can use the global cache 580 to store a port allocation table which can be used to determine data flow based in part on ports. In other embodiments, the cores 505 can use the global cache 580 to store an address lookup table or any other table or list that can be used by the flow distributor to determine where to direct incoming and outgoing data packets. The cores 505 can, in some embodiments read from and write to cache 580, while in other embodiments the cores 505 can only read from or write to cache 580. The cores may use the global cache to perform core to core communications.

The global cache 580 may be sectioned into individual memory sections where each section can be dedicated to a particular core 505. In some embodiments, the control core 505A can receive a greater amount of available cache, while the other cores 505 can receiving varying amounts or access to the global cache 580.

In some embodiments, the system 575 can comprise a control core 505A. While FIG. 5C illustrates core 1 505A as the control core, the control core can be any core within the appliance 200 or multi-core system. Further, while only a single control core is depicted, the system 575 can comprise one or more control cores each having a level of control over the system. In some embodiments, one or more control cores can each control a particular aspect of the system 575. For example, one core can control deciding which distribution scheme to use, while another core can determine the size of the global cache 580.

The control plane of the multi-core system may be the designation and configuration of a core as the dedicated management core or as a master core. This control plane core may provide control, management and coordination of operation and functionality the plurality of cores in the multi-core system. This control plane core may provide control, management and coordination of allocation and use of memory of the system among the plurality of cores in the multi-core system, including initialization and configuration of the same. In some embodiments, the control plane includes the flow distributor for controlling the assignment of data flows to cores and the distribution of network packets to cores based on data flows. In some embodiments, the control plane core runs a packet engine and in other embodiments, the control plane core is dedicated to management and control of the other cores of the system.

The control core 505A can exercise a level of control over the other cores 505 such as determining how much memory should be allocated to each core 505 or determining which core 505 should be assigned to handle a particular function or hardware/software entity. The control core 505A, in some embodiments, can exercise control over those cores 505 within the control plan 570. Thus, there can exist processors outside of the control plane 570 which are not controlled by the control core 505A. Determining the boundaries of the control plane 570 can include maintaining, by the control core 505A or agent executing within the system 575, a list of those cores 505 controlled by the control core 505A. The control core 505A can control any of the following: initialization of a core; determining when a core is unavailable; re-distributing load to other cores 505 when one core fails; determining which distribution scheme to implement; determining which core should receive network traffic; determining how much cache should be allocated to each core; determining whether to assign a particular function or element to a particular core; determining whether to permit cores to communicate with one another; determining the size of the global cache 580; and any other determination of a function, configuration or operation of the cores within the system 575.

F. Systems and Methods for Tracking Application Layer Flow Via a Multi-Connection Intermediary Device The present disclosure is directed towards systems and methods for tracking application layer flow via a multi-connection intermediary. In one aspect, transaction level or application layer information may be tracked via the intermediary, including one or more of: (i) the request method; (ii) response codes; (iii) URLs; (iv) HTTP cookies; (v) RTT of both ends of the transaction in a quad flow arrangement; (vi) server time to provide first byte of a communication; (vii) server time to provide the last byte of a communication; (viii) flow flags; or any other type and form of transaction level data may be captured, exported, and analyzed. In some embodiments, the application layer flow or transaction level information may be provided in an IPFIX-compliant data record. This may be done to provide template-based data record definition, as well as providing data on an application or transaction level of granularity. In some embodiments, the information may be intelligently aggregated responsive to application layer or transaction level information.

In some embodiments, application layer data flow or transaction based data flow may be tracked for the purposes of:

Traffic profiling and engineering: In some embodiments, recorded data may be used for finding out the distribution of traffic based on the protocol and input and output interfaces. For example, peak traffic levels, duration, and burstiness may be calculated so that provisioning of resources for peak hours may be performed correctly.

Flow issue debugging: In some embodiments, flow records may be used to determine end to end flow characteristics, even across multiple proxies or other intermediaries. This may be done through capture of additional transport or application layer information, such as negotiated maximum segment size (MSS), packet drop rates, retransmission rates, or any other type and form of information. Once end to end flow characteristics are determined, an administrator or user of the system, or an intelligent module of the system, may identify issues and causes interfering with proper flow in real time.

Accounting: While traditional flow-based monitoring allows billing based on use of each flow, it cannot identify when a single user is related to a plurality of flows. By capturing additional application or transport layer information, specific user-based flow records may be captured. Accordingly, billing and accounting may be performed based on the user and user-specific traffic.

Security: By capturing additional transport or application layer information and aggregating data by session rather than just flow, transport layer attacks may be tracked. For example, the number, rate, and source of SYN packets may be tracked, allowing generation of a real time warning. Similarly, the number, rate, and source of HTTP requests may be tracked. Such higher level attacks cannot be detected in traditional flow-based monitoring that fails to capture this information.

QoS monitoring: In some embodiments, enhanced quality of service (QoS) monitoring may be performed for flows by recording different levels of QoS fields like IP diffSery field, flow labels, MPLS labels, etc., while still granulating flows on a transaction level basis.

Figure 6A:
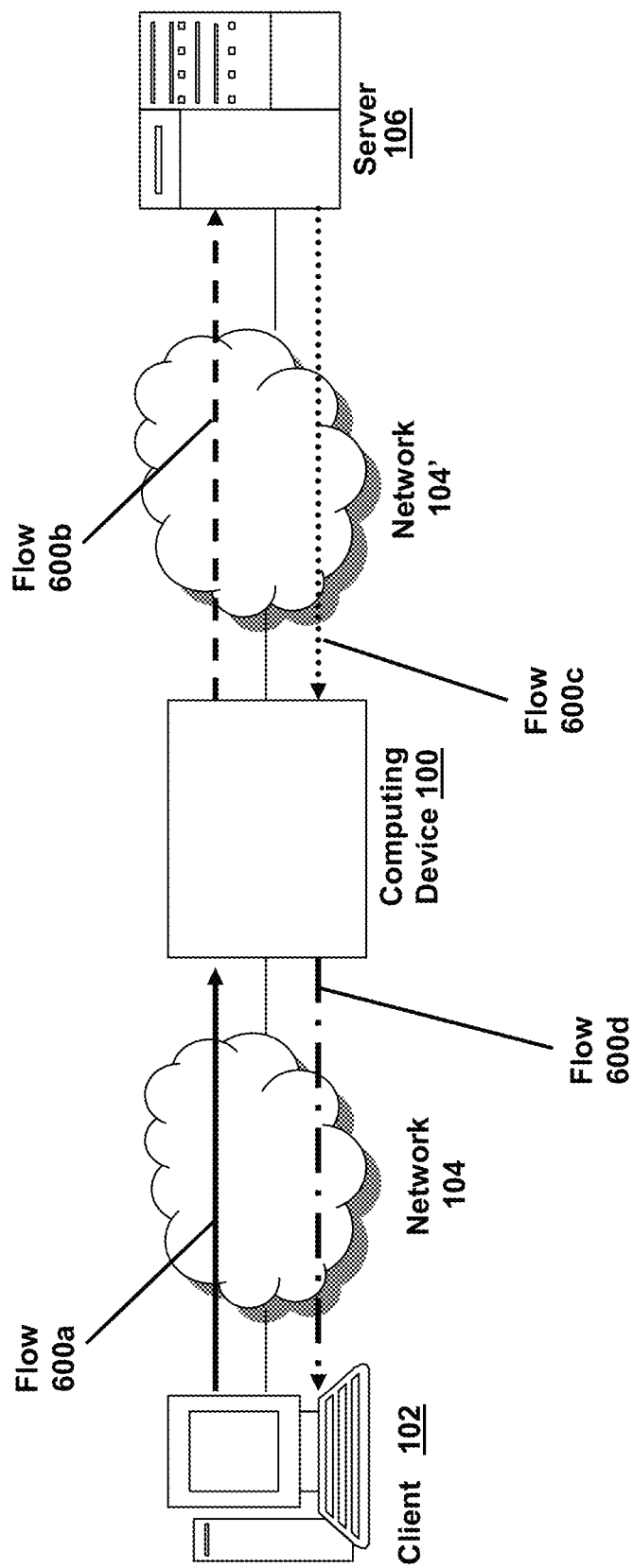
FIG. 6A is a block diagram of an embodiment of a deployment scenario of an intermediary device.

Referring to FIG. 6A, a block diagram of one embodiment of a deployment scenario is illustrated. In brief overview, a computing device 100 may be deployed as a middle node or layer 4-7 proxy between one or more clients 102 and servers 106. For each client and server communicating, there are four flows 600*a*-600*b* (although, if other intermediaries not illustrated exist along the client-server path, there may be additional flows). Accordingly, monitoring only these flows may miss session or transaction based details of the flows. For example, in traditional IPFIX, flows are defined as one sided flows. This naturally aligns with layer 3 flow information. Even in embodiments where a client-intermediary flow and an intermediary server flow are linked together at the session level, layer 3 flow information may not reflect this. Similarly, layer 3-based flow information may show duplex flows as separate flows.

Figure 6B:
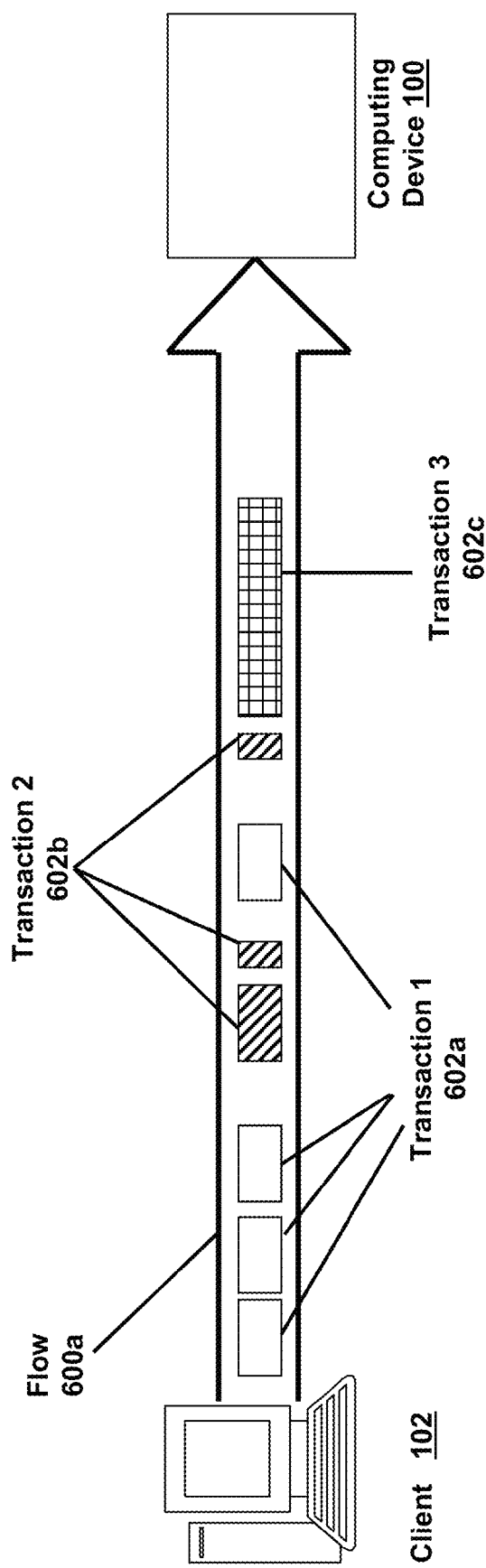
FIG. 6B is a block diagram illustrating a duplex quad-flow between a first device, a second device, and an intermediary deployed between the first and second devices.

Referring now to FIG. 6B, in some embodiments, a single flow 600a may comprise packets of multiple transactions 602a-602c. In many embodiments, these transactions may not be identifiable using only network layer flow information, which may only classify the flow based on the incoming or outgoing interfaces/routes. Even though actual flow is more or less the same in layer 3 and layer 4, in many embodiments, the frequency of information and number of classified flows differ drastically. For example at layer 3, if the flows are classified based on the outgoing interfaces and device has 6 interfaces, outgoing data is divided into 6 different flows. Instead, to properly capture and identify these packets within the flow, in some embodiments, a capture device may export higher layer 4-7 information, such as session based information at layer 4 (e.g. a TCP session) or transaction based at layer 7 (HTTP transactions). In some embodiments, unless the flow records are needed for near real time monitoring or report generation, the number of data records exported may be drastically reduced by sampling and aggregating.

Figure 6C:
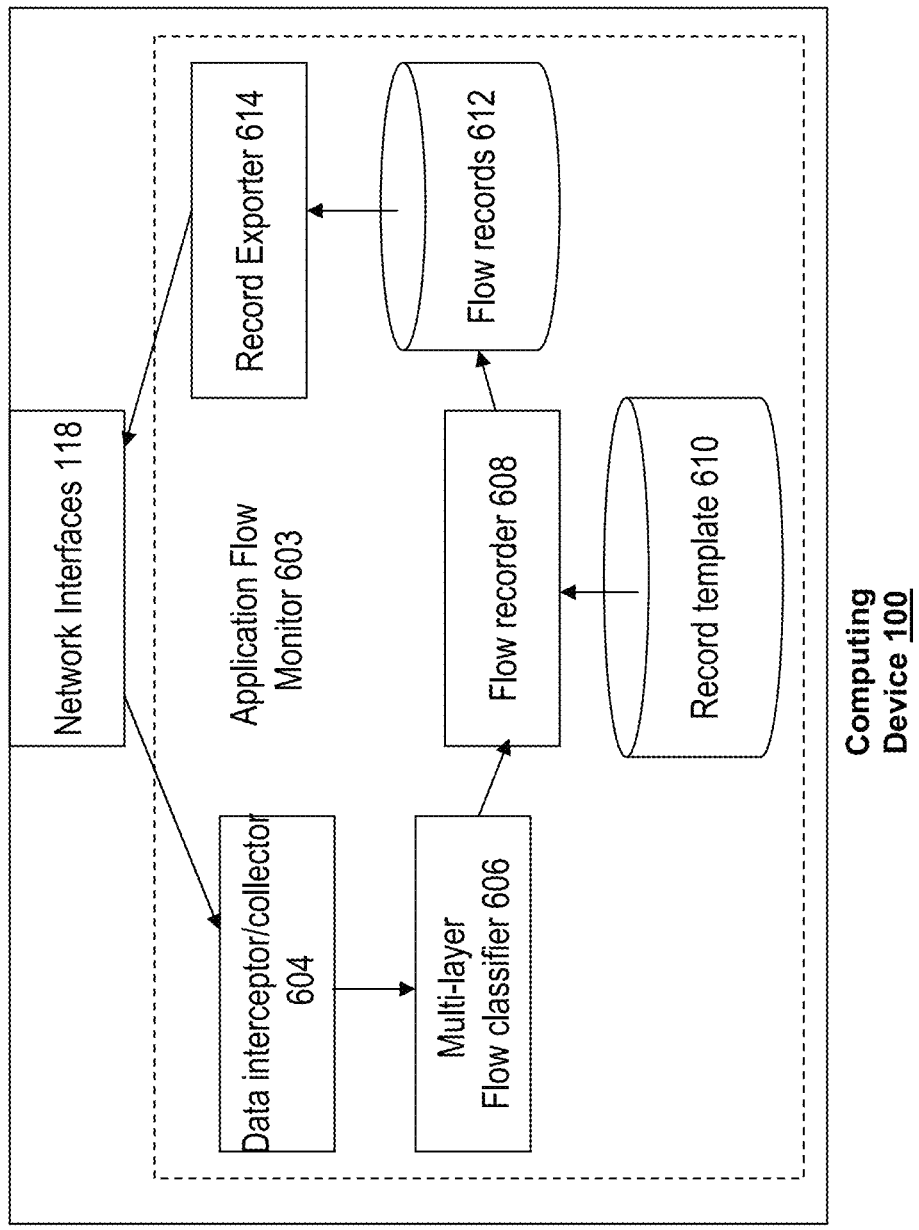
FIG. 6C is a block diagram of an embodiment of an appliance for tracking application layer flow via a multi-connection intermediary device.
Figure 10B:
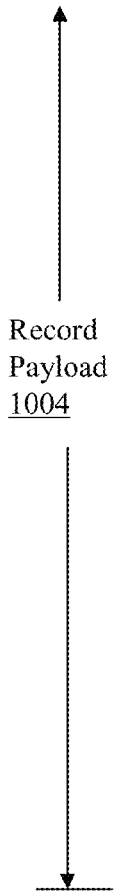
Figure 11B:
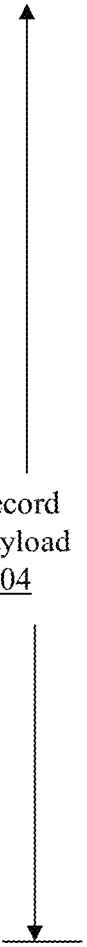
Figure 12B:

Referring now to FIG. 6C, illustrated is a block diagram of an embodiment of an appliance for tracking application layer flow via a multi-connection intermediary device. In some embodiments, the appliance may be referred to as or comprise an IPFIX exporter. In brief overview, a computing device 100 may include a data interceptor 604, a multi-layer flow classifier 606, a flow recorder 608, and a record exporter 614, with one or more of these elements collectively described as an application flow monitor 603. These modules may interact with, read from, or write to one or more databases or data files including a record template 610 and a database of flow records 612.

Each of a multi-layer flow classifier 606, a flow recorder 608, and a record exporter 614 may comprise one or more modules, applications, services, daemons, routines, or any type and form of executable instructions executing on a device, such as computing device 100 or appliance 200. In some embodiments, a packet engine may comprise any or all of the multi-layer flow classifier 606, a flow recorder 608, and a record exporter 614. In some embodiments, a virtual server may comprise any or all of the multi-layer flow classifier 606, a flow recorder 608, and a record exporter 614.

The multi-layer flow classifier may be designed and constructed to identify flows of network traffic at one or more layers of the network stack. The multi-layer flow classifier may be designed and constructed to identify flows of network traffic at layer 3, layer 4 and application layer 7 of the network stack. The multi-layer flow classifier may be designed and constructed to identify transport layer flows, via transport layer connections or sessions. The multi-layer flow classifier may be designed and constructed to identify application layer flows. The multi-layer flow classifier may be designed and constructed to identify flows between multiple transport layer connections established or managed by the appliance. The multi-layer flow classifier may be designed and constructed to identify flows between multiple application layer transactions traversing the transport layer connections established or managed by the appliance. The multi-layer flow classifier may use tuple information to identify transport layer flows. The multi-layer flow classifier may use application layer information, such as HTTP data, to identify application layer flows.

Responsive to the multi-layer flow classifier, the flow recorder may be designed and constructed to record data, information and records on the flows identified by multi-layer flow classifier. In some embodiments, the multi-layer flow classifier communicates or provides flow identification information to the flow recorded. In some embodiments, the multi-layer flow classifier may store via the flow recorder flow records to the records database, such as via an API call. The flow recorder may store records for or via a record template to a records database. The flow recorder may store to a record database records for identified flows based on a corresponding record template.

The records database may comprise any type and form of database or storage system. In some embodiments, the records database may be a memory based database. In some embodiments, the records database may comprise an object, data structure or file. In some embodiments, the records database may store records to disk or other storage medium. The records database may store records for any flows traversing the computing device or appliance. In some embodiments, the records database is stored or maintained on a device, such as a server, external to the appliance or computing device.

A record exporter 614 may be used to export one or more records from the records database. The record exporter may export record(s) responsive to a request. The record exporter may export records in any type and form of format, which may specified via the export request. In some embodiments, the record exporter may export records on a per flow basis. In some embodiments, the record exporter may export an aggregate, group or set of records based on any one or more of a flow id, transaction id and/or session id. In some embodiments, the record exporter may export records based on a record template. In some embodiments, the record exporter may export records based on type of record template requested for the export.

The record template 610 may comprise elements in support of or supported by the IPFIX standard. The record template 610 may comprise elements to extend support or include support for layer 4 and layer 7 records. The record template 610 may be designed and constructed to comprise or identify any record elements illustrated in FIGS. 7-13B, or any portions thereof. In some embodiments, a record template 610 may comprise template records for exporting layer 4 and layer 7 data records. Record templates may comprise information for exporting both layer 4 and layer 7 flows. In some embodiments, a record template 610 may comprise one or more fields for TCP session level information. In another embodiment, a record template 610 may comprise one or more fields for HTTP transaction level information. In some embodiments, a record template 610 may comprise a field for identifying a transaction identifier. The transaction identifier may identify a transaction at or for any layer of the network stack. In some embodiments, the record template may comprise a record element for a transaction identifier for an application layer transaction. In some embodiments, the record template may comprise a record element for a transaction identifier for a transport layer transaction. In some embodiments, the record template may comprise a record element for a session identifier, such as a TCP or HTTP session. This may be done to allow aggregation of multiple data records for a single HTTP transaction or TCP session by linking all of the related data records. In another embodiment, record template 610 may comprise fields for one or more session or transaction metering statistics, in addition to any flow metering statistics.

In some embodiments, record template 610 may be editable by a user or administrator. This may be done to allow the administrator or user to select and modify information elements (IEs) from the supported templates. In other embodiments, the administrator or user may configure or define policies applied by multi-layer flow classifier 606, flow recorder 608, or record exporter 614 to control how data is captured and when and where it is exported to. In some embodiments, the administrator or user may define one or more sampling or filtering parameters for sampling and filtering Layer 4 and Layer 7 flows, in order to reduce the size of flow records 612.

In a further embodiment, the record exporter 614 and data collector 604 may comprise functionality for managing the user of a connection of network interface 118. In another embodiment, record exporter 614 may authenticate flow records 612 by verifying transaction or flow identifiers with data collector 604.

In some embodiments, in accordance with a record template 610, a flow classifier 606 or recorder 608 may identify and record one or more transport layer attributes of a metered flow, including:

1. IP version number, such as IPv4 or IPv6
2. Source IP address
3. Destination IP address
4. IP protocol type (TCP, UDP, ICMP, etc. ...)
5. If the protocol type is TCP or UDP, then source TCP/UDP port number
6. If the protocol type is TCP or UDP, then destination TCP/UDP port number
7. Number of packets. In some embodiments, if a packet is fragmented, each fragment may be counted as an individual packet.
8. Number of bytes (i.e. the sum of the total length in bytes of all IP packets belonging to the flow. In some embodiments, the total length of a packet includes the IP header and IP payload)
9. Type of service octet for IPv4 packets, or traffic class octet for IPv6 packets. In many embodiments, and in accordance with IETF RFC 2474, these octets may include the DiffSery Code Point field.
10. Flow Label for IPv6 packets
11. Top Multiprotocol Label Switching (MPLS) label or forwarding equivalence class (FEC) corresponding to the label, as defined in IETF RFC 3031.
12. Timestamp of the first packet of the flow
13. Timestamp of the last packet of the flow
14. Sampling configuration, if sampling was used to reduce the number of packets recorded
15. Unique identifier of the observation point
16. Unique identifier of the exporting process
17. One or more flags, depending on different application layer protocols or processes applied, including tagged binary control protocol (TBCP) data, certificate management protocol (CMP) data, secure socket layer (SSL) data, etc.
18. TCP flags field holding the information regarding SYN/FIN/RST information
19. Maximum Segment Size (MSS)
20. Round Trip Time (RTT)
21. TCP options and parameters, such as window scaling or selective acknowledgements (SACK).

In other embodiments, in accordance with a record template 610, a flow classifier 606 or recorder 608 may identify and record one or more application layer attributes of a metered flow, including:

1. The request method
2. Response code
3. Response length
4. Uniform Resource Locator (URL)
5. HTTP Cookie
6. Referrer
7. Host
8. User-Agent
9. Round trip time of both ends in a quad flow implementation (as shown in FIG. 4A, for example)
10. Front end HTTP version
11. Back end HTTP version
12. Server time to first byte (TTFB)
13. Server time to last byte (TTLB)

In some embodiments, layer 7 information may be captured and exported by sending the full application layer request/response headers as a single concatenated variable length information element. In other embodiments, one or more of the above identified fields may be extracted and placed into a data record as information elements. In still other embodiments, a combination of these methods may be used: some or all of the above identified fields may be extracted from application layer headers, and additional fields, such as options fields or extra header fields, may be sent as a single variable length information element.

As discussed above, in traditional client-intermediary-server deployments, ingress and egress from each device may be classified as different flows. Accordingly, in many embodiments, a packet control buffer of an intermediary that receives data from one device, such as a client, and sends the data to another device, such as a server, may have two different flows associated with it, even though the data is part of a single transaction and the flows are linked. Thus, each client session proxied through the intermediary at the transport layer may have four different flows (i.e. two flows each, on the client and server side). In some embodiments, each flow record for each flow may be associated with a flow identifier, or Flow ID key. These records may then be linked to each other.

Similarly, in many embodiments, layer 7 flows may be similarly classified into ingress and egress flows having the same set of records. Layer 7 data records may also include layer 7 information elements, as discussed above. Since layer 7 flows are transaction based flows, transactions within the flows can be separated out by including, in some embodiments, a transaction identifier or transaction ID key. In a further embodiment, the flow ID and transaction ID pair may be used to stitch or relate all of the data records belonging to both client side and server side flows.

Figure 13B:
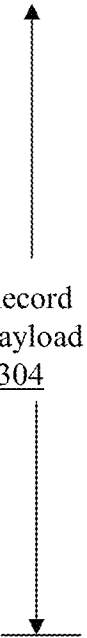

Referring briefly to FIGS. 7-13B, illustrated are several embodiments of data record templates useful for tracking application or transport layer flows. Shown in FIG. 7 is an embodiment of an IPv4 layer 4 ingress record 700, including a header 702 and payload 704. Illustrated in FIGS. 8A and 8B is an embodiment of an IPv4 layer 7 ingress record 800, including a header 802 and payload 804 (divided between FIGS. 8A and 8B for clarity). Illustrated in FIG. 9 is an embodiment of an IPv6 ingress record 900, including a header 902 and payload 904. Illustrated in FIGS. 10A and 10B is an embodiment of an IPv6 layer 7 ingress record 1000, including a header 1002 and payload 1004 (divided between FIGS. 10A and 10B for clarity). Illustrated in FIGS. 11A and 11B is an embodiment of an IPv4 server to intermediary record 1100, including a header 1102 and payload 1104 (divided between FIGS. 11A and 11B for clarity). Illustrated in FIGS. 12A and 12B is an embodiment of an IPv6 server to intermediary record 1200, including a header 1202 and payload 1204 (divided between FIGS. 12A and 12B for clarity). And illustrated in FIGS. 13A and 13B is an embodiment of an IPv6 layer 4 egress record 1300, with header 1302 and payload 1304 (divided between FIGS. 13A and 13B for clarity). One of skill in the art may readily extend the distinctions between the ingress record and egress records shown in FIGS. 9 and 13A-13B to realize the corresponding egress records for any other embodiment.

Still referring to FIGS. 7-13B, it may be helpful to discuss several common features in these embodiments of records. In many embodiments of the records, enterprise information elements may be used to provide future expansion and scalability. Observation point identifiers may comprise unique numbers for each device, or each network layer within a device that a probe is performed at. This may allow for multiple observation points within a single network stack. Export process identifiers may comprise unique numbers for each packet engine in a device, allowing fine grained filtering, sampling, and other statistics.

A flow identifier may comprise a unique identifier of a predetermined length, such as 64-bits, for each single-direction TCP flow processed by the exporter. A transaction identifier may comprise an identifier, unique for each packet engine of a device, for every data exchange session (such as a TCP connection pair for a layer 4 template, or an HTTP transaction for a layer 7 template). Each IPFIX data record corresponding to the four flows of a TCP connection pair will carry identical values for a transaction ID, for example. Similarly, a connection identifier may comprise an identifier for every TCP connection, and IPFIX data records for both flows associated with a single TCP connection (ingress and egress) will have identical connection ID values. IP version identifiers may comprise the IP version field in the IP packet header. The IP protocol number may comprise the value of the protocol number in the IP packet header identifying the payload type, and defined in the IRNA protocol numbers registry. The protocol number may be in the protocol field of an IPv4 packet, or in the next header field in the last extension header of an IPv6 packet.

Source IPs and destination IPs may be recorded in data records. In some embodiments, only ingress side flows may include the IP addresses. This may be done where the egress side flow is passed via a packet buffer of an intermediary device from a corresponding ingress side flow, and prevents the intermediary's IP address from being recorded. Similarly, in some embodiments, source and destination port numbers may only be recorded on the ingress side flow.

In some embodiments, the records may include a packet count of the number of packets received since the previous data record was sent (if any) for a flow, and/or a byte count of the number of bytes received since the previous data record was send (if any) for the flow. In many embodiments, the records may include a time for first packet (TFFP) or time the first packet was received on an ingress path, or sent on an egress path. Similarly, the records may include a time for last packet (TFLP), or time the last packet was received on the ingress path or sent on the egress path. Similarly, the records may include a time to first byte (TTFB), or time for the first response byte to be received from the server; and a time to last byte (TTLB), or time the last response byte is received from the server.

In many embodiments, the records may include a round trip time. In a further embodiment, round trip time may only be recorded on egress flows (because an ingress flow may not have an identification of when the packet was sent or when a response will be received). In other embodiments, the records may include one or more of an HTTP request URL, HTTP Request Cookie, HTTP Request Referrer, HTTP Request Method, HTTP Request Host, HTTP Request User-Agent. In a further embodiment, these values may only be recorded in layer 7 templates for client side ingress flow start and complete. In a similar embodiment, the records may include one or more of an HTTP Response Status, and an HTTP Response Length. In a further embodiment, these values may only be recorded in layer 7 templates for server side ingress flow start and complete.

In some embodiments, records may include flow flags. These flow flags may be applicable to one or more templates, and may be applicable to all or some of the records, such as just end, complete, or start records. Flow flags may be used to identify attributes of the flow, including window scaling, SACK, window scale value, maximum segment size, endpoint identification, CMP, TCP Buffering, HTTP version, push flags, RSP, cache, HTTP Denial of Service Protection, stream control, secure socket layer communication, message types, respond-before-request requirements, identification of a client input or output, identification of a server input or output, and an identification of whether the record was generated by an intermediary or a client-side packet control buffer. In some embodiments, the message type identification may comprise an identification of a FIN terminated flow, content length flow, chunked flow, byte range flow, or aborted transaction flow.

In some embodiments, event and system log messages may be generated by one or more modules within the system. These log messages are not typically considered part of a packet flow, but are rather event logs that usually appear in a syslog or auditlog of a computing device. However, in one embodiment of the systems and methods discussed herein, these messages may be captured and sent via IPFIX, allowing extensible remote monitoring capability. In some embodiments, policies and assorted actions may be applied to determine whether to export a log message, and to what receiver to export the log message to. In some embodiments, these polices may indicate to deliver a log message to specific receivers based on the severity of the event that the log message is associated with.

Figure 14:
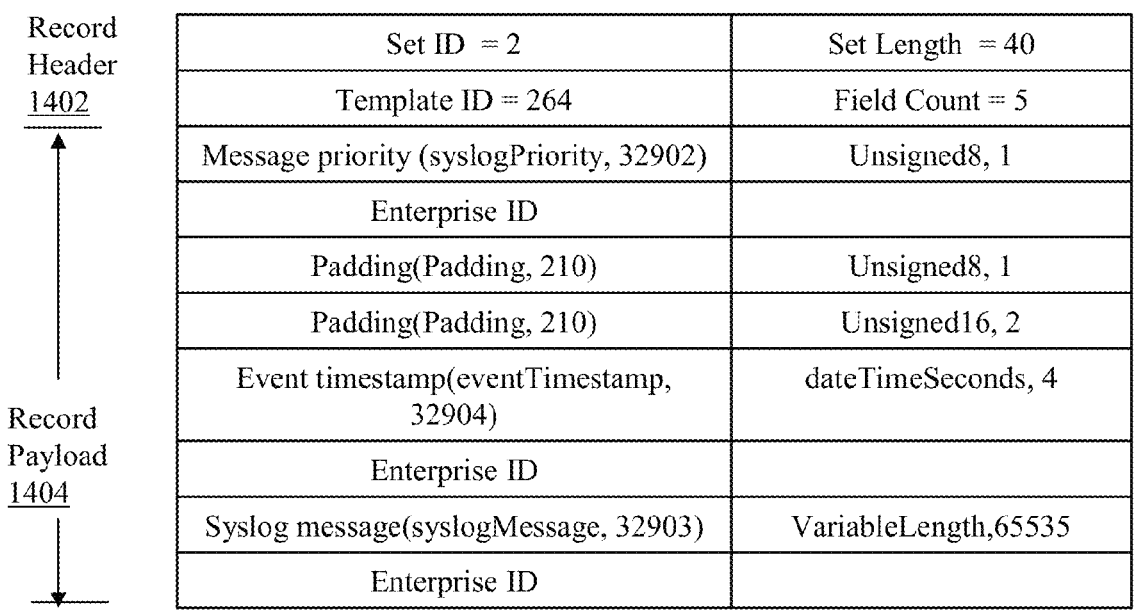
FIG. 14 is a table of an embodiment of a data record template useful for exporting system logs.

An embodiment of a system event log template 1400 for IPFIX is illustrated in FIG. 14, including a header 1402 and payload 1404. In some embodiments, the fields may include a message priority, such as those described in IETF RFC 5424. In some embodiments, the priority value may comprise a facility number multiplied by 8, plus a numerical value of the severity of the event. Thus, in some embodiments, the priority value may comprise both an identification of the device, unit, module, or other log generating entity as well as a severity identifier. In another embodiment, the fields may include an event timestamp, such as a Unix timestamp or other identifier to indicate when the event occurred. In some embodiments, the field may include a system log message or event log message of variable length. In a further embodiment, this log message may be formatted as: <Hostname><Process name>:<Agent name><Message name><Message sequence number>:<Message>.

In some embodiments, aggregated flow records at layer 4 and layer 7 may be similar to layer 3 records. However, these records may be unwieldy due to size and the inclusion of data from different transactions, and it may be tough to make intelligent network management decisions based off the aggregated records. Accordingly, In some embodiments, the number of data records generated may be reduced through sampling. In another embodiment, filtering of the input data or data in a record prior to exporting may be applied to reduce the output record to only traffic information desired by a user or administrator. For example, filtering may be applied based on a particular virtual IP address, or a configured service. In some embodiments, filter policies may not require explicit configuration, but rather may be enabled or disabled based on virtual IP address or service, providing the same filtering capability. In some embodiments, sampling may be applied by one or more packet engines of a device, utilizing the same or different sampling parameters. In many embodiments, filtering may be applied in conjunction with sampling, such as filtering and then sampling, to further constrain the recorded data.

In some embodiments, exported data records may be processed by a collector. A collector may comprise an application, server, process, service, daemon, routine, or other executable logic for accepting information from multiple streams and maintaining or storing the information so that users can retrieve data of interest. In some embodiments, a collector may comprise a device that receives IPFIX records from one or more exporters. In other embodiments, a collector and exporter may be modules executed by a single device, such as an intermediary. In some embodiments, the collector may store data in a database with key fields as an index. In another embodiment, the collector may store data in a simple file format with metadata comprising the exporter key fields. In some embodiments, the collector may store data in a relational database management system (RDBMS) configured to index the key fields for easy searching of the related data records.

In some embodiments, to provide authentication between an exporter and a collector, the exporter may be configured with an IP address of the collector. The collector may also be configured with the IP address of the exporter. By comparing received records with preconfigured IP addresses, the collector may verify the source for authentication purposes. In some embodiments, the collector may aggregate data records from multiple exporters. For example, multiple packet engines in a system or device may each act as exporters, including one on each of the four flows of a duplex communication via an intermediary. These exporters may all be associated with the same IP address, being executed by the intermediary. Accordingly, a single collector may aggregate their data records based on the IP address.

In some embodiments, the collector and export may communicate via UDP, over either IPv4 or IPv6. While UDP does not include the reliability of TCP, messages may be sequenced with a sequence number that identifies the number of data records that have been exported. This may allow the collector to detect dropped or out of order messages. In some embodiments, to avoid fragmentation, templates may be divided into 512 byte payload lengths before transmission to the collector. Data records may be sent with full maximum transmission unit (MTU) length with a "don't fragment" (DF) bit set. This avoids fragmentation of templates and avoids path MTU discovery from being applied during transmission of the templates. In other embodiments, secured protocols such as datagram transport layer security (DTLS) may be used.

Figure 15:
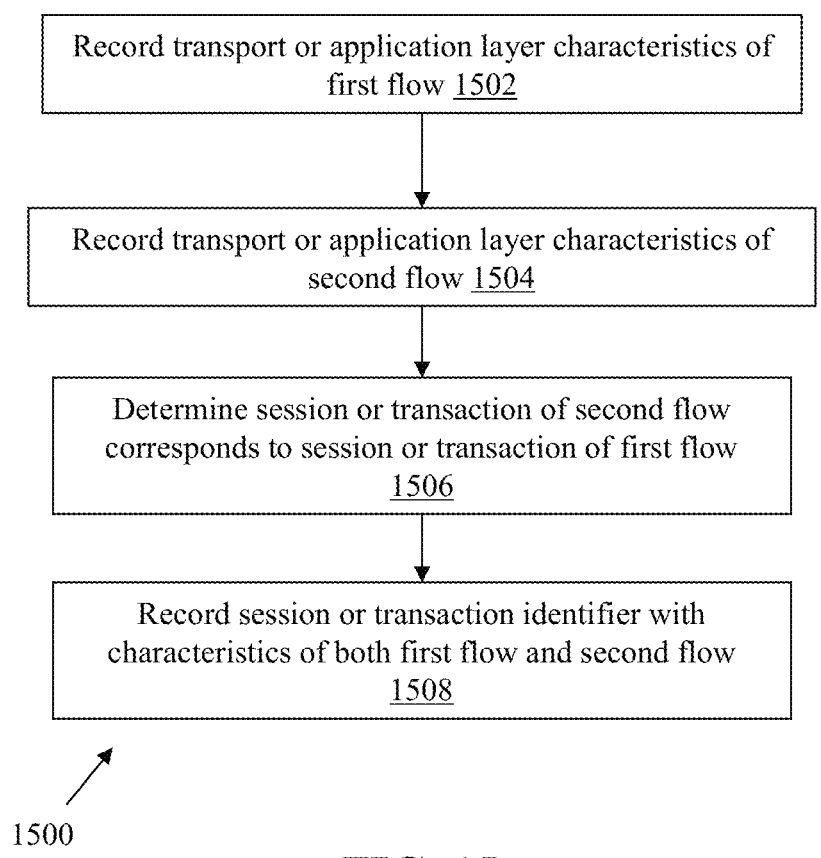
FIG. 15 is a flow chart of an embodiment of a method for tracking application layer flow via a multi-connection intermediary device.

Referring now to FIG. 15, illustrated is a method 1500 of tracking application or session layer flow via a multi-connection intermediary device. In brief overview, at step 1502, a metering process executed by a processor of a multi-connection intermediary device deployed between a plurality of clients and/or servers may record transport or application layer characteristics of a first flow, the first flow being received from one of the plurality of clients and/or servers. At step 1504, the metering process device may record transport or application layer characteristics of a second flow, the second flow being sent to a second one of the plurality of clients and/or servers. At step 1506, the metering process or an exporter process executed by the processor may determine that the session or transaction of the first flow corresponds to the session or transaction of the second flow. At step 1508, the metering process or exporter process may record a session or transaction identifier with the recorded characteristics of both the first flow and the second flow.

Still referring to FIG. 15 and in more detail, in some embodiments, a multi-connection intermediary device may be deployed as an intermediary between a plurality of clients and/or servers, referred to generally as a plurality of devices. The intermediary device may have a first connection to a first device of the plurality of devices, and a second connection to a second device of the plurality of devices. Each of these connections may include a corresponding data flow, with a first flow via the first connection and a second flow via the second connection. At steps 1502 and 1504, a monitoring or metering process executed by the intermediary device may record one or more application layer or transport layer characteristics of each flow. In many embodiments, these application layer or transport layer characteristics may be recorded in addition to network layer characteristics of the flow. In a further embodiment, the characteristics may be recorded in an application-specific flow record (AppFlow) or IPFIX record.

At step 1506, the monitoring or metering process, or an exporter executed by the intermediary device, may determine that the session or transaction of the first flow corresponds to the session or transaction of the second flow. In many embodiments, the two flows may correspond because the intermediary receives data from the first device and transmits the data to the second device, sometimes after performing one or more processing steps. Accordingly, the data from the first device may be directed to the second device. Determining the sessions or transactions of the two flows correspond or are related may comprise identifying one or more identical characteristics of the flows, such as destination IP, destination port, source IP, source port, transaction type, application or service that generated the data, HTTP request or response header information, sequence numbers, or any other type and form of information.

At step 1508, the metering or monitoring process may record a session or transaction identifier with the recorded characteristics of the first flow and second flow. The session or transaction identifier recorded with each flow may be identical, or, in a further embodiment, be substantially identical with a predetermine bit or bits set to identify a sub-characteristic, such as an ingress or egress flow.

In some embodiments, the flow data records created by method 1500 may be further divided by session or transaction. For example, in one such embodiment, upon detection of a transaction boundary, such as the end of a transaction, a FIN flag, a PSH flag, a timeout expiration, a satisfied response to a request, or other similar identification, the monitoring or metering process may close the record, and create a new record for a next transaction or flow. In other embodiments, the intermediary device may further monitor and record additional flows. For example, in many embodiments with duplex communications between the first and second device, the intermediary may receive or transmit a total of four flows for the duplex communication. Each flow may be related to the same session or transaction, and thus, in accordance with method 1500, data records for each of the four flows of the duplex communication may include the session or transaction identifier. In other embodiments, such as in a multicast flow, other numbers of flows may correspond to the same session or transaction, and data records for these flows may comprise the same session or transaction identifier.

Figure 16:
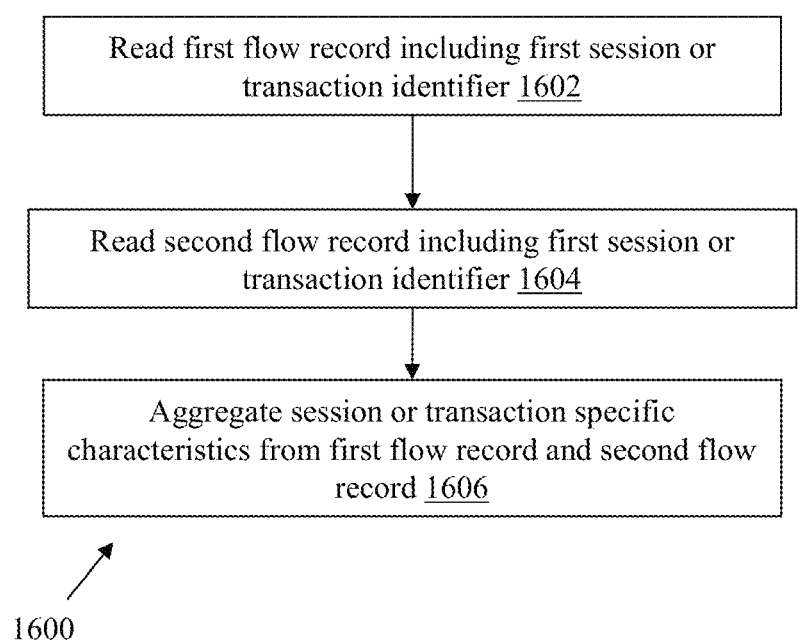
FIG. 16 is a flow chart of an embodiment of a method for aggregating flow data records by session or transaction-specific characteristics.

Referring now to FIG. 16, illustrated is a method 1600 for aggregating flow data records by application or session layer characteristics. In brief overview, at step 1602, a collector process executed by a device may read a first flow record, the first flow record including a first session or transaction identifier. At step 1604, the collector may read a second flow record, including the first session or transaction identifier. In many embodiments, the first flow record and second flow record may comprise AppFlow or IPFIX flow records. In a further embodiment, the first flow record and second flow record may comprise application or session layer characteristics, including transaction-specific characteristics of the flows. At step 1606, the collector may aggregate the first and second flow records, responsive to determining that both flow records include the same session or transaction identifier. In a further embodiment, the collector may provide the aggregated flow records to a user, administrator, or analyzer for determination of QoS settings or other network configuration.

G. Systems and Methods for Tracking Application Layer Flow of Database Applications In a further concept from the above-discussed systems and methods for monitoring application flow, database applications such as MSSQL or MySQL may present unique challenges for application flow monitoring, particularly in scalable implementations utilizing a large number of database servers aggregated in a cloud or farm to fulfill database requests of clients. For example, it may be difficult to monitor application flows between the client attempting to access a remote database, because different requests may be directed to different servers for load balancing and scalability. For example, a group of servers can be used to maintain a single database in order to manage bandwidth over the network. In some implementations, the group of servers can include a master server and one or more slave servers. Each server maintains an identical copy of the database, so a read request can be directed to any of the servers. However, write requests may be directed to the master server. The master server can update its copy of the database in response to the write request, and can then alert the slave servers to update their copies of the database accordingly or transmit updated copies of the database or write commands to each of the slave servers. Because different servers receive different requests related to the database, it is not sufficient to monitor a single network path to capture the application layer flow. Instead, an intermediary device can be placed between the client and the servers, and the intermediary can be used to monitor the flows and direct database requests and responses appropriately. Application flow information relating to both the master server and write requests/responses and slave servers and read requests/responses may be collected and aggregated to present a full view of application communications between a client and the server farm, regardless of the individual server processing any particular request. Accordingly, application flow statistics may be monitored, regardless of which server was involved in any particular request/response exchange, allowing scalability without impairment of administrative processes.

Figure 17:
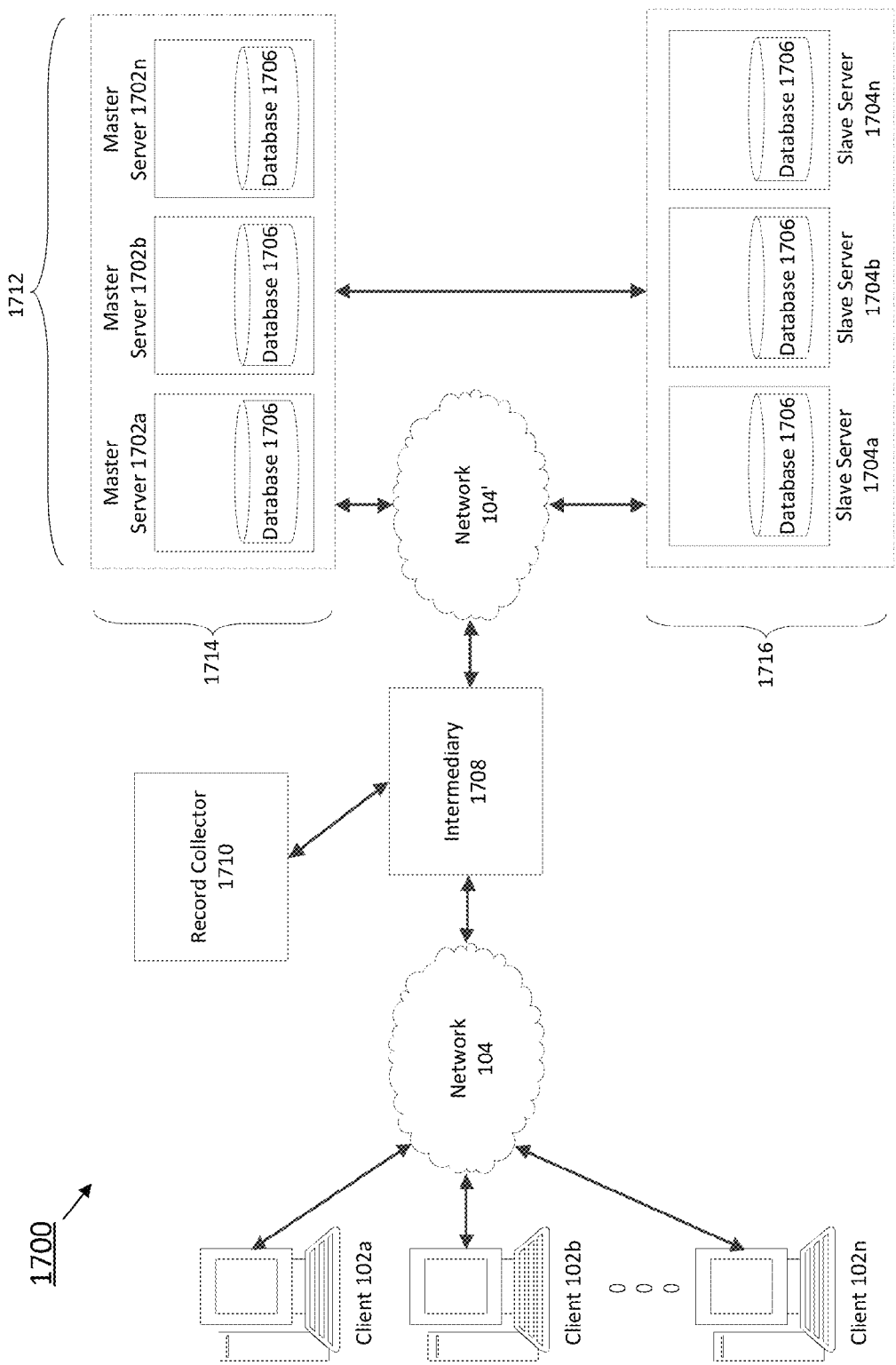
FIG. 17 is a block diagram of an embodiment of a network environment for monitoring and recording application layer flows.

Referring now to FIG. 17, illustrated is a block diagram of an embodiment of a network environment 1700 for monitoring and recording application layer flows. In brief overview, the network environment 1700 comprises one or more clients 102a-102n in communication with master servers 1702a-1702n and slave servers 1704a-1704n via one or more networks 104, 104' (generally referred to as network 104 via an intermediary 1708. The intermediary 1708 is in communication with a record collector 1710. Each server 1702 and 1704 maintains a copy of a database 1706. In some implementations, the master servers 1702 are responsible for receiving requests to update the database 1706 and for transmitting updated databases 1706 to the slave servers 1704. Accordingly, in some embodiments, the master server or master servers may be referred to as "write" servers, while the slave servers may be referred to as "read" servers. Such systems may allow easy scalability of the database servers, for example, by adding additional read servers as necessary to meet demand.

Although FIG. 17 shows a network 104 and another network 104' between the clients 102 and the servers 1702 and 1704, the clients 102 and the servers 1702 and 1704 may be on the same network 104. The networks 104 and 104' can be the same type of network or different types of networks. The network 104 and/or the network 104' can be a local-area network (LAN), such as a company Intranet, a metropolitan area network (MAN), or a wide area network (WAN), such as the Internet or the World Wide Web. In some embodiments, network 104' may be a private network and network 104 may be a public network. In some embodiments, network 104 may be a private network and network 104' a public network. In another embodiment, networks 104 and 104' may both be private networks. In some embodiments, clients 102 may be located at a branch office of a corporate enterprise communicating via a WAN connection over the network 104 to the servers 1702 or 1704 located at a corporate data center.

The network 104 and/or 104' be any type and/or form of network and may include any of the following: a point to point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. In some embodiments, the network 104 may comprise a wireless link, such as an infrared channel or satellite band. The topology of the network 104 and/or 104' may be a bus, star, or ring network topology. The network 104 and/or 104' and network topology may be of any such network or network topology as known to those ordinarily skilled in the art capable of supporting the operations described herein.

In some embodiments, the intermediary 1708 may be located on network 104. For example, a branch office of a corporate enterprise may deploy an intermediary 1708 at the branch office. In other embodiments, the intermediary 1708 may be located on network 104'. For example, an intermediary 1708 may be located at a corporate data center.

In some embodiments, the intermediary 1708 comprises any of the network devices manufactured by Citrix Systems, Inc. of Ft. Lauderdale Fla., referred to as Citrix NetScaler devices. In other embodiments, the intermediary 1708 includes any of the product embodiments referred to as WebAccelerator and BigIP manufactured by F5 Networks, Inc. of Seattle, Wash. In another embodiment, the intermediary 1708 includes any of the DX acceleration device platforms and/or the SSL VPN series of devices, such as SA 700, SA 2000, SA 4000, and SA 6000 devices manufactured by Juniper Networks, Inc. of Sunnyvale, Calif. In yet another embodiment, the intermediary 1708 includes any application acceleration and/or security related appliances and/or software manufactured by Cisco Systems, Inc. of San Jose, Calif., such as the Cisco ACE Application Control Engine Module service software and network modules, and Cisco AVS Series Application Velocity System. Intermediary 1708 may be any type of computing device discussed herein, including appliance 200 or WAN optimization device 205.

In some embodiments, the system may include multiple, logically-grouped servers 1702 and 1704. In these embodiments, the logical group of servers may be referred to as a server farm 1712. In some of these embodiments, the servers 1702 and 1704 may be geographically dispersed. In some cases, a farm 1712 may be administered as a single entity. In other embodiments, the server farm 1712 comprises a plurality of server farms 1712. In some embodiments, the server farm 1712 executes one or more applications on behalf of one or more clients 102. In other implementations, the server farm 1712 stores information in the databases 1706 for retrieval by the clients 102. The system can also include a logical group 1714 consisting of master servers 1702 and a logical group 1716 consisting of slave servers 1704. A client 102 can communicate with a server belonging to either group 1714 or group 1716. For example, a client 102 may communicate with a master server 1702 from group 1714 in order to alter the database 1706. A client 102 can also communicate with a slave server 1704 from the group 1716 to read data from the database 1706. In some implementations, each master server 1702 can communicate with each slave server 1704 (e.g., to alert the slave servers 1704 that the database 1706 has been updated).

The servers 1702 and 1704 within each farm 1712 can be heterogeneous. One or more of the servers 1702 or 1704 can operate according to one type of operating system platform (e.g., WINDOWS NT, manufactured by Microsoft Corp. of Redmond, Wash.), while one or more of the other servers 1702 or 1704 can operate according to another type of operating system platform (e.g., Unix or Linux). The servers 1702 and 1704 of each farm 1712 do not need to be physically proximate to another server 1702 or 1704 in the same farm 1712. Thus, the servers 1702 and 1704 logically grouped as a farm 1712 may be interconnected using a wide-area network (WAN) connection or medium-area network (MAN) connection. For example, a farm 1712 may include servers 1702 and 1704 physically located in different continents or different regions of a continent, country, state, city, campus, or room. Data transmission speeds between servers 1702 and 1704 in the farm 1712 can be increased if the servers 1702 and 1704 are connected using a local-area network (LAN) connection or some form of direct connection. Servers 1702 and 1704 may comprise any type or form of computing device, such as server 106 discussed herein. Similarly, farm 1712 may comprise any type and form of server farm or cloud, including server farm 38.

Servers 1702 and 1704 may be referred to as a file server, application server, web server, proxy server, or gateway server. In some embodiments, a server 1702 may have the capacity to function as either an application server or as a master application server. In some embodiments, a server 1702 or 1704 may include an Active Directory. The clients 102 may also be referred to as client nodes or endpoints. In some embodiments, a client 102 has the capacity to function as both a client node seeking access to applications or data on a server and as an application server providing access to hosted applications for other clients 102a-102n.

In some embodiments, a client 102 communicates with a server 1702 or 1704. In some embodiments, the client 102 communicates directly with one of the servers 1702 or 1704 in a farm 1712. In another embodiment, the client 102 executes a program neighborhood application to communicate with a server 1702 or 1704 in a farm 1712. In still another embodiment, the server 106 provides the functionality of a master node. In some embodiments, the client 102 communicates with the server 1702 or 1704 in the farm 1712 through a network 104. Over the network 104, the client 102 can, for example, request execution of various applications hosted by the servers 1702 and 1704 in the farm 1712 and receive output of the results of the application execution for display. In some embodiments, only a master node 1702 provides the functionality required to identify and provide address information associated with a slave server 1704 hosting a requested application.

In some embodiments, a server 1702 or 1704 provides functionality of a web server. In another embodiment, a master server 1702 receives requests from the client 102, forwards the requests to a slave server 1704, and responds to the request by the client 102 with a response to the request from the server 1704. In still another embodiment, the server 1702 acquires an enumeration of applications available to the client 102 and address information associated with a server 1704 hosting an application identified by the enumeration of applications. In yet another embodiment, the server 1702 presents the response to the request to the client 102 using a web interface. In some embodiments, the client 102 communicates directly with the server 1704 to access the identified application. In another embodiment, the client 102 receives application output data, such as display data, generated by an execution of the identified application on the server 1704.

In some embodiments, the intermediary 1708 receives a database request from a client 102 via the network 104. The intermediary 1708 can determine the type of request (i.e., read or write) and a string associated with the request, and may direct the request to an appropriate master server or slave server, based on the type of request, as well as on server utilization, network utilization, or any other such features. Thus, intermediary 1708 may perform load balancing features for the database server farm. A first IPFIX message including the database, the type of request, and the request string can be generated by the intermediary before the request is transmitted by the intermediary to the servers 1702 or 1704.

In some embodiments, the intermediary 1708 can transmit read requests to one or more slave servers 1704. Each slave server may maintain a copy of the database 1706, such that any slave server 1706 may fulfill the read request by responding with the requested database value or values or corresponding entries. The intermediary 1708 can also transmit database write requests from a client 102 to a master server 1702. The master server 1702 can update its database and can alert each of the slave servers 1704 to update their databases accordingly or may transmit updated databases to each of the slave servers 1704. Thus, in many embodiments, all write requests may go to a master server while read requests, which may be more frequent or numerous, are handled by one or more slave servers. When a server 1702 or 1704 responds to the intermediary 1708, the intermediary 1708 can generate a second IPFIX message including the response status and response string received from the server 1702 or 1704. The first and second IPFIX messages can then be aggregated by the intermediary 1708 and transmitted to the record collector 1710 for storage. In some implementations, the intermediary 1708 and the record collector 1710 can comprise a single machine, such as computing device 100 of FIG. 6C. A client 102 can later request access to the IPFIX messages stored in the record collector 1710 (e.g., to monitor application flows over a period of time).

Figure 18:
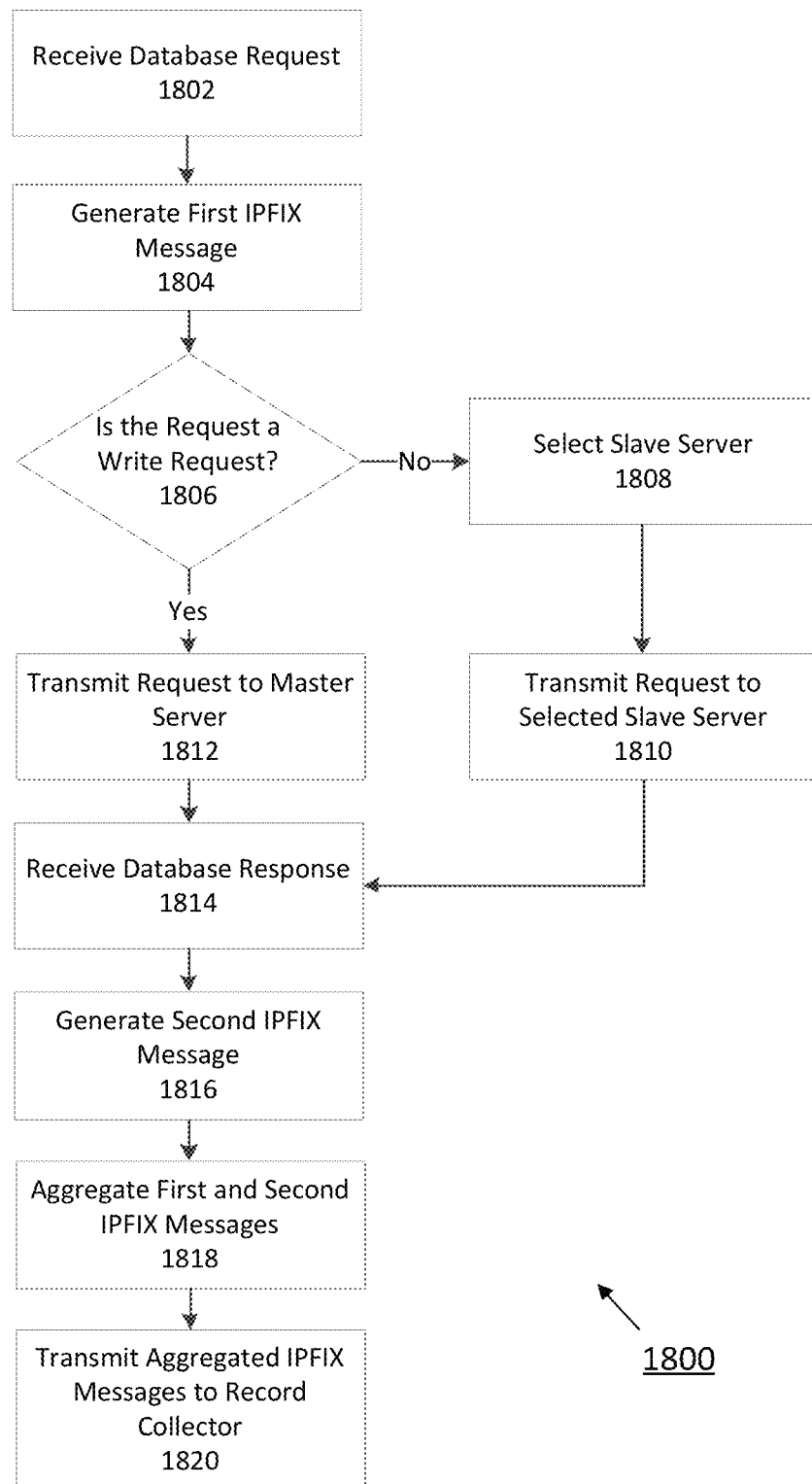
FIG. 18 is a flow chart of an embodiment of a method for monitoring and recording application layer flows.

Referring now to FIG. 18, illustrated is a flow chart of an embodiment of a method 1800 for monitoring and recording application layer flows. In brief overview, a flow monitor may receive a database request (Step 1802), generate a first IPFIX message (Step 1804), and decide whether the request is a write request (Step 1806). Although illustrated in this order, in many embodiments, step 1804 may occur after step 1806. If the request is not a write request, the flow monitor selects a slave server to receive the request (Step 1808) and transmits the request to the selected slave server (Step 1810). If the request is a write request, the flow monitor transmits the request to a master server (Step 1812). The flow monitor also receives a database response (Step 1814), generates a second IPFIX message (Step 1816), and aggregates the first and second IPFIX messages (Step 1818), and optionally transmits the aggregated IPFIX messages to a record collector (Step 1820).

The method 1800 includes the step of receiving a database request (Step 1802). A client can initiate a request associated with a database hosted on a remote server. For example, the client can request access to the database to retrieve a value from a table in the database or to add, alter, or delete information from the database. The request can have an associated request type (e.g., read or write) and a request string (e.g., a value to be inserted into the database or a query to be processed by the database application). An intermediary device located between the client and the server can receive the database request from the client.

The method 1800 includes the step of generating a first IPFIX message (Step 1804). In some implementations, the IPFIX message can be generated based on a match between a parameter of the database request and a parameter of a policy. For example, a parameter of the database request can indicate that the request is a write request, and this can be matched to a policy that allows write access to the database. The IPFIX message can be generated by the intermediary that received the database request. In some implementations, the format of the IPFIX message can be based on a predetermined template. The IPFIX message can contain an identification of the type of database (e.g, MSSQL or MySQL), the type of request, and the request string.

The method 1800 includes the step of determining whether the request is a write request (Step 1806). The intermediary can make this determination based on the parameters of the request. If the request is not a write request (i.e., the request is a read request), the method includes the step of selecting a slave server to which the request should be directed (Step 1808). A group of servers can include master servers and slave servers. Each server can maintain an identical copy of a database. Thus, the selection of a slave server can be arbitrary, because the database associated with each slave server is the same. In some implementations, the selection of a slave server may be made based on a load balancing scheme. The intermediary can detect the amount of network activity of each slave server, and can select the slave server under the least load in order to balance the average load on each of the slave servers. In another implementation, the selection of a slave server by the intermediary may be intended to minimize the amount of active slave servers. After the slave server has been selected, the method 1800 includes the step of transmitting the request to the selected slave server (Step 1810). For example, the request can be transmitted to the selected slave server over a communication network.

If at Step 1806 the intermediary determines that the request is a write request, the method 1800 includes the step of transmitting the request to a master server (Step 1812). In some implementations, a group of servers can contain a single master server and a plurality of slave servers. The master server can receive requests to add, alter, or delete information in the database (i.e., a write request), and can then alert each of the slaves to alter their copies of the database accordingly. Thus, the client can initiate a single request and does not have to be involved in the updating of each individual server's copy of the database. In other implementations, the group of servers may contain more than one master server. In these cases, the intermediary may select a master server based on a load balancing scheme, and can transmit the request to the selected master server via the network.

The method 1800 includes the step of receiving a database response (Step 1814). The response can be transmitted from a server of the group of servers. In some implementations, the response can include a response status. The response status can indicate that an error has occurred, for example, if the request was improperly formatted, if the request attempted to retrieve a value that does not exist in the database, or if the server is otherwise unable to fulfill the request. The response status can also indicate that the request has been satisfied, for example, if a specified value has been inserted in the database. The response can also include a response string (e.g, a message indicating a specific type of error that prevented the server from satisfying the database request).

The method 1800 includes the step of generating a second IPFIX message (Step 1816). The intermediary can determine that the response received in Step 1814 corresponds to the request received in Step 1802. In some implementations, this determination can be made without checking a parameter of the response against a parameter of a policy, as was done in Step 1804. The second IPFIX message can be generated by the intermediary based on a predefined template, and can include information corresponding to the response status and the response string received in Step 1814. In some implementations, the request template can be different from the response template. For example, in one such embodiment, the second IPFIX message can contain an identification of the type of database (e.g, MSSQL or MySQL), the type of response or a status identifier of the response, the response string, and an identification of the length of the response string.

The method 1800 includes the step of aggregating the first and second IPFIX messages (Step 1818). For example, the first and second messages can each be represented as a string. The strings can then be concatenated to aggregate the first and second IPFIX messages. Alternatively, an IPFIX message can be stored as a row in an IPFIX database maintained by the intermediary device (i.e., a database maintained separately from the server database). The first IPFIX message can be inserted into the IPFIX database after the request is received in Step 1802. After the intermediary generates the second IPFIX message, the information from the second IPFIX message can be inserted as an additional row in the IPFIX database. The IPFIX database will then represent the aggregation of the first and second IPFIX messages.

The method 1800 also includes the step of transmitting the aggregated IPFIX messages to a record collector (Step 1820). The record collector can be a computing device and the aggregated IPFIX messages can be transmitted via a computer network to the record collector. For example, the record collector can include a memory unit to store the aggregated IPFIX messages for subsequent retrieval. In some implementations, the record collector and the intermediary can be implemented as a single computing device. The steps of the method 1800 can be repeated for many database requests, and the record collector can store IPFIX messages corresponding to each of the requests and associated responses.

H. Systems and Methods for Monitoring Application Layer Flow with a Lightweight Application Identification Protocol As discussed above, application flow records may include an application name, and be exported or transmitted to a data collector by a flow monitor. In many instances, however, the application name may be of substantial length, particularly where the name includes version numbers or other such information (e.g. "Microsoft Office Outlook [version number/release number] [build number] [service pack number] [language], etc."). Furthermore, the flow monitor may export many records for an application over a time period, for multiple clients, multiple servers, multiple application transactions or flows, or other such variables. Accordingly, in such instances, the application name may account for a substantial amount of redundant data transmitted between the flow monitor and the data collector.

One solution may be to use predetermined strings in place of application names. However, this may require explicit hard-coding of application and string mappings, and sharing such coding between multiple flow monitors and/or data collectors. For example, if an administrator installs an additional application for a cluster, depending on how the cluster is structured and/or the load balancing configuration, he or she may need to set mappings on dozens of flow monitors and collectors or more.

Instead, the present disclosure is directed to a lightweight application identification protocol. Each flow monitor may maintain a counter and, upon identifying a new application associated with a flow (such as via a flow classifier, discussed above), may transmit an application identification record to a data collector with the counter value and the application name. Further records related to the application may be transmitted with just the counter value. Upon receipt, the data collector may replace the counter value with the previously sent application name, or may otherwise associate the received records with the application name. The application identification record may be transmitted by the flow monitor periodically, such as every 10 minutes or any other interval, and/or upon reboot, restart, or whenever there is a change in vserver/service configuration of the flow monitor or device executing the flow monitor, such as adding, renaming, or removing vservers/services.

In some embodiments, to further distinguish between multiple flow monitors, including a plurality of flow monitors executed by each core of a multi-core device, each flow monitor may have a unique domain identifier that may be transmitted with the application identification record. The identifier may be included with the subsequent flow records, or may be concatenated with the application identifier to allow the data collector to distinguish between identifiers maintained by different flow monitors, which may be different for the same application.

In many embodiments, the application identification record may further include an incarnation number or incremental sequence number that may be incremented when the vserver/service configuration is changed or the machine is rebooted. This may allow the data collector to store or process application identification records with new incarnation numbers, and discard records with duplicate or previously received incarnation numbers (e.g. records sent periodically, as discussed above).

Figure 19A:
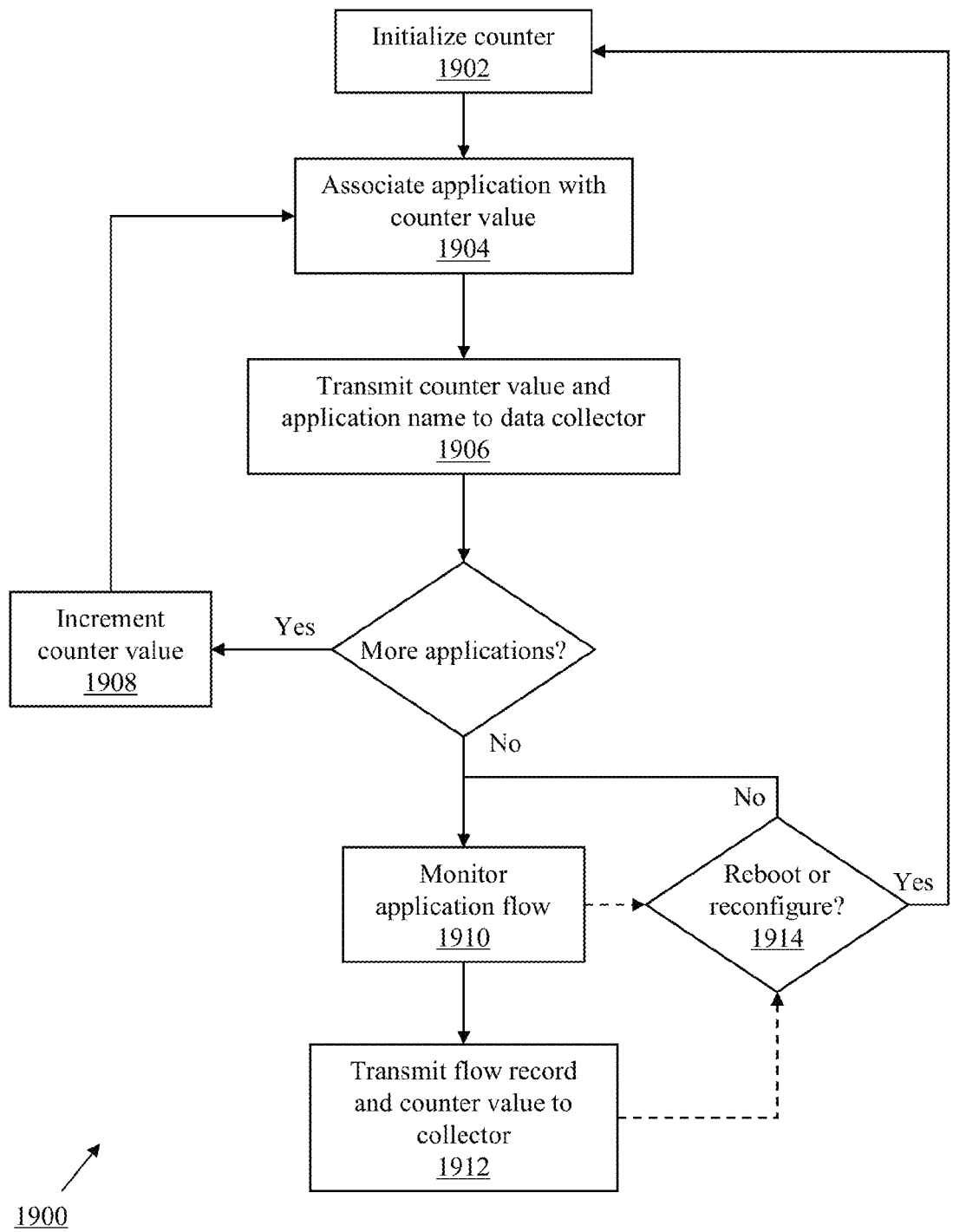
FIG. 19A is a flow chart of an embodiment of a data recorder-side method for lightweight identification of flow information by application.
Figure 19B:
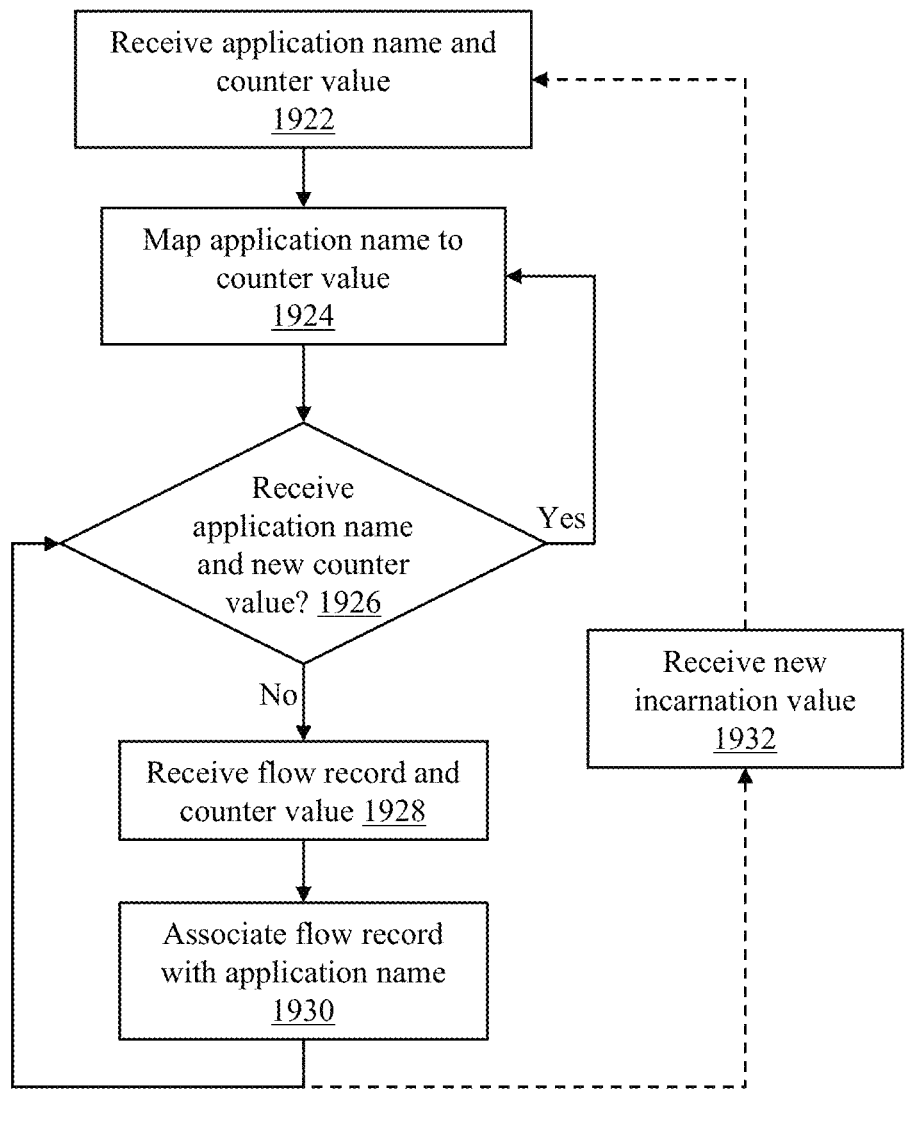
FIG. 19B is a flow chart of an embodiment of a data collector-side method for lightweight identification of flow information by application.
Figure 19C:
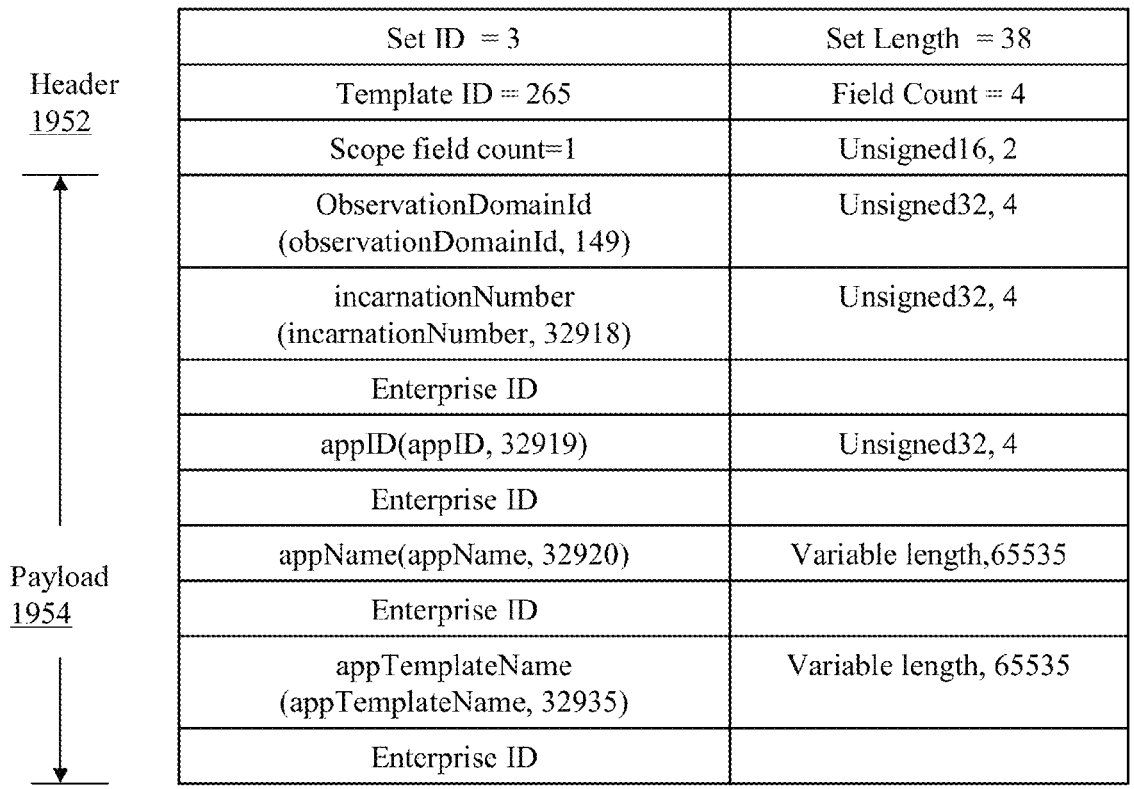
FIG. 19C is a table of an embodiment of a lightweight application identification template.

Referring briefly ahead to FIG. 19C, illustrated is a table of an embodiment of a lightweight application identification or application name template 1950 that may be used for application identification records. As shown, each record may include a header 1952, which may include template identifiers and version or scope identifiers to specify the template type and version. Each record may also include a payload 1954, which may include the domain identifier and incarnation numbers discussed above. The payload may include the application name, and the counter value or application ID. In some embodiments, the payload may also include an identifier of a template for flow records associated with the application or a template the flow monitor will use for generating records for transmission to the data collector.

Referring now to FIG. 19A, illustrated is a flow chart of an embodiment of a data recorder-side method 1900 for lightweight identification of flow information by application. At step 1902, a flow monitor executed by a processor of a device may maintain or initialize a counter. The flow monitor may comprise a flow monitor executed by a first processor of a plurality of processors of a multi-core device, as discussed above. The counter may comprise a string, data field, or other such data, and may be initialized to a first value, such as 0 or 1. In some embodiments, the counter may comprise 8 bits, 16 bits, 32 bits, or any other such value, allowing for a potentially huge number of distinctly identified applications.

At step 1904, the flow monitor may associate an application with the value of the counter. Associating the application with the counter value may comprise storing an application name with the counter value, or adding the application name to a data array with the counter value as an index. In some embodiments, the flow monitor may intercept a data packet from a data flow and identify the data flow as corresponding to the application. If the application is a new or previously unidentified application, the flow monitor may associate the application with the counter value at step 1904.

At step 1906, the flow monitor may transmit the counter value and the name of the application to a data collector executed by a second device, or, in some embodiments, to a data collector executed by the same processor or a different processor of the device, such as in a multi-core device in which the flow monitor is executed by a first core and the data collector by a second core. In many embodiments, however, the data collector may be executed by a different device.

If the flow monitor has additional applications to identify, the flow monitor may increment the value of the counter at step 1908 and repeat steps 1904-1906 for each new application. The flow monitor may repeat these steps for applications that are known to the flow monitor, such as applications associated with vservers/services executed or maintained by the device executing the flow monitor, or applications that are hard coded or explicitly identified by an administrator; or may repeat these steps as new applications are identified via a flow classifier as discussed above. Accordingly, although shown as a loop of steps 1904-1908, in many embodiments, the flow monitor may perform steps 1908-1906 any time a packet is received and classified for a new application. Similarly, in some embodiments, the flow monitor may transmit a plurality of records in a batch at step 1906, such as where the flow monitor associates a plurality of applications with counter values initially. Accordingly, in such embodiments, the flow monitor may perform steps 1904 and 1908 in repeated iterations, and then perform step 1906 for each application identification record.

At step 1910, the flow monitor may monitor a data flow associated with the application to generate a data record, as discussed above. Such data records may include any performance data, including latency, processing requirements, bandwidth, or any other such data. At step 1912, the flow monitor may transmit the flow record and counter value to the data collector. The flow record may not include the name of the application, reducing data requirements, particularly as the name may be an order of magnitude longer than the counter value. Upon receipt, the data collector may re-associate the flow record with the application name based on the previously received mapping of the counter value and application name in the application identification record transmitted at step 1906.

At step 1914, in some embodiments, responsive to rebooting or reconfiguring the device, the flow monitor may re-initialize the counter at step 1902. Reconfiguring the device may include adding, renaming, removing, or otherwise modifying the configuration of a vserver or service. In some embodiments, the flow monitor may maintain a second counter, such as an incarnation counter, that may be incremented at step 1914. In such embodiments, the value of the second counter may be transmitted to the data collector at step 1906 and/or step 1912. In a further embodiment, the device and/or flow monitor may have a unique identifier, such as a domain identifier discussed above. In such embodiments, the unique identifier may be transmitted to the data collector at step 1906 and/or step 1912.

In some embodiment, as discussed above, step 1906 may be repeated periodically for each application, responsive to expiration of a timer. The timer may be set to 5 minutes, 10 minutes, half an hour, or any other such value.

Referring now to FIG. 19B, illustrated is a flow chart of an embodiment of a data collector-side method 1920 for lightweight identification of flow information by application. At step 1922, a data collector executed by a processor a device may receive, from a second device, a name of an application and a value of a counter maintained by a flow monitor executed by the second device. At step 1924, the data collector may map the received name of the application to the counter value. In one embodiment, mapping the received name to the counter value may comprise storing the name in an array at an index of the counter value, or may comprise storing the name and the counter value together in a database or data array. In some embodiments, responsive to receiving one or more new application names and counter values at step 1926, the device may repeat step 1924 for the additional application or applications.

At step 1928, the data collector may receive, from the flow monitor, a data flow record including an identification of the application including the counter value, but not including the application name. Accordingly, the identification of the application may consist of the counter value. However, the data flow record may include other data not specifically identifying the application, including flow data characteristics or parameters, device identifiers, incarnation numbers, performance characteristics, or other such data. In one embodiment, the data collector may further map the application name and counter value to a device identifier and/or incarnation number, as discussed above. At step 1930, the data collector may re-associate the flow record with the application name based on the previously mapped application and counter value.

In some embodiments, the flow record and/or received application name and counter value at steps 1922 or 1926 may include an incarnation number, as discussed above. The incarnation value may be incremented by the flow monitor on reboot or reconfiguration, as discussed above. Consequently, if the data collector receives an incremented or new incarnation value 1932, the data collector may reset application name mappings and/or receive and map new application name and counter values at steps 1922-1926, as discussed above.

Accordingly, via the systems and methods discussed herein, application names may be associated with application flows via an initial identification record, and then a lightweight identifier may be used in place of the application name in subsequent flow data record transmissions, reducing bandwidth requirements. Application names and the identifier may be dynamically mapped as applications are recognized and classified by the flow monitor, eliminating manual configuration requirements.

I. Systems and Methods for Measurement of Application Performance

A waterfall model may comprise a timeline representation of performance measurements of an application, such as a web browser accessing a web page, including embedded links in the page. The waterfall model may be so named because loading of each embedded object may be dependent on loading and rendering a portion of the page, such that, when the set of load start and end times are displayed on the timeline, they appear to cascade like a waterfall. This may also be similar to a Gant chart.

In some embodiments, an application flow monitor may monitor application performance for recording data which may be displayed in such a waterfall model. Accordingly, the application flow monitor may need to obtain page load and render times from the client, to generate the representation.

In one embodiment, executable code may be inserted or injected into various places in the web page or document by the flow monitor prior to transmission to the client. Upon execution of the code, the client may issue one or more requests that may be received by the flow monitor with timestamps indicating the time at which the client rendered that portion of the page. For example, in one embodiment, the flow monitor may inject executable javascripts into HTML content of a web page prior to transmission to a client. When each script is executed during page loading and rendering, the client may transmit an HTTP request including a timestamp to the flow monitor, which may extract the information. The flow monitor may maintain a session for each document or web page, expecting requests for each execution of the code or requests for embedded links with a referrer header identifying the main page or document. In some embodiments, the executable code may include a set-cookie header which may be used by the flow monitor for cookie validation upon receiving each request for the embedded links, allowing the flow monitor to disambiguate requests from different clients for the page. The different timestamps may be placed in a timeline and displayed to an administrator, showing either smooth loading and rendering of the document or webpage, or indicating where actions or links on the page may be causing delays. The data may also be used to measure the results of optimizations by measuring performance results before and after the optimization is performed.

In some embodiments, the executable code may comprise pre-body and post-body scripts injected into documents requested by and served to a client. In such embodiments, when the client browser executes the script, it may generate three different requests to the flow monitor with encoded performance data, including page load times, page render times, and time spent on the page. In some embodiments, the requests may be encoded with a predetermined URL to direct the request to the flow monitor. Responder actions and/or data may also be encoded in the URL string. Each request may also include a referrer header that identifies the main page or document, and/or a cookie set by the flow monitor during script injection to identify the specific client and/or user.

For example, in one embodiment, the request may be transmitted to an IP address or virtual IP address of the flow monitor, with a URL with a predetermined code such as /ens10/ to indicate that the request is from an injected script. The URL may further include an identification of an accessed URL for an embedded object, a system identifier, an HTTP transaction identifier, a unique page identifier to associate the embedded objects with the main page such as the cookie value, a service name, a virtual server name, and one or more measurement values including any of the application flow values discussed above, page load or render times, or time spent on a page. These values may be sent, in some embodiments, as parameter and value pairs in a URL as part of an HTTP GET or POST request.

Figure 20A:
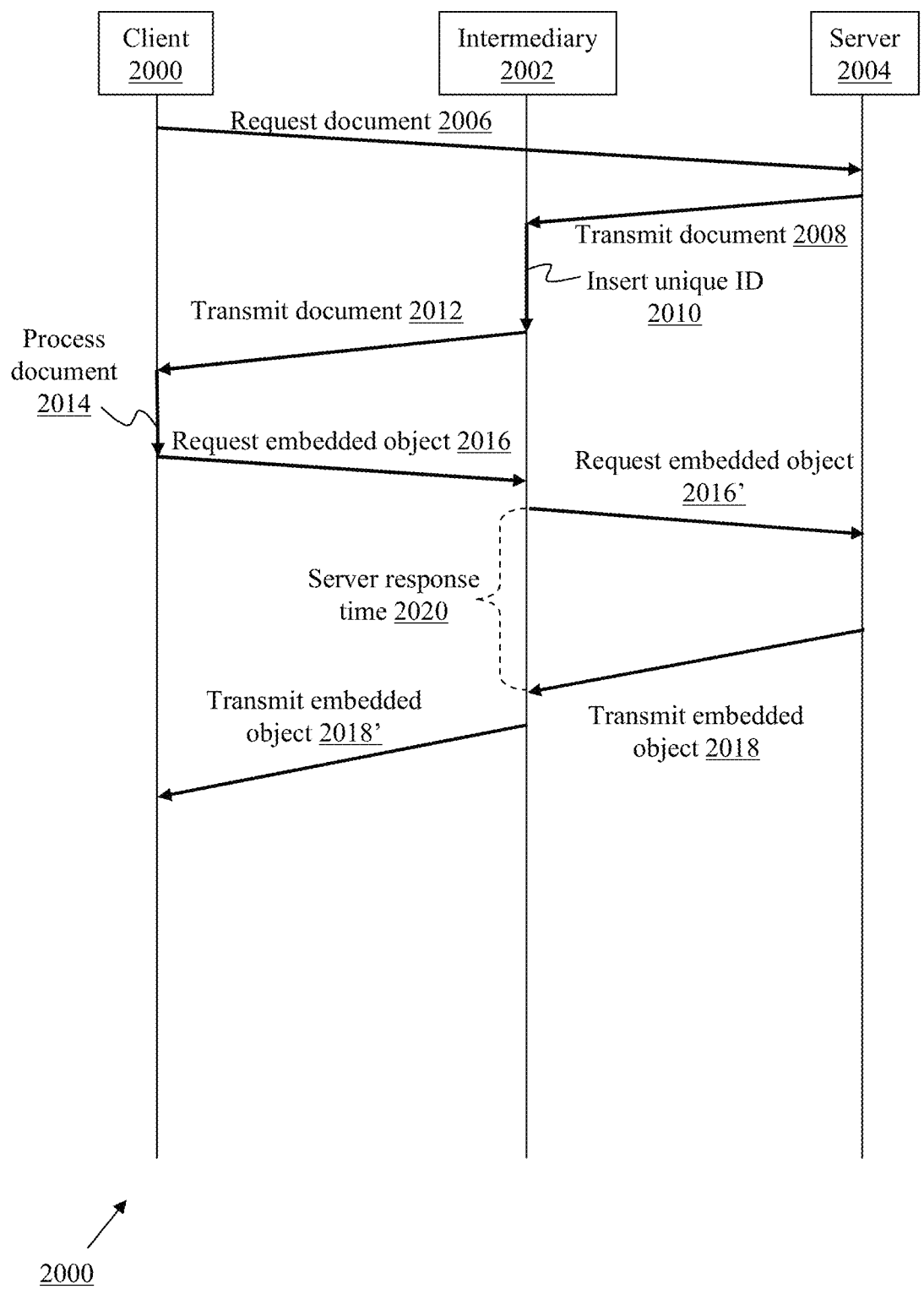
FIG. 20A is a signal flow diagram of an embodiment of source performance measurement.
Figure 20B:
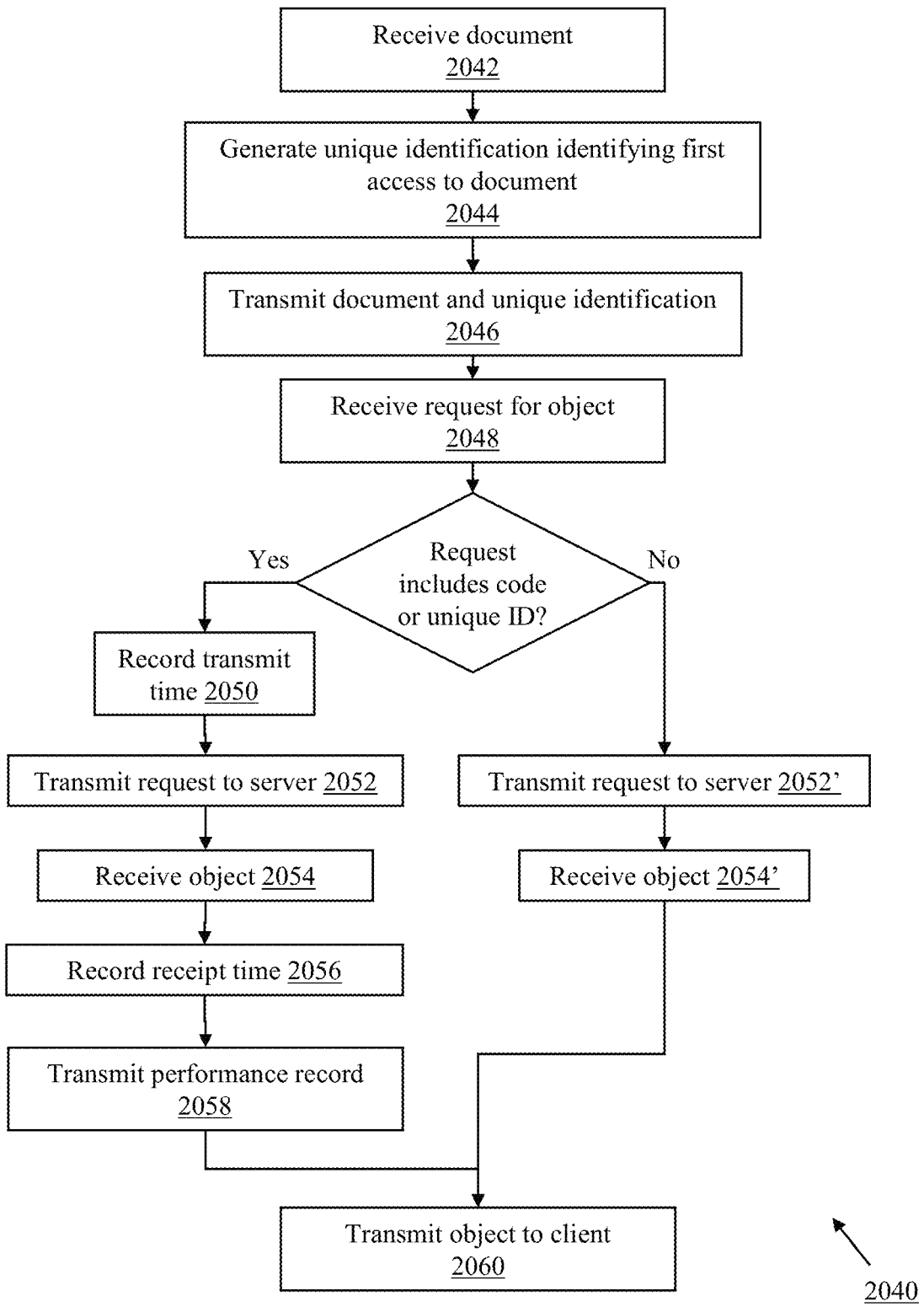
FIG. 20B is a flow chart of an embodiment of a method of application performance measurement.
Figure 20C:
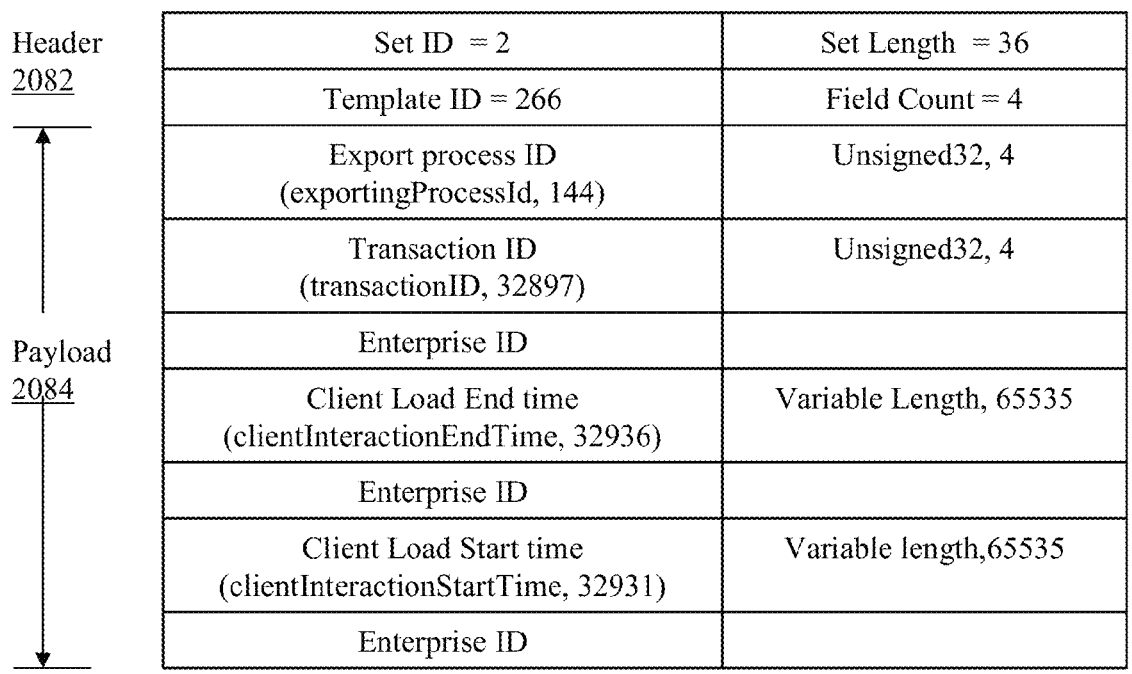
FIG. 20C is a table of an embodiment of an application load time record.

The flow monitor may use these parameter and value pairs to generate application performance records, such as those identified in FIGS. 20C and 20D. Specifically, referring briefly to FIG. 20C, illustrated is a table of an embodiment of a template for an application load time record 2080. The record may include a header 2082 with a template ID and version or type, and a payload 2084 including an identifier of a process on the client, a transaction identifier, and a client load start and end time for a document. Similarly, FIG. 20D illustrates a table of an embodiment of a template for an application render time record 2086. The record may include a header 2088 similar to header 2082, and a payload 2090 similar to payload 2084 including a render start and end time for a document in place of the load start and end times.

Additionally, by intercepting and identifying requests for embedded objects as associated with a client page, the flow monitor may monitor server performance of delivery of such objects. Referring now to FIG. 20A, illustrated is a signal flow diagram 2000 of an embodiment of source performance measurement. As shown, an intermediary device 2002 may be deployed between one or more clients 2000 and one or more servers 2004. Although shown separate, in many embodiments, the intermediary device 2002 executing a flow monitor may also be a server 2004, such as a flow monitor executed by a first core of a multicore device and a server or vserver executed by a second core of the device.

At step 2006, the client 2000 may request a document from the server 2004. Although shown as a direct path, in many embodiments, the request may traverse the intermediary 2002 or may be intercepted or received by the intermediary and forwarded to the server. The document request may be a request for a web page, in some embodiments.

At step 2008, the server may transmit the document 2008 to the intermediary 2002, or the intermediary may intercept a transmission of the document from the server to the client. At step 2010, the intermediary may insert a script or unique identifier, such as a user identifier or cookie as discussed above, into the document. In some embodiments, the document may contain one or more links to embedded objects for the client to load. The intermediary may modify these links, or modify the page to include the unique identifier. At step 2010, the intermediary may transmit the document 2012 to the client. In some embodiments, the intermediary may initialize a state machine or otherwise maintain a session state for the client, as the intermediary may expect requests for the embedded object or objects identified in the document. In a further embodiment, the intermediary may close the session or terminate the state machine responsive to expiration of a time out, or responsive to receiving requests for all of the embedded objects.

At step 2014, the client may process the document or web page, which may comprise loading and/or rendering the page. At step 2016, the client may transmit a request for an embedded object identified in the page to the intermediary. The request may include the unique identifier, such as via a cookie field, allowing the intermediary to associate the request with the specific client and/or state machine. In some embodiments, the request may also include a page referrer identifying the document or web page transmitted to the client at step 2012. At step 2016', the intermediary may forward or transmit the request for the embedded object to the server. Although shown transmitted to the same server 2004, in many embodiments, the request may be transmitted to a different server. The intermediary may record a starting timestamp or transmission time for the request sent to the server.

At step 2018, the server may respond to the request with the embedded object, and at step 2018', the intermediary may transmit the embedded object to the client. The intermediary may record the time of receipt of the embedded object from the server, allowing measurement of server response time 2020.

Although only one embedded object request/response is illustrated, in many embodiments, multiple objects may be requested by the client, and multiple server response times 2020 may be measured for one or more servers. Additionally, as discussed above, the client may record various performance metrics, including page loading and ending times, page rendering times, and/or timestamps for requesting and/or receiving objects. The client may transmit these metrics to the intermediary or to a data collector in an application performance or flow record, and the data collector or intermediary may aggregate the metrics with server performance measurements such as server response time 2020. Accordingly, the resulting measurements may define overall page processing time on the client, as well as granular measurements of server response times for serving various embedded objects in the page. This allows for identification of any object or request that causes page presentation delays.

Referring now to FIG. 20B, illustrated is a flow chart of an embodiment of a method of application performance measurement 2040. At step 2042, a device or a flow monitor executed by a device may receive a first document for transmission to a client. The flow monitor may receive the device from a server or may retrieve the device from storage, for example in embodiments in which the device is also acting as a server. The first document may include instructions for the client to transmit a request for an embedded object, such as embedded links within a web page.

At step 2044, the flow monitor or the device may generate a unique identification associated with the first document. The unique identification may identify a first access of the first document by the client or request of the document by the client, may identify the user, or otherwise uniquely identify the transaction between the client and the server(s) for receiving and rendering the web page or document and embedded links. The unique identification may, for example, comprise a cookie. In some embodiments, the flow monitor or device may inject or insert scripts into one more places within the documents to cause the client to transmit requests including timestamps to the flow monitor, as discussed above.

At step 2046, the flow monitor or device may transmit the document and unique identification to the client. At step 2048, the flow monitor or device may subsequently receive a request for an embedded object or may intercept a request to a server. As discussed above, in some embodiments, the request may have a predetermined code or portion of a URL address, such as "/ens10/" which the flow monitor may identify as indicating that the request comes from a client that has received the page with the unique identification, as opposed to another client or device. This may allow the flow monitor to distinguish requests for the object from clients with monitored flows versus those from web crawlers or robots, direct linking clients, or other such entities. The request may also include the unique identification, such as in a cookie field, and, in some embodiments, may also include a referrer header identifying the document or web page.

If the request includes the code and/or identifier, then at step 2050, the flow monitor may record a transmit time for the request and at step 2052 may transmit the request for the embedded object to a server. In many embodiments, the flow monitor may rewrite or modify the request. For example, as discussed above, the request from the client may have a predetermined code in a URL of the request and may also include as a parameter a URL for the requested embedded object. The flow monitor may transmit a request to the server including the URL for the requested embedded object, but not including the predetermined code. Similarly, the flow monitor may remove other parameters and values from the request or transmit a request for the object lacking such parameters and values.

At step 2054, the flow monitor may receive the embedded object from the server, and at step 2056 may record a receipt time for the object. The difference between the receipt time and transmit time may indicate the processing time of the server (plus the round-trip time for the request and response, although this may be small, particularly where the server and flow monitor are on the same device or are on the same high-speed LAN). At step 2058, the flow monitor may transmit a performance record to a data collector identifying the processing time of the server, using any of the techniques discussed herein. At step 2060, the flow monitor may transmit the object to the client.

If the request for the object does not include the predetermined code or URL or lacks the unique identifier, then in some embodiments, the flow monitor may transmit the request to the server at step 2052', receive the object at step 2054', and forward the object to the client at step 2060 without making a performance measurement of the server.

In many embodiments in which the document includes links to multiple embedded objects, steps 2050-2060 may be repeated iteratively. In one embodiment, the flow monitor may transmit a single performance record at step 2058 after all embedded objects have been requested by and served to the client. Accordingly, step 2058 may occur after step 2060. The performance record may include server performance measurements for each object, allowing fine grained determination of delay, or may include an average server performance measurement. In some embodiments, the flow monitor may maintain a state machine or session for the client requests with an expected number of embedded object requests based on the number of objects embedded in the document. Upon receiving and serving all of the expected embedded object requests, or upon expiration of a timeout, the flow monitor may close the session and transmit the performance record at step 2058.

In some embodiments, the flow monitor may maintain a timer started at any of steps 2042-2046, and may further record client side performance metrics including timestamps of receipt of the request at step 2048. This may be used to identify how quickly the client is processing the page and requesting embedded objects. In other embodiments, the flow monitor may receive a performance record from the client based on measurements performed by a client agent or via execution of scripts injected into the document, as discussed above. The performance record may include a load time of the document, a render time of the document, a time spent on the document, and the unique identification. Based on the identification, the flow monitor or the data collector may aggregate the client-side metrics with the server performance measurements. The data collector and/or flow monitor may generate a single record comprising a timeline of receipt and processing of the document and the embedded objects of the first document.

Accordingly, via script injection and measurement of client-side and server-side performance metrics, a waterfall model performance measurement may be made, allowing identification of any delays in serving and rendering the page or document at a fine level of granularity.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompanying claims and their equivalents.

What is claimed is:

1. A method for lightweight identification of flow information by application, comprising:
   maintaining, by a flow monitor executed by a processor of a device, a counter;
   associating, by the flow monitor, an application with the value of the counter;
   transmitting, by the flow monitor to a data collector executed by a second device, the counter value and a name of the application;
   monitoring, by the flow monitor, a data flow associated with the application to generate a data record; and
   transmitting the data record, by the flow monitor to the data collector, the data record including an identification of the application consisting of the counter value.

2. The method of claim 1, further comprising incrementing the counter prior to associating a second application with the value of the counter.

3. The method of claim 1, further comprising maintaining a second counter, incrementing the second counter upon rebooting the device, and transmitting the value of the second counter to the data collector with the counter value and the name of the application.

4. The method of claim 1, further comprising maintaining a second counter, incrementing the second counter responsive to a configuration change of the device, and transmitting the value of the second counter to the data collector with the counter value and the name of the application.

5. The method of claim 1, wherein the name of the application is an order of magnitude longer than the counter value.

6. The method of claim 1, wherein transmitting the counter value and the name of the application further comprises transmitting a device identifier associated with the application.

7. The method of claim 1, wherein transmitting the data record including an identification of the application consisting of the counter value further comprises transmitting the data record for re-association with the name of the application by the data collector, based on a mapping of the name of the application to the counter value maintained by the data collector.

8. The method of claim 1, further comprising re-transmitting the counter value and the name of the application responsive to expiration of a timer.

9. A method for lightweight identification of flow information by application, comprising:
- receiving, by a data collector executed by a processor of a device, from a second device, a name of an application and a value of a counter maintained by a flow monitor executed by the second device;
- mapping, by the data collector, the received name of the application to the counter value;
- receiving, by the data collector from the flow monitor, a data flow record including an identification of the application consisting of the counter value; and
- re-associating the received data flow record with the name of the application, by the data collector, responsive to the mapping of the name of the application to the counter value.

10. The method of claim 9, wherein receiving the name of the application and value of the counter further comprises receiving a value of a second counter, and further comprising:
- receiving, by the data collector, the name of the application, a second value of the counter, and an incremented value of the second counter, transmitted by the flow monitor responsive to a change in configuration of the second device; and
- replacing the mapping of the name of the application to the counter value with a mapping of the name of the application to the second counter value.

11. The method of claim 9, wherein the name of the application is an order of magnitude longer than the counter value.

12. The method of claim 9, further comprising receiving, by the data collector, a device identifier, and mapping the name of the application to the device identifier and the counter value.

13. A system for lightweight identification of flow information by application, comprising:
- a device comprising a processor executing a flow monitor, the flow monitor configured for:
- maintaining a counter,
- associating an application with the value of the counter,
- transmitting, to a data collector executed by a second device, the counter value and a name of the application,
- monitoring a data flow associated with the application to generate a data record, and
- transmitting the data record, to the data collector, the data record including an identification of the application consisting of the counter value.

14. The system of claim 13, wherein the flow monitor is further configured for incrementing the counter prior to associating a second application with the value of the counter.

15. The system of claim 13, wherein the flow monitor is further configured for maintaining a second counter, incrementing the second counter responsive to a configuration change of the device, and incrementing the second counter upon rebooting the device.

16. The system of claim 13, wherein the flow monitor is further configured for maintaining a second counter, incrementing the second counter responsive to a configuration change of the device, and incrementing the second counter responsive to a configuration change of the device.

17. The system of claim 13, wherein the name of the application is an order of magnitude longer than the counter value.

18. The system of claim 13, wherein the flow monitor is further configured for transmitting a device identifier associated with the application.

19. The system of claim 13, wherein the flow monitor is further configured for transmitting the data record for re-association with the name of the application by the data collector, based on a mapping of the name of the application to the counter value maintained by the data collector.

20. The system of claim 13, wherein the flow monitor is further configured for re-transmitting the counter value and the name of the application responsive to expiration of a timer.

* * * * *